United States Patent [19]

Fujimura et al.

[11] 4,427,753

[45] Jan. 24, 1984

[54] ELECTROPHOTOGRAPHIC PHOTOSENSITIVE MEMBER WITH DISAZO OR TRISAZO COMPOUND

[75] Inventors: Naoto Fujimura, Yokohama; Takashi Tanaka, Kawasaki; Takeshi Fujita, Kuki; Masakazu Matsumoto, Yokohama; Norie Takebayashi, Tokyo; Yoshio Takasu, Tama; Shozo Ishikawa, Sayama, all of Japan

[73] Assignee: Canon Kabushiki Kaisha, Tokyo, Japan

[21] Appl. No.: 381,577

[22] Filed: May 24, 1982

[30] Foreign Application Priority Data

| | | | |
|---|---|---|---|
| Jun. 2, 1981 | [JP] | Japan | 56-85418 |
| Jun. 3, 1981 | [JP] | Japan | 56-85365 |
| Jun. 10, 1981 | [JP] | Japan | 56-89254 |
| Jun. 10, 1981 | [JP] | Japan | 56-89255 |
| Jun. 12, 1981 | [JP] | Japan | 56-90447 |
| Jun. 12, 1981 | [JP] | Japan | 56-90448 |
| Jun. 12, 1981 | [JP] | Japan | 56-90449 |
| Jun. 12, 1981 | [JP] | Japan | 56-90450 |
| Jun. 12, 1981 | [JP] | Japan | 56-90451 |
| Jun. 12, 1981 | [JP] | Japan | 56-90452 |

[51] Int. Cl.³ .......... G03G 5/06

[52] U.S. Cl. .......... 430/58; 430/59; 430/70; 430/71; 430/72; 430/73; 430/74; 430/75; 430/76; 430/77; 430/78; 430/79; 260/152; 260/154; 260/155; 260/156; 260/157; 260/158; 260/164; 260/169; 260/174

[58] Field of Search .......... 430/58, 59, 70, 71, 430/72, 73, 74, 75, 76, 77, 78, 79

[56] References Cited

U.S. PATENT DOCUMENTS

| | | | |
|---|---|---|---|
| 3,775,105 | 11/1973 | Kukla . | |
| 3,884,691 | 5/1975 | Rochlitz . | |
| 4,024,125 | 5/1977 | Kunstmann et al. . | |
| 4,118,232 | 10/1978 | Piller et al. | 430/74 X |
| 4,251,614 | 2/1981 | Sasaki et al. . | |
| 4,256,821 | 3/1981 | Enomoto et al. . | |
| 4,260,672 | 4/1981 | Sasaki . | |
| 4,272,598 | 6/1981 | Sasaki et al. . | |
| 4,279,981 | 7/1981 | Ohta et al. . | |
| 4,297,426 | 10/1981 | Sakai et al. . | |
| 4,314,016 | 2/1982 | Ohta et al. | 430/59 |
| 4,359,515 | 11/1982 | Katagiri et al. | 430/70 |

FOREIGN PATENT DOCUMENTS

| | | |
|---|---|---|
| 13173 | 7/1980 | European Pat. Off. . |
| 2302522 | 8/1981 | Fed. Rep. of Germany . |
| 1370197 | 10/1976 | United Kingdom . |
| 1453024 | 10/1976 | United Kingdom . |
| 1465141 | 2/1977 | United Kingdom . |
| 1465142 | 2/1977 | United Kingdom . |
| 2001769A | 2/1979 | United Kingdom . |
| 2018446A | 10/1979 | United Kingdom . |

*Primary Examiner*—Roland E. Martin, Jr.

*Attorney, Agent, or Firm*—Fitzpatrick, Cella, Harper & Scinto

[57] ABSTRACT

An electrophotographic photosensitive member comprises a layer containing at least one azo pigment represented by the following formula (I):

$$Cp-N=N-A_1-\underset{\displaystyle A_3(-N=N-Cp)_n}{\underset{|}{CH}}-A_2-N=N-Cp \qquad \text{Formula (I)}$$

in the formula, Cp represents a coupler residue; $A_1$ and $A_2$ each represent a divalent organic residue; n represents 0 or 1; and when n is 0, $A_3$ represents substituted or unsubstituted alkyl, substituted or unsubstituted aryl, or $-(CH=CH)_l-R'$, wherein R' is a substituted or unsubstituted heterocyclic ring residue an l is 0, 1 or 2, and when n is 1, $A_3$ represents a divalent organic residue.

76 Claims, No Drawings

ELECTROPHOTOGRAPHIC PHOTOSENSITIVE MEMBER WITH DISAZO OR TRISAZO COMPOUND

BACKGROUND OF THE INVENTION

1. Field of the Invention

The present invention relates to an improved electrophotographic photosensitive member, and more particularly, to an electrophotographic photosensitive member employing an azo pigment suitable as a charge-generating material for photosensitive layers comprising a charge generation layer and a charge transport layer.

2. Description of the Prior Art

There have so far been known selenium, cadmium sulfide, zinc oxide, etc. as photoconductive materials for use in electrophotographic photosensitive members. In contrast to many advantages thereof, such as, for instance, chargeability in the dark to a suitable potential, a little dissipation of charge in the dark, and fast dissipation ability by light irradiation, these photoconductive materials have the disadvantages of lacking the film forming property per se with a very few exceptions such as amorphous selenium and of poor ability to retain the charge given to their surface.

On the other hand, a variety of organic photoconductive materials are known, including photoconductive polymers such as polyvinylcarbazole or polyvinylanthracene, which, however, cannot be said so useful in practice since they generally have neither enough sensitivity for actual uses nor a sufficient good film forming property.

In view of the above, a photosensitive member of laminate structure has been recently proposed which comprises two photosensitive layers, a charge generation layer and a charge transport layer, having allotted functions. The electrophotographic photosensitive member having such photosensitive layers of laminate structure has been improved in sensitivity to visible light, in charge retentivity, and in surface strength.

Such a photosensitive member is disclosed in for example, U.S. Pat. Nos. 3,837,851, 3,484,237, and 3,871,882, and U.K. Pat. No. 1453024.

However, electrophotographic photosensitive members still do not have sufficient sensitivity and result in variations in surface potential particularly an increase in light portion potential and a decrease in dark portion potential, upon repeating charge and exposure.

SUMMARY OF THE INVENTION

An object of this invention is to provide a novel electrophotographic photosensitive member free from any defect or disadvantage stated above.

A further object of the invention is to provide novel organic photoconductive materials.

Another object of the invention is to provide azo pigments suitable for use as a charge-generating material in the above-mentioned photosensitive layers of laminate structure.

A still further object of the invention is to provide a photosensitive layer having a charge generation layer containing a novel charge-generating material.

A still further object of the invention is to provide an electrophotographic photosensitive member improved in sensitivity and durability.

These objects of the invention can be achieved with an electrophotographic member having a layer which contains at least one of azo pigments represented by the following formula (I):

$$\text{Formula (I): } Cp{-}N{=}N{-}A_1{-}\underset{\displaystyle A_3(-N{=}N{-}Cp)_n}{\underset{|}{CH}}{-}A_2{-}N{=}N{-}Cp$$

In the formula, Cp represents a coupler residue; $A_1$ and $A_2$ each represent substituted or unsubstituted arylene or a conjugated double bond-containing divalent organic residue having at least one benzene ring which is condensed or not condensed with a heterocyclic ring; n is 0 or 1; and when n is 0, $A_3$ represents substituted or unsubstituted alkyl, substituted or unsubstituted aryl, or $-(CH{=}CH)_l-R'$, wherein R' is a substituted or unsubstituted heteocyclic ring residue and l is 0, 1 or 2, and when n is 1, $A_3$ represents a substituted or unsubstituted arylene or a conjugated double bond-containing divalent organic residue having at least one benzene ring which is condensed or not condensed with a heterocyclic ring.

DETAILED DESCRIPTION OF THE PREFERRED EMBODIMENTS

The electrophotographic photosensitive member of this invention is characterized by having a photosensitive layer, in particular a charge generation layer, containing a disazo or trisazo pigment represented by the formula (I), $$Cp{-}N{=}N{-}A_1{-}\underset{\displaystyle A_3(-N{=}N{-}Cp)_n}{\underset{|}{CH}}{-}A_2{-}N{=}N{-}Cp \qquad (I)$$

wherein Cp represents a coupler residue, preferably one of the following coupler residues:

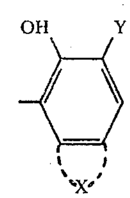

(1)

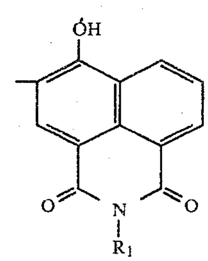

(2)

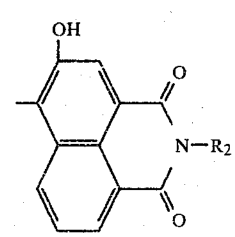

(3)

-continued (4)

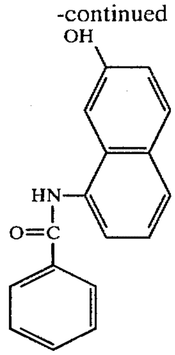

In formula (1), X represents an atomic group necessary to complete a substituted or unsubstituted aromatic hydrocarbon ring (e.g., benzene ring or naphthalene ring) or a substituted or unsubstituted heterocyclic ring (e.g., indole ring, benzofuran ring, or carbazole ring); and Y represents hydrogen, $$-CON\begin{matrix} R_3 \\ R_4 \end{matrix},$$

or —$COOR_4$, wherein $R_3$ and $R_4$ each represent hydrogen, substituted or unsubstituted alkyl (e.g., methyl, ethyl, n-propyl, isopropyl, n-butyl, sec-butyl, t-butyl, n-amyl, t-amyl, n-hexyl, cyclohexyl, n-octyl, t-octyl, 2-ethylhexyl, n-nonyl, octadecyl, hydroxyethyl, hydroxypropyl, benzyl, chlorobenzyl, dichlorobenzyl, methylbenzyl, dimethylbenzyl, 2-phenylethyl, 3-phenylpropyl, α-naphthylmethyl, β-naphthylmethyl, or 2-α-naphthylethyl), or substituted or unsubstituted aryl (e.g., phenyl, tolyl, xylyl, biphenyl, chlorophenyl, dichlorophenyl, trichlorophenyl, bromophenyl, dibromophenyl, tribromophenyl, methoxyphenyl, ethoxyphenyl, butoxyphenyl, phenoxyphenyl, nitrophenyl, cyanophenyl, hydroxyphenyl, carboxyphenyl, N,N-dimethylaminophenyl, N,N-diethylaminophenyl, N,N-dibenzylaminophenyl, acetylphenyl, benzoylphenyl, methylthiophenyl, ethylthiophenyl, mercaptophenyl, α-naphthyl, or β-naphthyl), with the proviso that $R_3$ and $R_4$ are not simultaneously hydrogen. $R_4$ may also be a heterocyclic residue (e.g., carbazolyl, pyridyl, or quinolyl) or a substituted or unsubstituted amino group (e.g., diphenylamino, ditolylamino, dibenzylamino, dimethylamino, or diethylamino). $R_4$ in said —$cooR_4$ is not hydrogen.

In formulae (2) and (3), $R_1$ and $R_2$ each represent substituted or unsubstituted alkyl (e.g., methyl, ethyl, propyl, n-butyl, t-butyl, hexyl, cyclohexyl, n-octyl, t-octyl, 2-ethylhexyl, benzyl, 2-phenylethyl, α-naphthylmethyl, β-naphthylmethyl, methoxymethyl, ethoxymethyl, 2-methoxyethyl 2-ethoxyethyl, 2-hydroxyethyl, 2-carboxyethyl, 3-hydroxypropyl, 2-hydroxypropyl, 3-sulfopropyl, phenoxymethyl, 2-phenoxyethyl, 3-phenoxypropyl, 4-phenoxybutyl, 2-cyanoethyl, 3-cyanopropyl, acetylmethyl, 2-acetylethyl, 3-acetylpropyl, benzoylmethyl, 2-benzoylethyl, 3-benzoylpropyl, methoxymethoxymethyl, 2-methoxymethoxyethyl, 3-methoxymethoxypropyl, N,N-dimethylaminomethyl, N,N-diethylaminomethyl, N,N-dibenzylaminomethyl, 2-N,N-diethylaminoethyl, 2-N,N-dibenzylaminoethyl, 3-N,N-diethylaminopropyl, 3-N,N-diphenylaminopropyl, 3-mercaptopropyl, 4-mercaptobutyl, 2-chloroethyl, 3-chloropropyl, 4-chlorobutyl, 3-chlorobutyl, phenylthiomethyl, 2-phenylthioethyl, or 3-phenylthiopropyl) or substituted or unsubstituted aryl (e.g., phenyl, tolyl, xylyl, biphenyl, chlorophenyl, dichlorophenyl, trichlorophenyl, bromophenyl, nitrophenyl, cyanophenyl, methoxyphenyl, ethoxyphenyl, ethylphenyl diethylphenyl, propylphenyl, phenoxyphenyl, phenylthiophenyl, carboxyphenyl, hydroxyphenyl, sulfophenyl, N,N-dimethylaminophenyl, N,N-diethylaminophenyl, N,N-diphenylaminophenyl, N-ethyl-N-methylaminophenyl, acetylphenyl, benzoylphenyl, α-naphthyl, or β-naphthyl).

$A_1$ (corresponding to $Ph_1$ described below) and $A_2$ (corresponding to $Ph_2$ described below) in formula (I) are the same or different and each represent a divalent organic residue, more specifically, substituted or unsubstituted arylene. Examples of the arylene are phenylenes

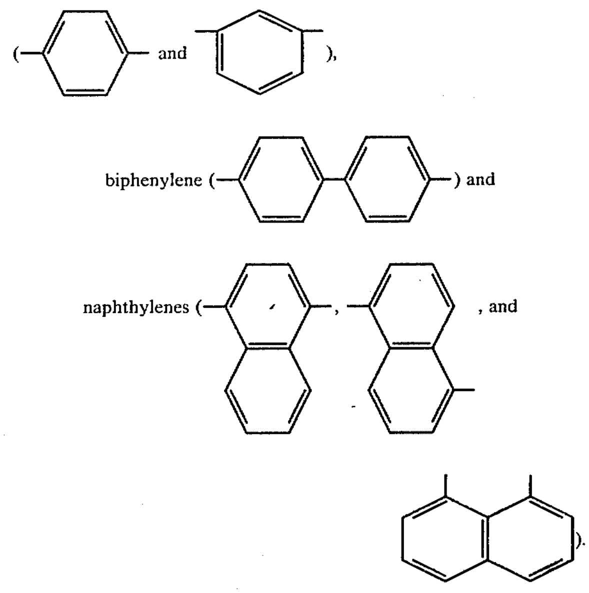

Suitable substituents on these arylenes are, for example, halogen atoms (e.g., chlorine, bromine and fluorine), alkyls (e.g., methyl, ethyl, propyl, n-butyl, t-butyl, n-octyl, and t-octyl), substituted alkyls (e.g., benzyl, 2-phenylethyl, 2-hydroxyethyl, 3-hydroxypropyl, 2-carboxyethyl, 3-carboxypropyl, and 2-sulfoethyl), alkoxys (e.g., methoxy, ethoxy, butoxy, and octyloxy), substituted or unsubstituted aryloxys (e.g., phenoxy, chlorophenoxy, dichlorophenoxy, trichlorophenoxy, bromophenoxy, dibromophenoxy, methylphenoxy, and ethylphenoxy), substituted or unsubstituted arylthios (e.g., phenylthio, tolylthio, xylylthio, chlorophenylthio, dichlorophenylthio, bromophenylthio, α-naphthylthio, and β-naphthylthio), substituted or unsubstituted acyls (e.g., acetyl, propionyl, benzoyl, and methylbenzoyl), substituted aminos (e.g., N,N-dimethylamino, N,N-diethylamino, N,N-dipropylamino, N,N-diphenylamino, N,N-dibenzylamino, and N-ethyl-N-phenylamino), cyano, nitro, hydroxy, sulfo, carboxyl, and the like.

Alternatively, $A_1$ and $A_2$ each represent a divalent organic residue having at least one benzene ring which may be condensed or not condensed with a heterocyclic ring; for instance, said residue is represented by the formula (i) $-X_1-(CH=CH)_p-$, (ii) $-X_2-(CH=CH)_q-$, (iii) $-Ph_3-Q_1-Ph_4-$ or (iv) —Ph- 5—$Q_2$—$Ph_6$—, wherein $X_1$ and $X_2$ each are a substituted or unsubstituted divalent organic residue of aromatic heterocyclic ring condensed with benzene ring or naphthalene ring. Preferred examples of the heterocyclic ring are those of benzimidazole, naphthimidazole, benzoxazole, isobenzoxazole, naphthoxazole, benzothiazole, naphthothiazole, benzoselenazole, naphthoselenazole, indole, quinoline, isoquinoline, benzofuran, dibenzofuran, coumaline, carbazole, phenothiazine, and phenoxazine.

Suitable substituents on these aromatic heterocyclic rings are, for example, halogen atoms (e.g., chlorine, bromine, and fluorine), alkyls (e.g., methyl, ethyl, propyl, n-butyl, t-butyl, n-octyl, and t-octyl), substituted alkyls (e.g., benzyl, 2-phenylethyl, 2-hydroxyethyl, 3-hydroxypropyl, 2-carboxyethyl, 3-carboxypropyl, and 2-sulfoethyl), alkoxys (e.g., methoxy, ethoxy, butoxy, and octyloxy), substituted or unsubstituted aryloxys (e.g., phenoxy, chlorophenoxy, dichlorophenoxy, trichlorophenoxy, bromophenoxy, dibromophenoxy, methylphenoxy, and ethylphenoxy), substituted or unsubstituted arylthios (e.g., phenylthio, tolylthio, xylylthio, chlorophenylthio, dichlorophenylthio, bromophenylthio, α-naphthylthio, and β-naphthylthio), substituted or unsubstituted acyls (e.g., acetyl, propionyl, benzoyl and methylbenzoyl), substituted aminos (e.g., N,N-dimethylamino, N,N-diethylamino, N,N-dipropylamino, N,N-diphenylamino, N,N-dibenzylamino, and N-ethyl-N-phenylamino), cyano, nitro, hydroxy, sulfo, and carboxyl. In the above formulae (i) and (ii), p and q each are 0, 1 or 2, preferably 0. Also in this case, $A_1$ and $A_2$ may be the same or different.

$Ph_3$, $Ph_4$, $Ph_5$ and $Ph_6$ each represent a substituted or unsubstituted arylene group. Examples of said arylene are phenylenes 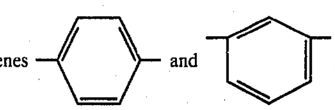 , biphenylene 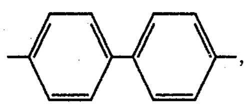 , and naphthylenes 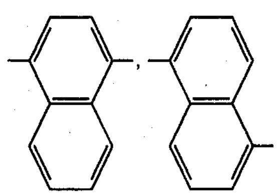

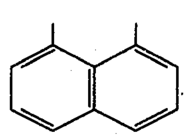

Suitable substituents on these arylenes are, for example, halogen atoms (e.g., chlorine, bromine, and fluorine), alkyls (e.g., methyl, ethyl, propyl, n-butyl, t-butyl, n-octyl, and t-octyl), substituted alkyls (e.g., benzyl, 2-phenylethyl, 2-hydroxyethyl, 3-hydroxypropyl, 2-carboxyethyl, 3-carboxypropyl, and 2-sulfoethyl), alkoxys (e.g., methoxy, ethoxy, butoxy, and octyloxy), substituted or unsubstituted aryloxys (e.g., phenoxy, chlorophenoxy, dichlorophenoxy, trichlorophenoxy, bromophenoxy, dibromophenoxy, methylphenoxy, and ethylphenoxy), substituted or unsubstituted arylthios (e.g., phenylthio, tolylthio, xylylthio, chlorophenylthio, dichlorophenylthio, bromophenylthio, α-naphthylthio, and β-naphthylthio), substituted or unsubstituted acyls (e.g., acetyl, propionyl, benzoyl and methylbenzoyl), substituted aminos (e.g., N,N-dimethylamino, N,N-diethylamino, N,N-dipropylamino, N,N-diphenylamino, N,N-dibenzylamino, and N-ethyl-N-phenylamino), cyano, nitro, hydroxy, sulfo, and carboxyl.

$Q_1$ and $Q_2$ in the above formulae (iii) and (iv) each represent a substituted or unsubstituted divalent aliphatic hydrocarbon radical (e.g., —$CH_2$—, —$C_2H_4$—, —$C_3H_6$—, —$C_4H_8$—, $$-CH_2-\underset{\displaystyle CH_3}{\underset{|}{CH}}-CH_2-,$$

—CH=CH—, —CH=CH—CH=CH—, or $$-CH=\underset{\displaystyle CN}{\underset{|}{C}}-),$$

—O—, $$-\underset{\displaystyle O}{\underset{\|}{C}}-,\ -\underset{\displaystyle S}{\underset{\|}{C}}-,\ -NH-,$$

—NHCO—, —S—, —S—S—, —SO—, or —$SO_2$—.

In the azo pigments of the preferred embodiments according to the present invention, $A_1$ and $A_2$ each represent substituted or unsubstituted arylene or a conjugated double bond-containing divalent organic residue having at least one benzene ring which is condensed or not condensed with a heterocyclic ring.

In formula (I), n is 0 or 1. When n is 0, $A_3$ is represented by —R or —$(CH=CH)_l$—R'. Wherein R is a substituted or unsubstituted alkyl (e.g., methyl, ethyl, n-propyl, isopropyl, n-butyl, sec-butyl, t-butyl, n-amyl, t-amyl, hexyl, cyclohexyl, n-octyl, t-octyl, 2-ethylhexyl, nonyl, octadecyl, benzyl, chlorobenzyl, dichlorobenzyl, methylbenzyl, dimethylbenzyl, 2-phenylethyl, 3-phenylpropyl, α-naphthylmethyl, β-naphthylmethyl, or 2-α-naphthylethyl) or a substituted or unsubstituted aryl (e.g., phenyl, tolyl, xylyl, biphenyl, chlorophenyl, dichlorophenyl, trichlorophenyl, bromophenyl, dibromophenyl, tribromophenyl, methoxyphenyl, ethoxyphenyl, butoxyphenyl, phenoxyphenyl, nitrophenyl, cyanophenyl, hydroxyphenyl, carboxyphenyl, N,N-dimethylaminophenyl, N,N-diethylaminophenyl, N,N-dibenzylaminophenyl, acetylphenyl, benzoylphenyl, methylthiophenyl, ethylthiophenyl, mercaptophenyl, α-naphthyl, or β-naphthyl).

R' is a substituted or unsubstituted monovalent heterocyclic ring residue. Examples of said heterocyclic ring are those of imidazoline, imidazole, benzimidazole, naphthoimidazole, oxazoline, oxazole, benzoxazole, naphthoxazole, thiazoline, thiazole, benzothiazole, naphthothiazole, selenazole, benzoselenazole, naphthoselenazole, indoline, indole, pyridine, quinoline, furan, dibenzofuran, oxadiazole, thiadiazole, triazole, and carbazole.

Suitable substituents on these heterocyclic ring residue include, for example, halogen atoms (e.g., chlorine, bromine and fluorine), alkyls (e.g., methyl, ethyl, propyl, n-butyl, t-butyl, n-octyl, and t-octyl), substituted alkyls (e.g., benzyl, 2-phenylethyl, 2-hydroxyethyl, 3-hydroxypropyl, 2-carboxylethyl, 3-carboxypropyl, and 2-sulfoethyl), alkoxys (e.g., methoxy, ethoxy, butoxy, and octyloxy), substituted or unsubstituted aryloxys (e.g., phenoxy, chlorophenoxy, dichlorophenoxy, trichlorophenoxy, bromophenoxy, dibromophenoxy, methylphenoxy, and ethylphenoxy), substituted or unsubstituted arylthios (e.g., phenylthio, tolylthio, xylylthio, chlorophenylthio, dichlorophenylthio, bromophenylthio, α-naphthylthio, and β-naphthylthio), substituted or unsubstituted acyls (e.g., acetyl, propionyl, benzoyl, and methylbenzoyl), substituted aminos (e.g., N,N-dimethylamino, N,N-diethylamino, N,N-dipropylamino, N,N-diphenylamino, N,N-dibenzylamino, and N-ethyl-N-phenylamino), cyano, nitro, hydroxy, sulfo, and carboxyl. The letter l represents 0, 1, or 2, preferably 0.

When n is 1, $A_3$ represents a divalent organic residue such as a substituted or unsubstituted arylene (hereinafter represented by $Ph_7$) or a conjugated double bonds-containing divalent organic residue having at least one benzene ring condensed with a heterocyclic ring. This residue is represented by the formula

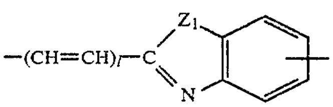

or

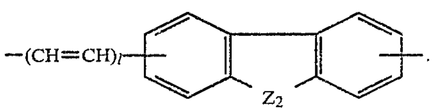

Said $Ph_7$ includes, for example, phenylenes (1) 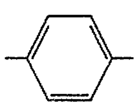 and (2) 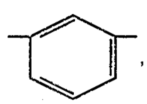, -continued biphenylene (3) 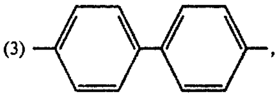, and naphthylenes (4) 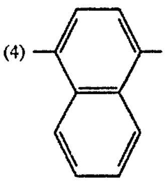 and (5) 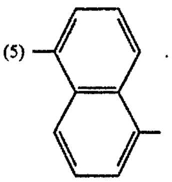.

Examples of suitable substituents on these arylenes are as cited referring to $A_1$ and $A_2$.

In the above formulae; $Z_1$ represents —S—, —O—, —Se—, >N—$R_6$,

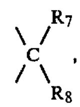, or —CH=CH—, wherein $R_6$, $R_7$ and $R_8$ each represent hydrogen, substituted or unsubstituted alkyl (e.g., methyl, ethyl, propyl, butyl, benzyl, 2-phenylethyl, 2-hydroxyethyl, 2-carboxyethyl, 3-hydroxypropyl, or 3-methoxypropyl), or substituted or unsubstituted aryl (e.g., phenyl, tolyl, xylyl, biphenyl, chlorophenyl, methoxyphenyl, dichlorophenyl, or ethylphenyl); $Z_2$ represents —O—, >N—$R_9$,

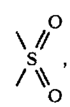, or >C=O, wherein $R_9$ is the same $R_6$, $R_7$, and $R_8$; and l is 0, 1 or 2, preferably 0.

Preferred azo pigments for use in the electrophotographic photosensitive member of this invention are represented by, for instance, the following formulae:

$$Cp{-}N{=}N{-}Ph_1{-}\underset{\displaystyle R}{\underset{|}{CH}}{-}Ph_2{-}N{=}N{-}Cp \quad (1)$$

$$Cp{-}N{=}N{-}X_1{-}(CH{=}CH)_p{-}\underset{\displaystyle R}{\underset{|}{CH}}{-}(CH{=}CH)_q{-}X_2{-}N{=}N{-}Cp \quad (2)$$

$$Cp{-}N{=}N{-}Ph_1{-}\underset{\displaystyle (CH{=}CH)_l{-}R'}{\underset{|}{CH}}{-}Ph_2{-}N{=}N{-}Cp \quad (3)$$

$$Cp{-}N{=}N{-}Ph_3{-}Q_1{-}Ph_4{-}\underset{\displaystyle (CH{=}CH)_l{-}R'}{\underset{|}{CH}}{-}Ph_5{-}Q_2{-}Ph_6{-}N{=}N{-}Cp \quad (4)$$

$$Cp{-}N{=}N{-}Ph_3{-}Q_1{-}Ph_4{-}\underset{\displaystyle R}{\underset{|}{CH}}{-}Ph_5{-}Q_2{-}Ph_6{-}N{=}N{-}Cp \quad (5)$$

$$Cp{-}N{=}N{-}Ph_1{-}\underset{\displaystyle Ph_7{-}N{=}N{-}Cp}{\underset{|}{CH}}{-}Ph_2{-}N{=}N{-}Cp \quad (6)$$

-continued
$$Cp{-}N{=}N{-}X_1{-}(CH{=}CH)_p{-}\underset{\displaystyle Ph_7{-}N{=}N{-}Cp}{\underset{|}{CH}}{-}(CH{=}CH)_q{-}X_2{-}N{=}N{-}Cp \quad (7)$$
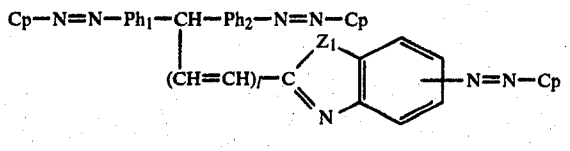
(8)
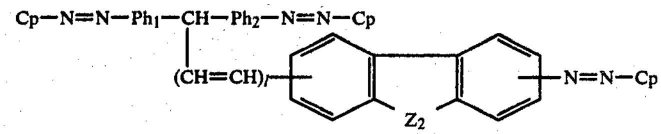
(9)
$$Cp{-}N{=}N{-}Ph_3{-}Q_1{-}Ph_4{-}\underset{\displaystyle Ph_7{-}N{=}N{-}Cp}{\underset{|}{CH}}{-}Ph_5{-}Q_2{-}Ph_6{-}N{=}N{-}Cp \quad (10)$$
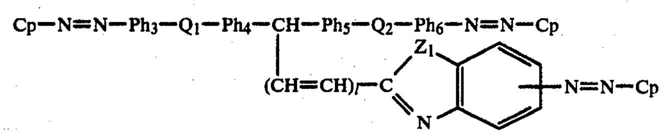
(11)
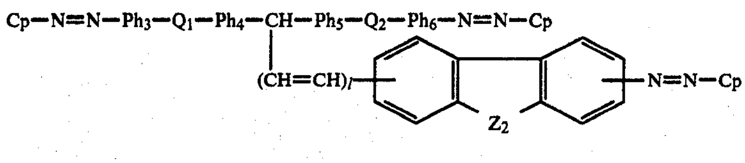
(12)
The symbols in these formulae have the same meanings as the foregoing symbols.
Examples of azo pigments represented by formula (I) are listed below in terms of structural formulae.

(1)
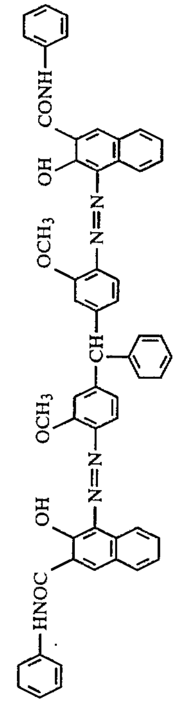
(2)
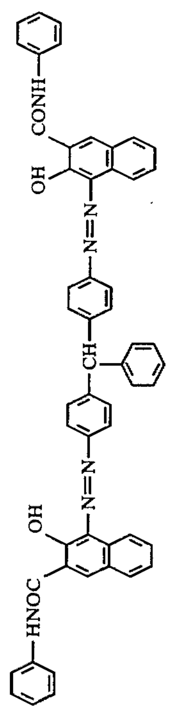
(3)
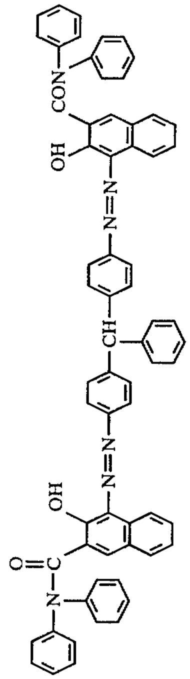
(4)
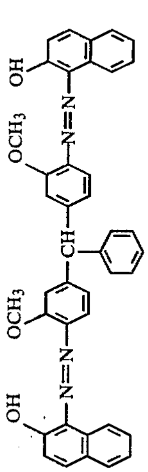
(5)
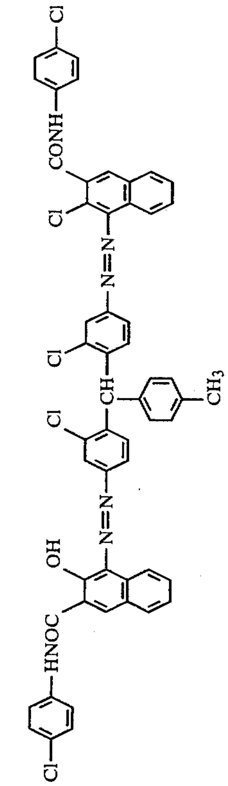
(6)
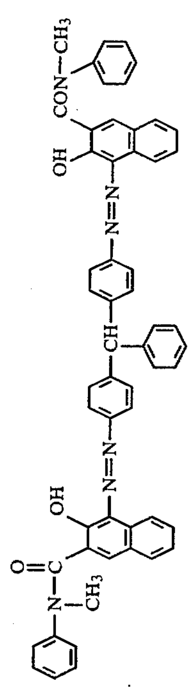
(7)
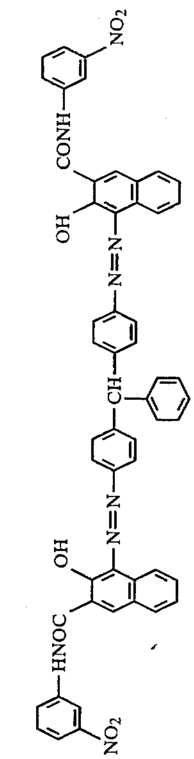
(8)
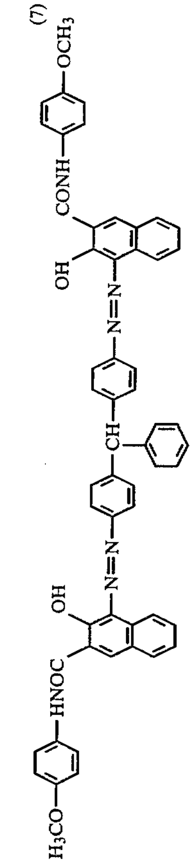
(9)
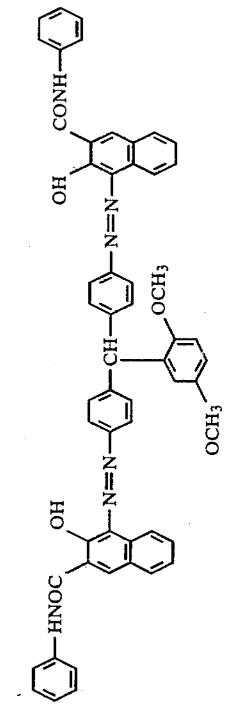
(10)
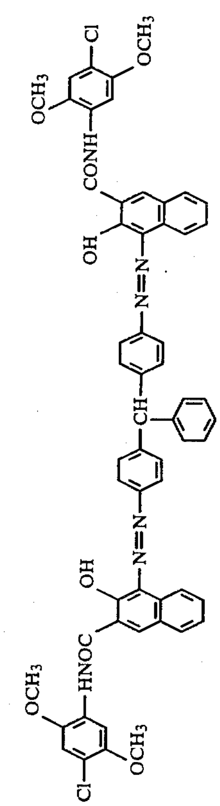

-continued
(11)
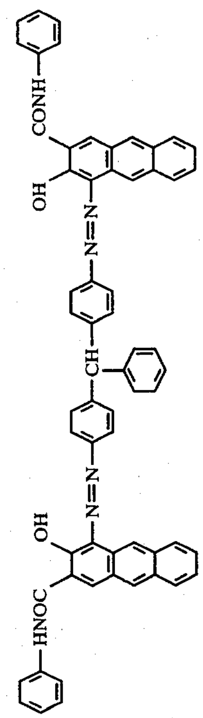
(12)
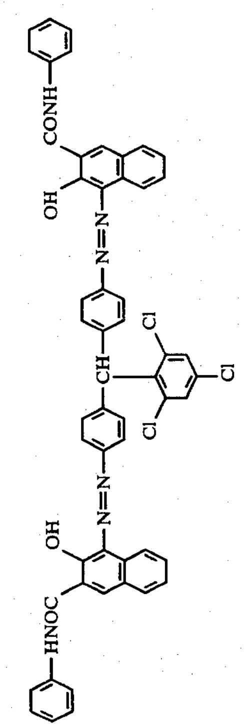
(13)
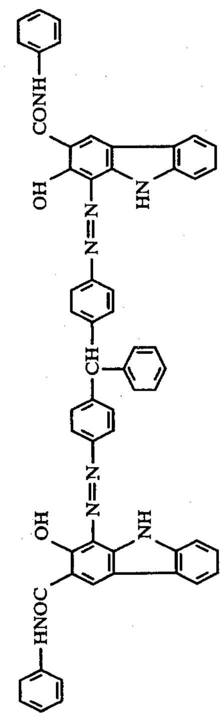
(14)
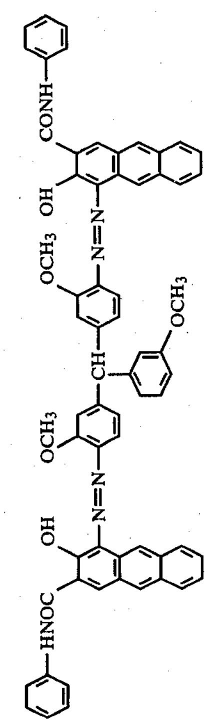
(15)
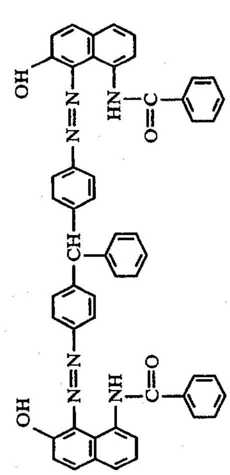
(16)
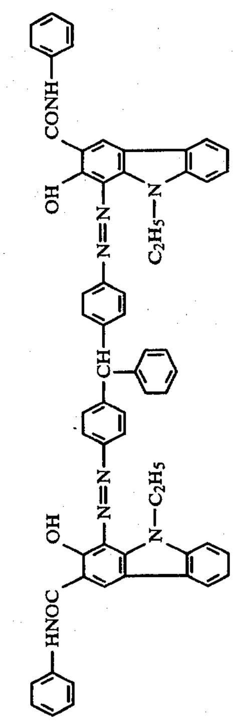
(17)
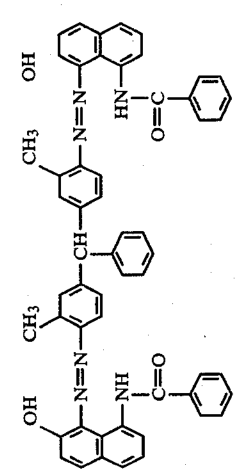
(18)
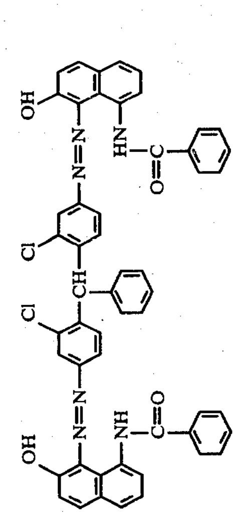

-continued
(19)
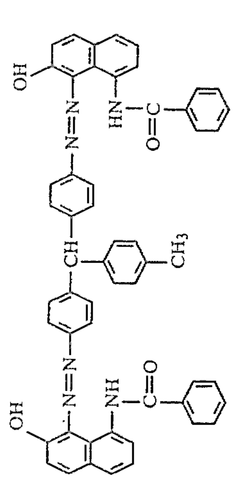
(20)
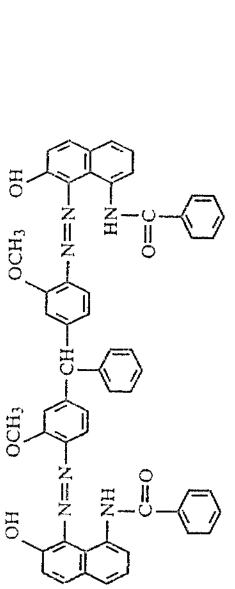
(21)
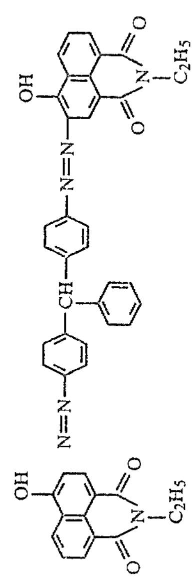
(22)
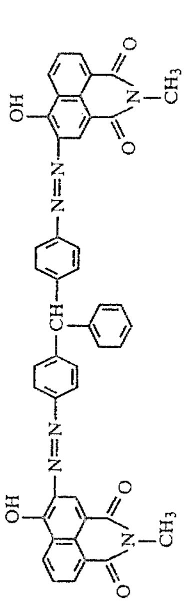
(23)
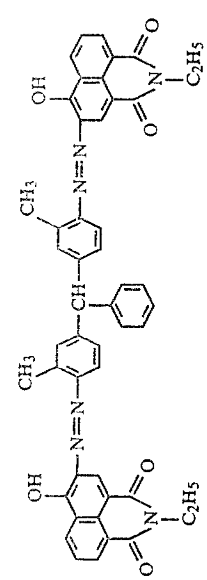
(24)
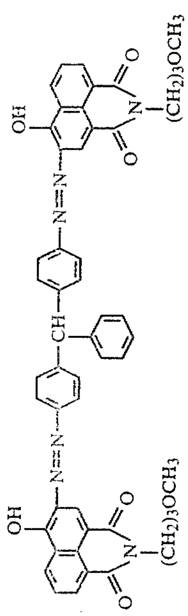
(25)
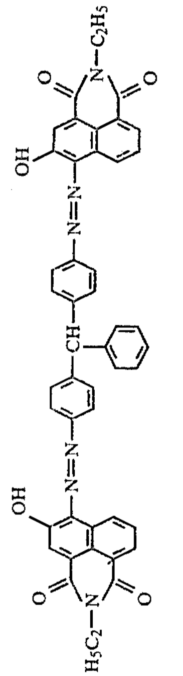
(26)
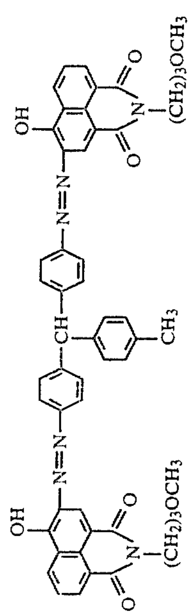
(27)
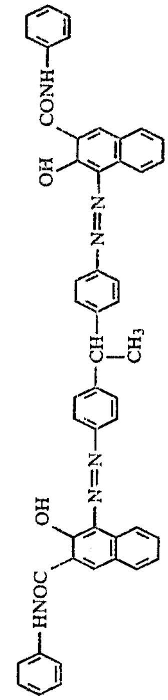
(28)
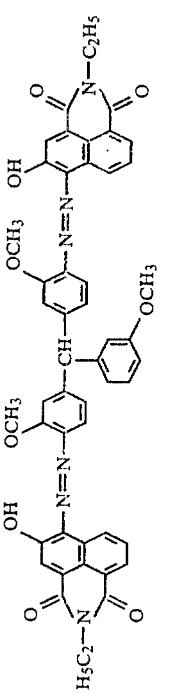

-continued
(29)
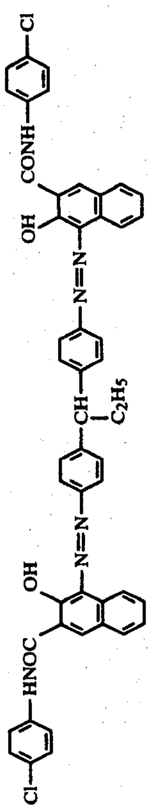
(30)
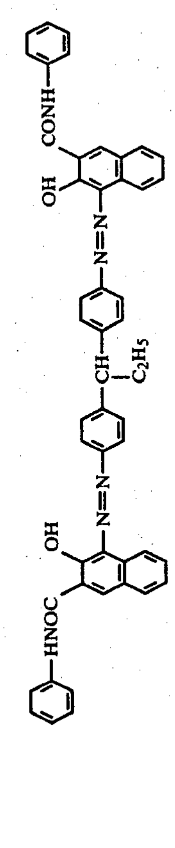
(31)
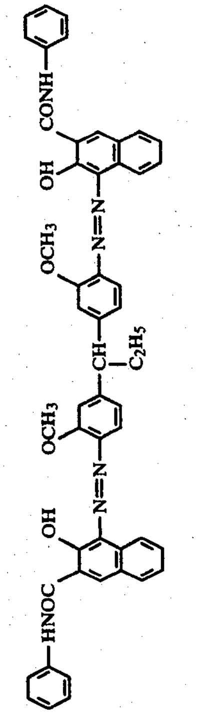
(32)
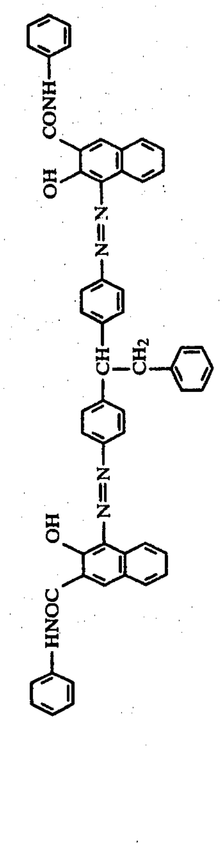
(33)
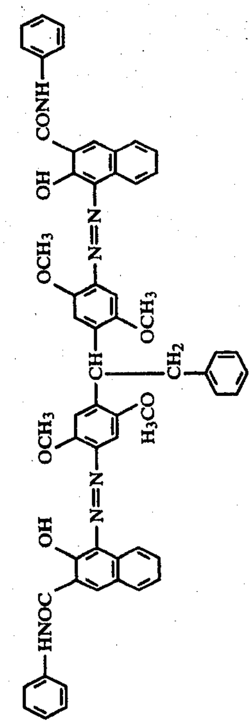
(34)
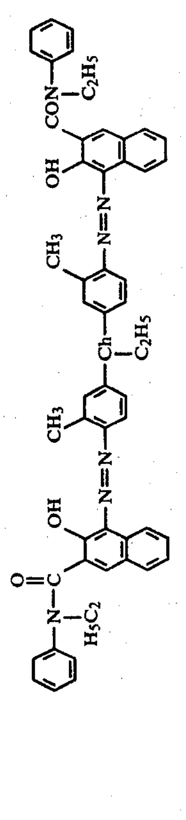
(35)
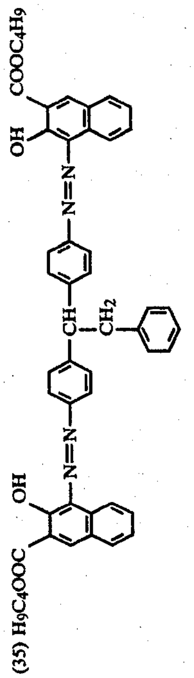
(36)
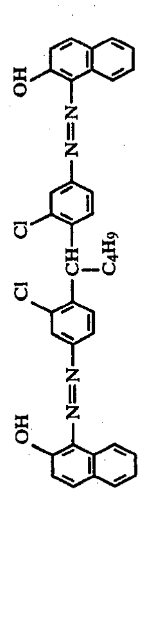
(37)
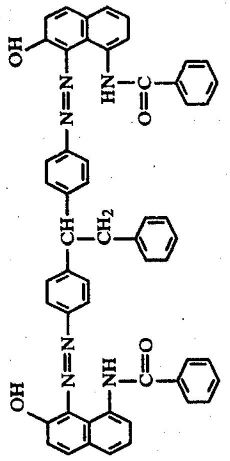
(38)
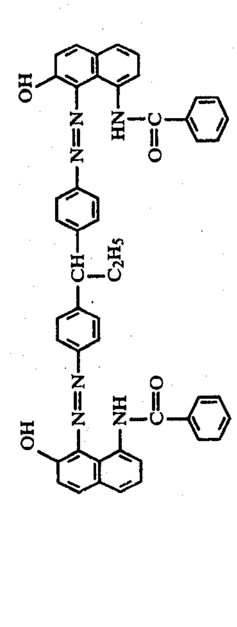

-continued
(39)
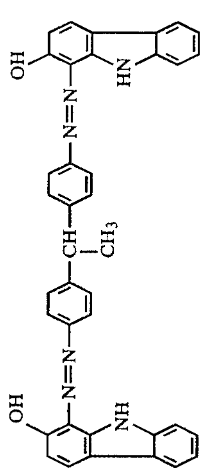
(40)
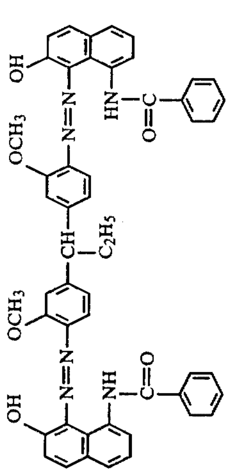
(41)
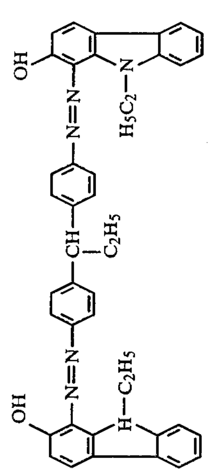
(42)
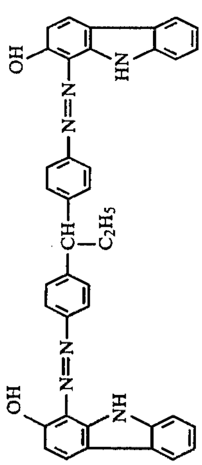
(43)
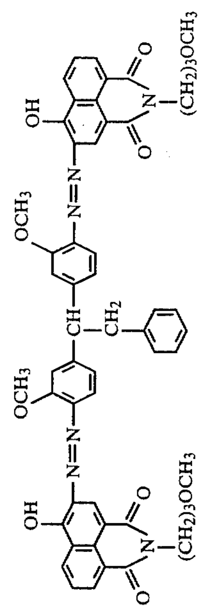
(44)
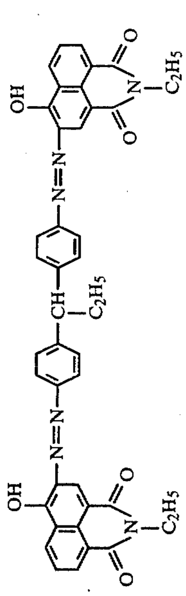
(45)
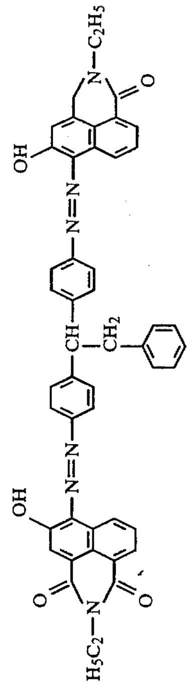
(46)
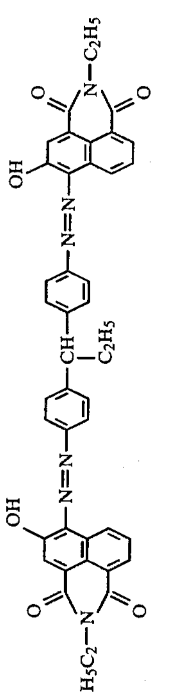
(47)
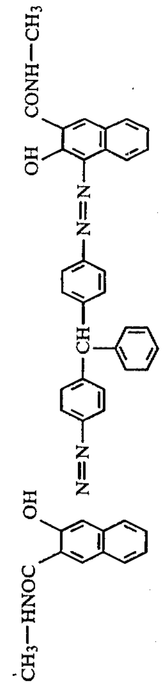
(48)
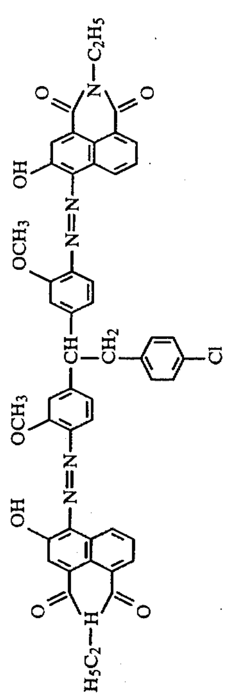

-continued
(49)
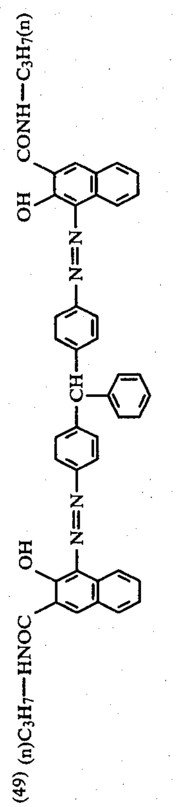
(50)
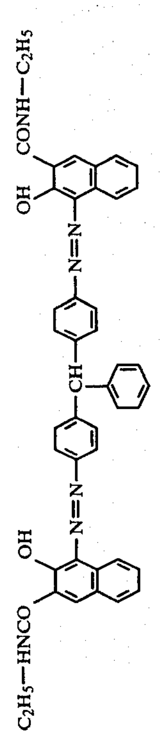
(51)
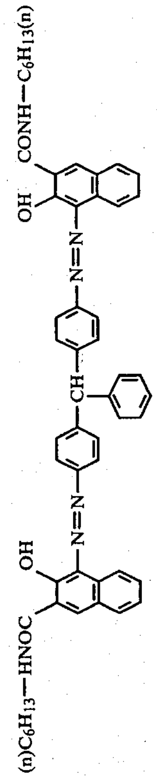
(52)
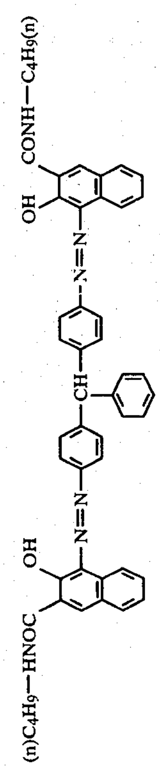
(53)
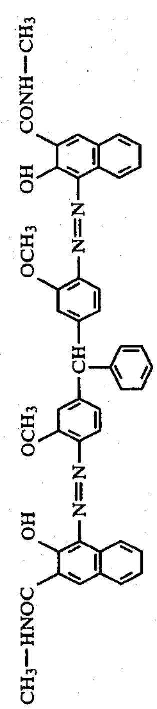
(54)
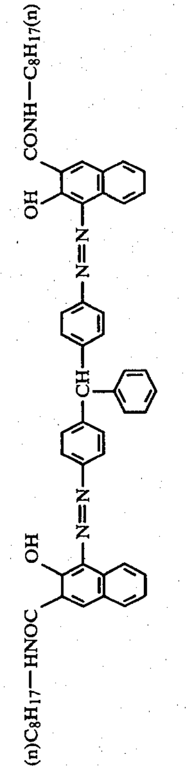
(55)
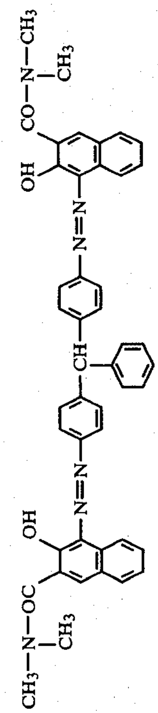
(56)
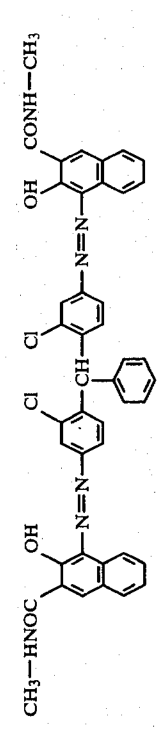
(57)
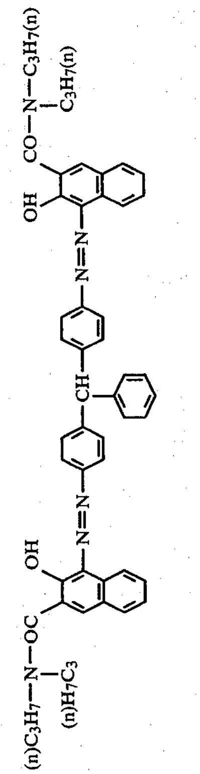
(58)
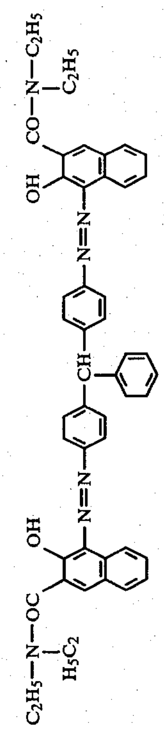
(59)
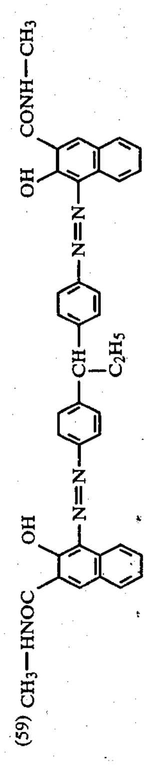
(60)
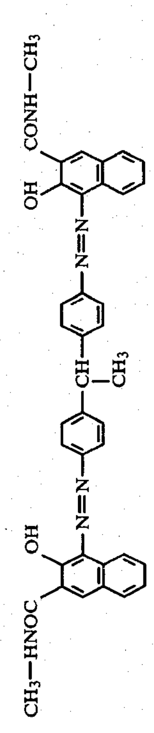

-continued
(61)
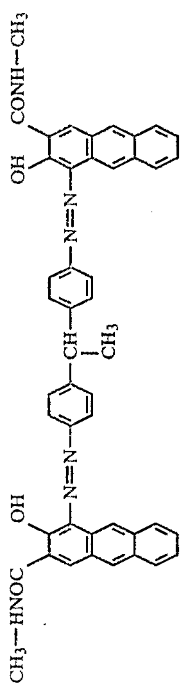
(62)
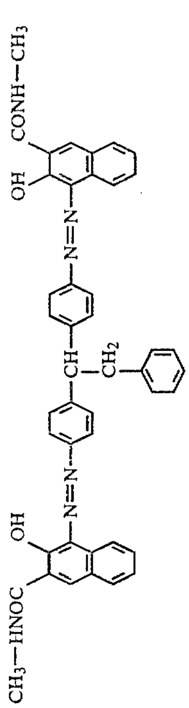
(63)
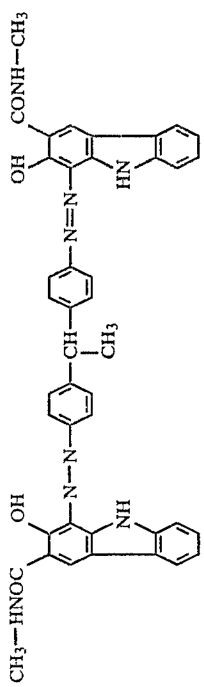
(64)
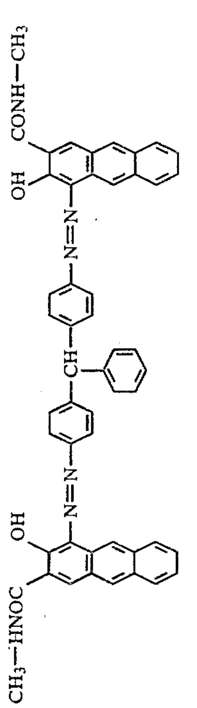
(65)
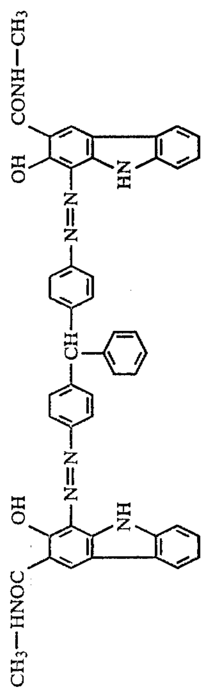
(66)
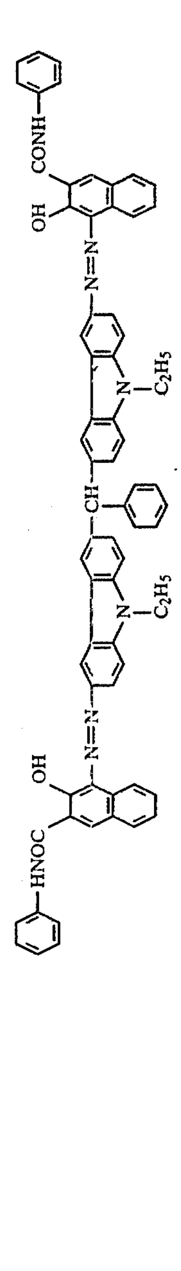
(67)
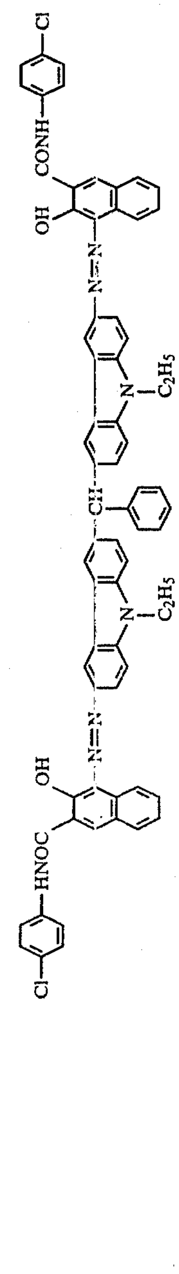

-continued
(68)
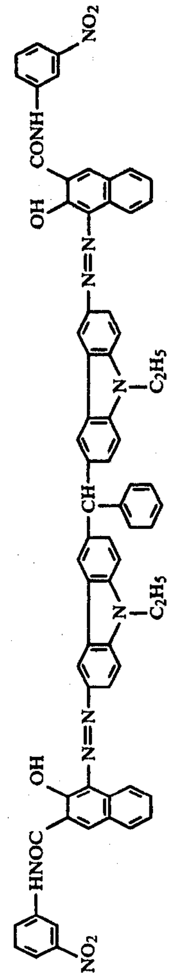
(69)
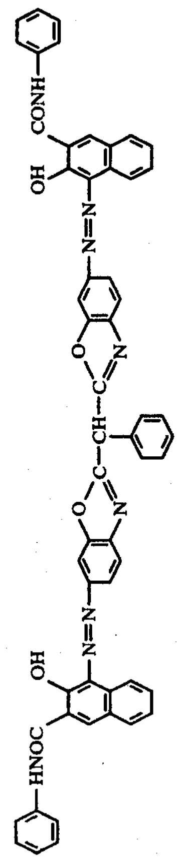
(70)
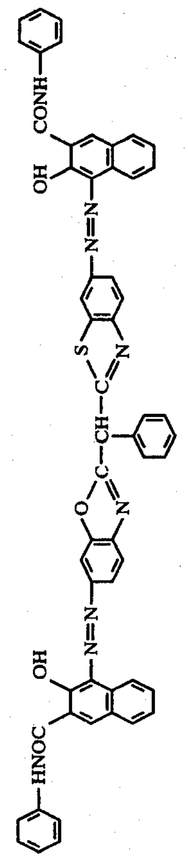
(71)
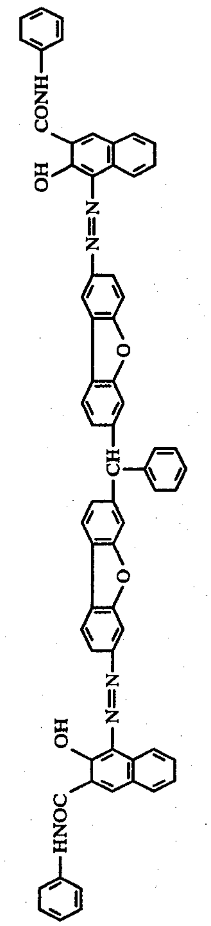
(72)
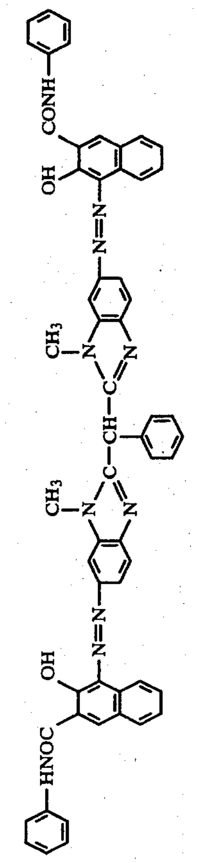

-continued
(73)
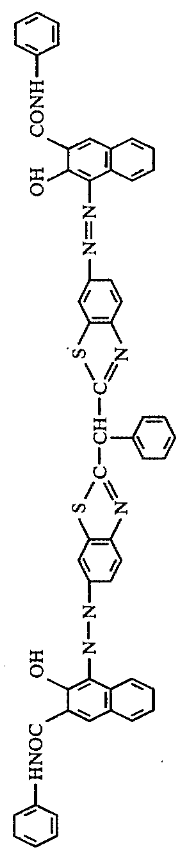
(74)
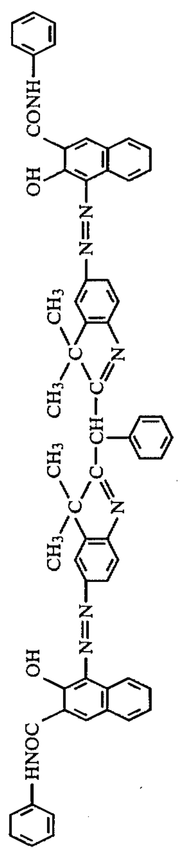

(75)
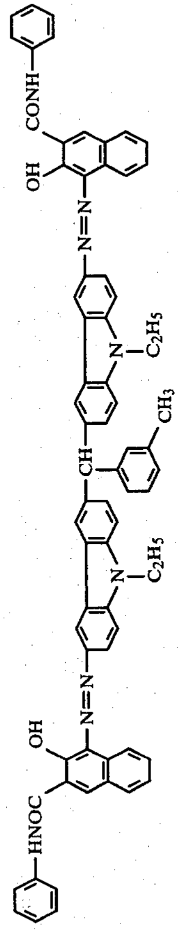
(76)
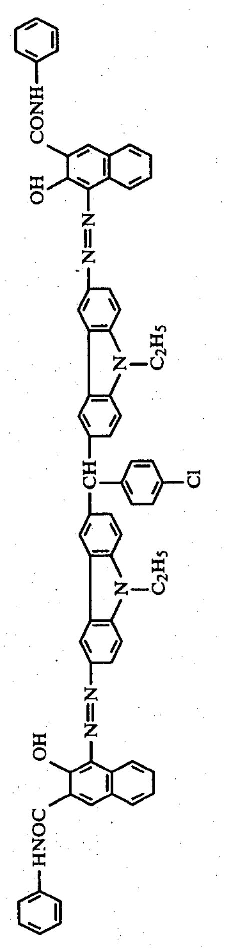
(77)
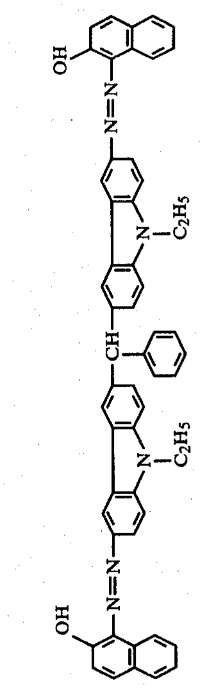
(78)
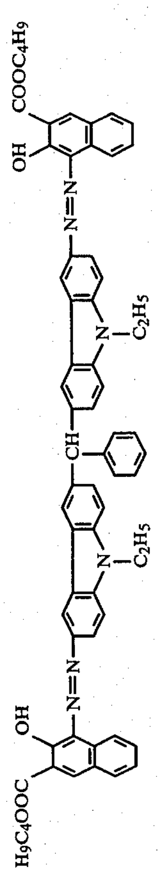
(79)
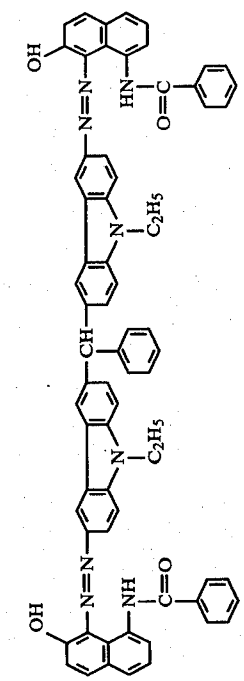
(80)
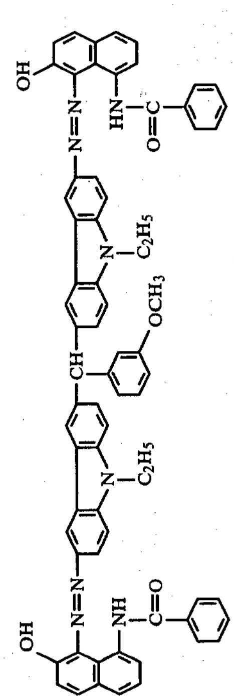
(81)
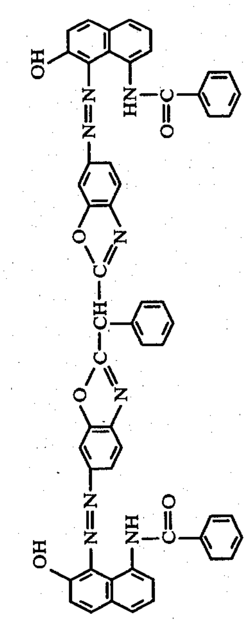
(82)
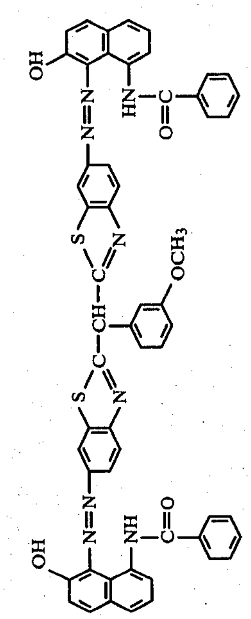

-continued
(83)
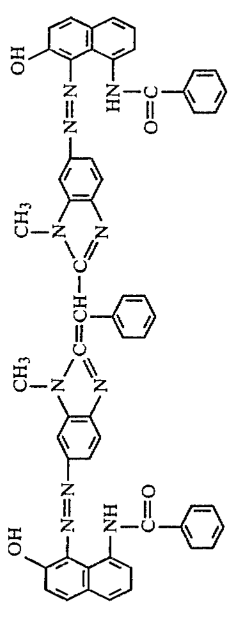
(84)
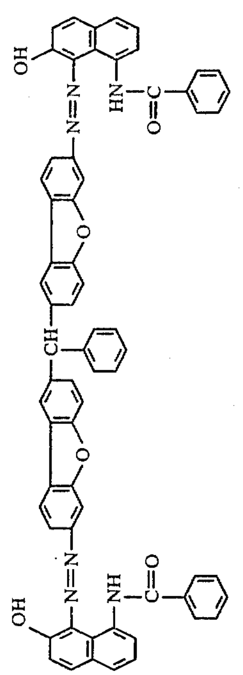
(85)
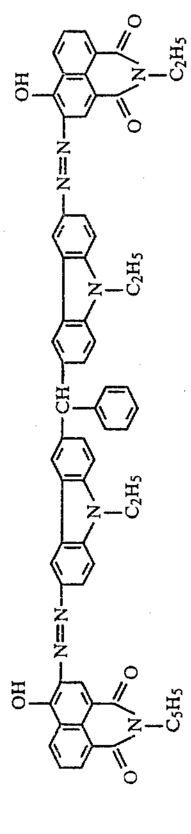
(86)
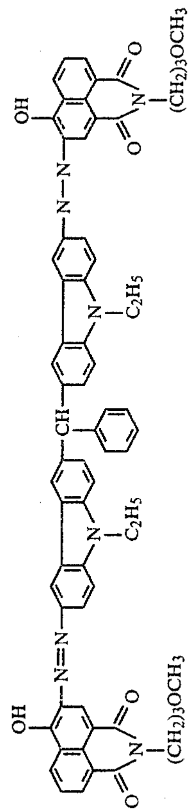
(87)
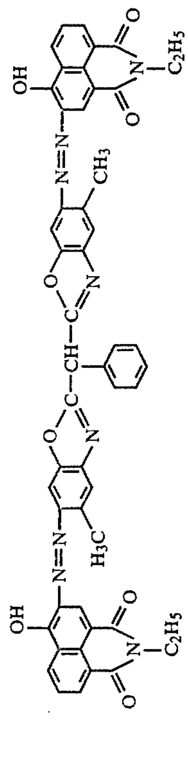
(88)
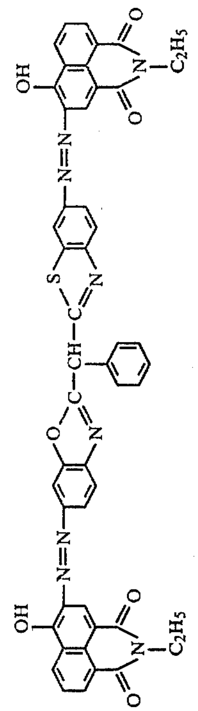
(89)
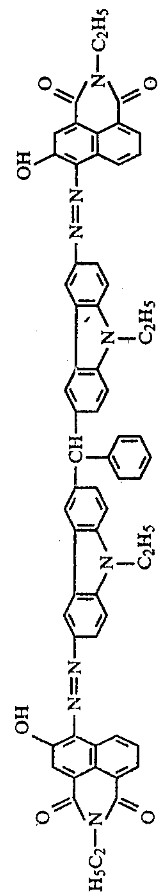
(90)
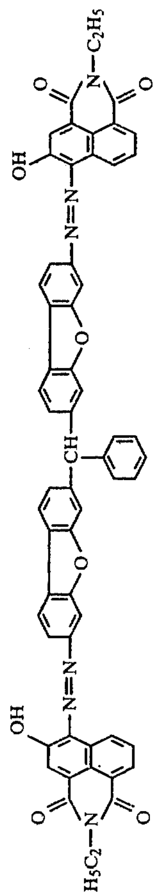

-continued
(91)
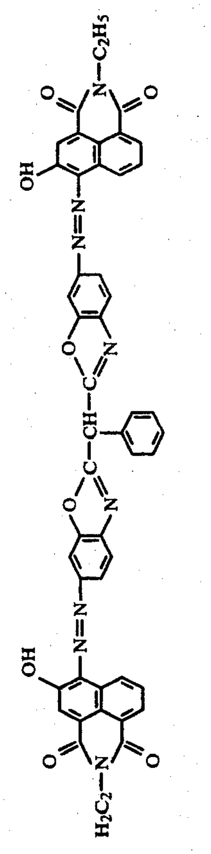
(92)
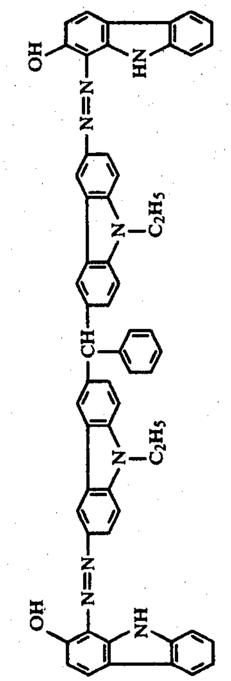
(93)
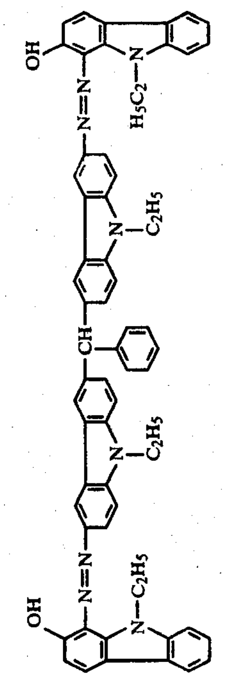
(94)
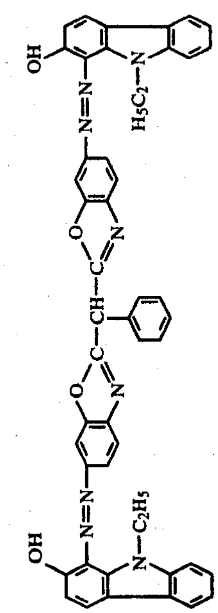
(95)
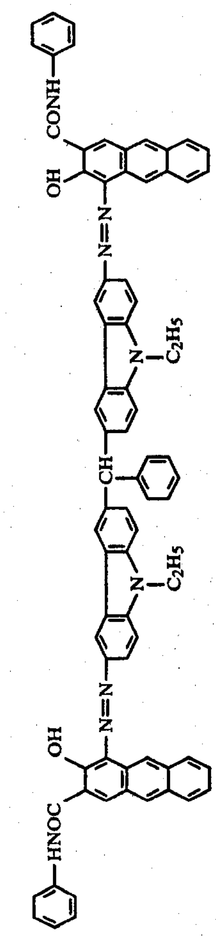
(96)
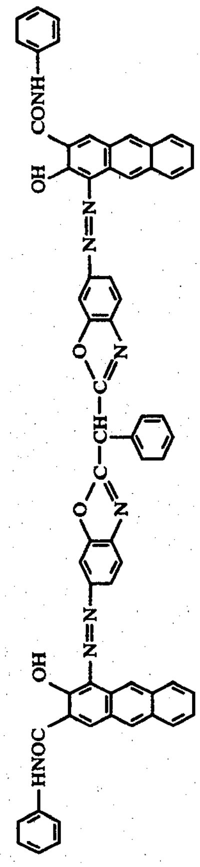
(97)
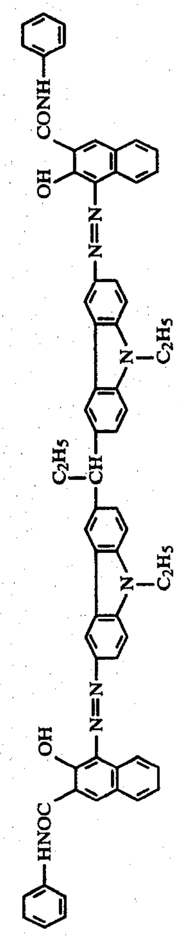

-continued
(98)
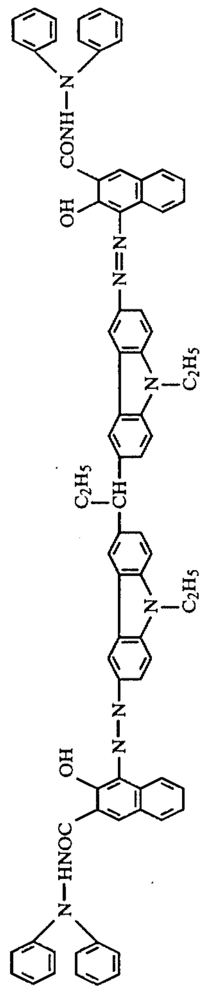
(99)
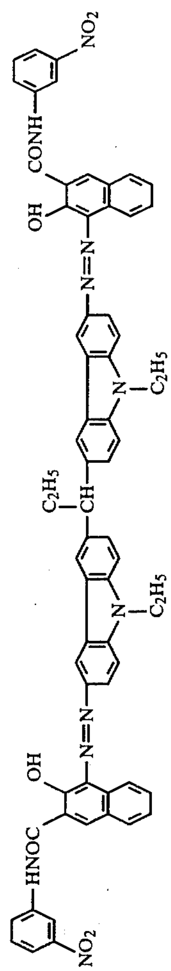
(100)
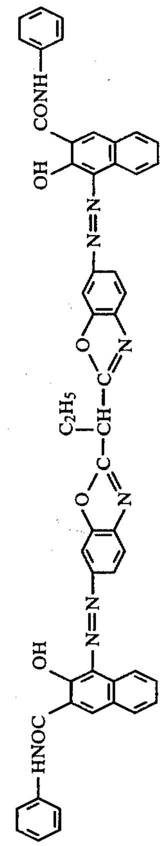
(101)
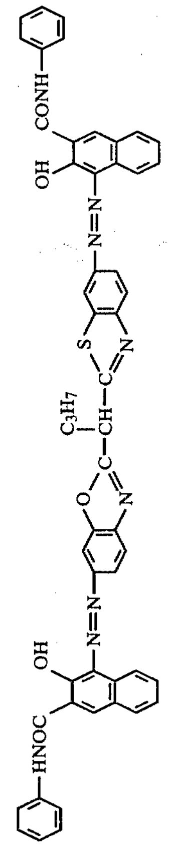
(102)
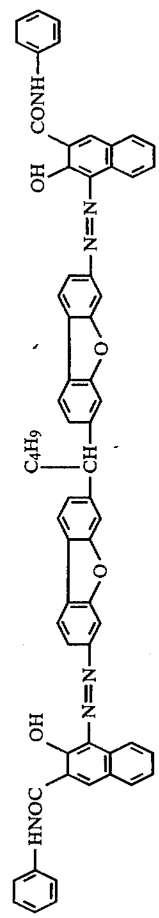
(103)
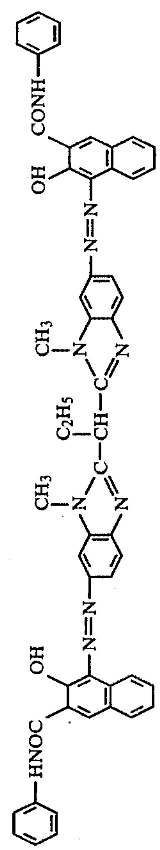

-continued
(104)
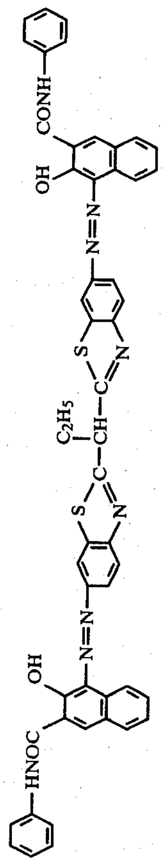
(105)
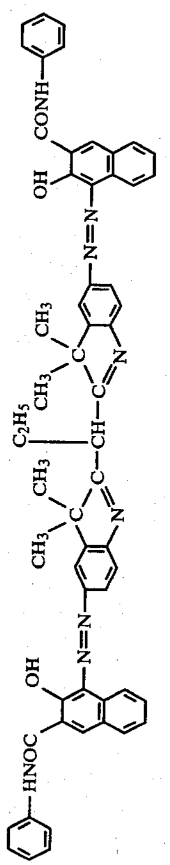
(106)
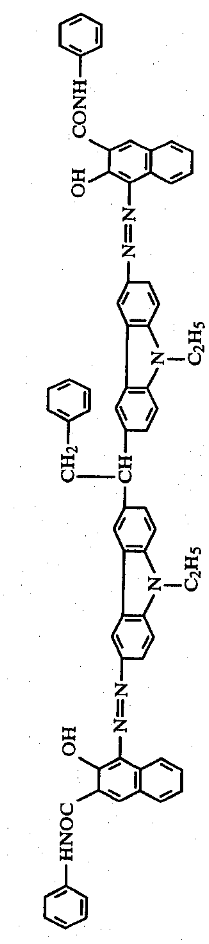
(107)
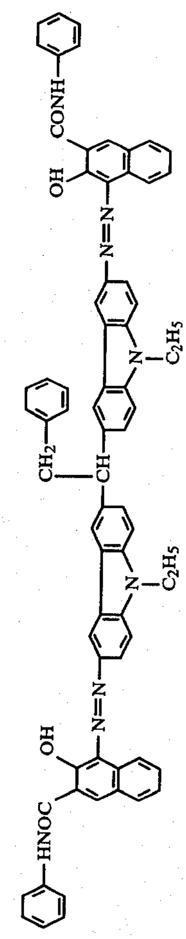
(109)
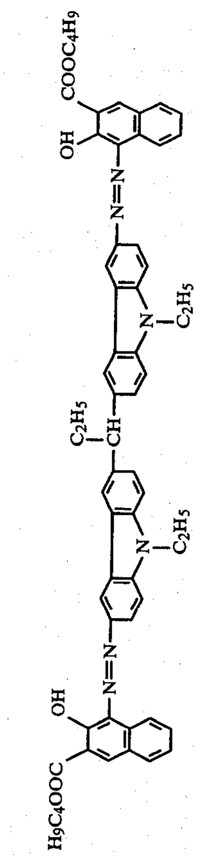
(108)
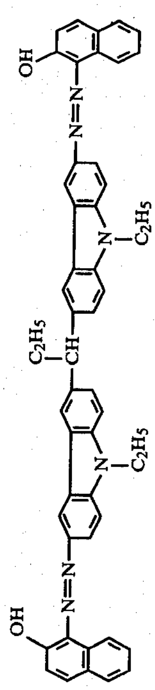

-continued
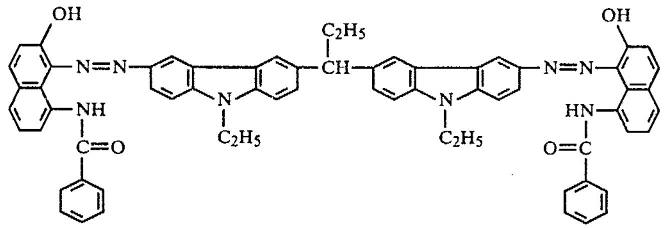
(110)
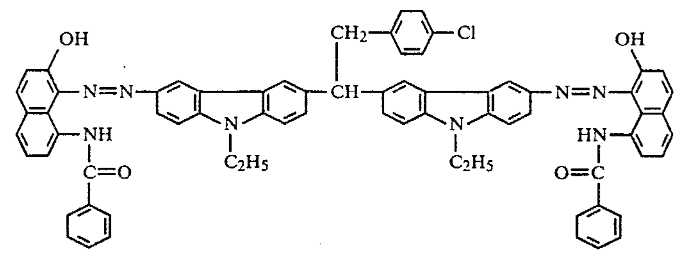
(111)
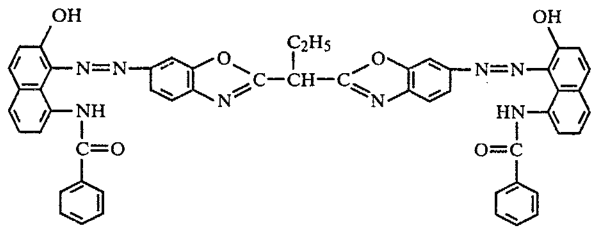
(112)
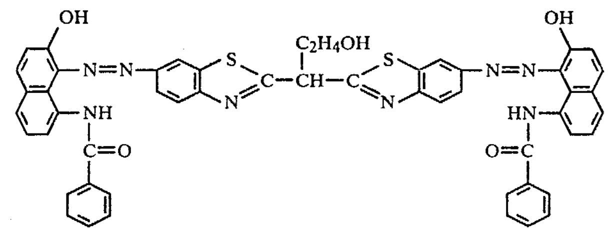
(113)
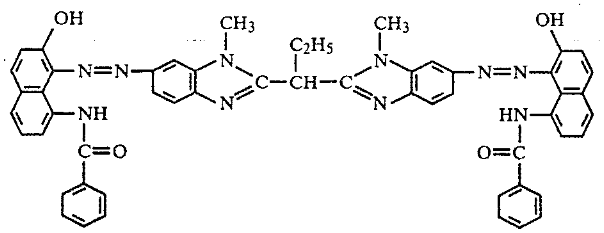
(114)
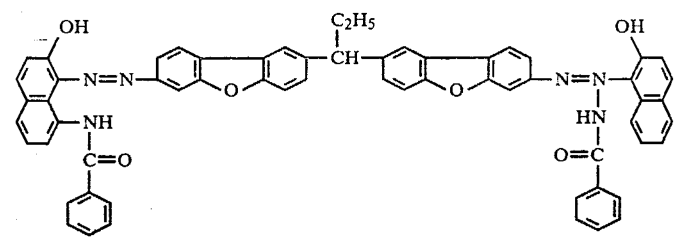
(115)
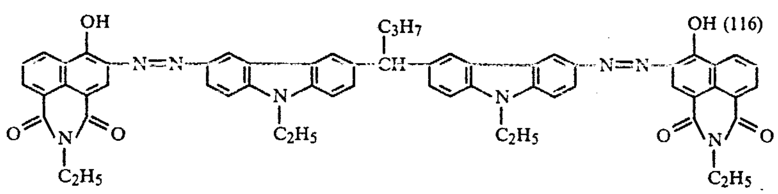
(116)
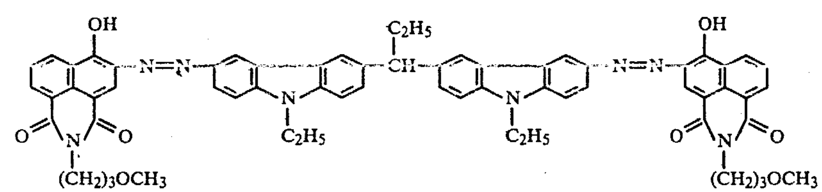
(117)
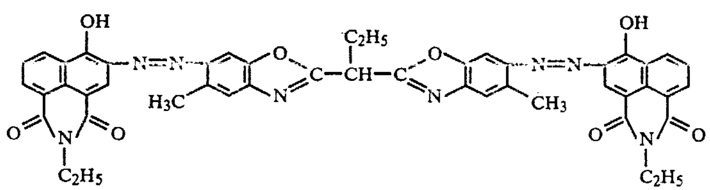
(118)
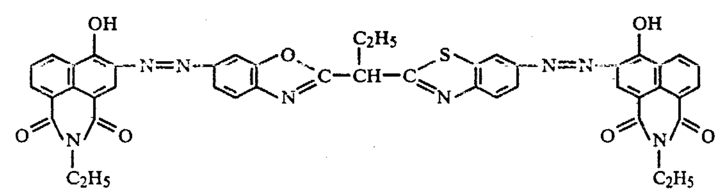
(119)

-continued
(120)
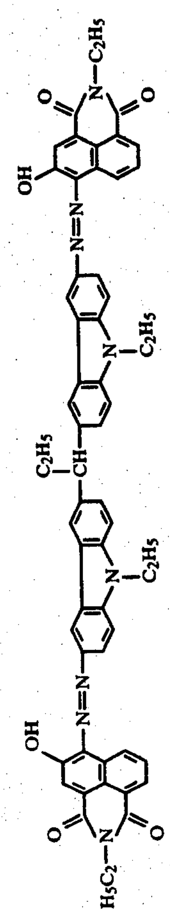
(121)
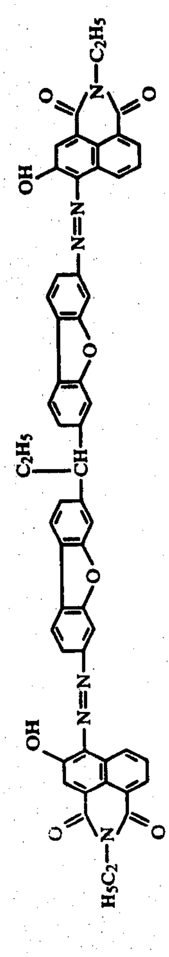
(122)
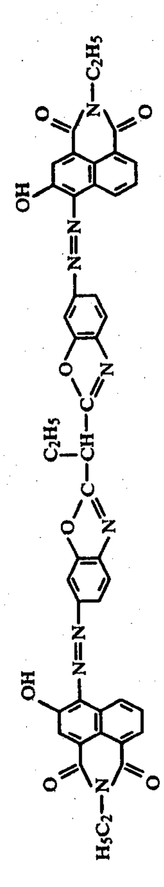
(123)
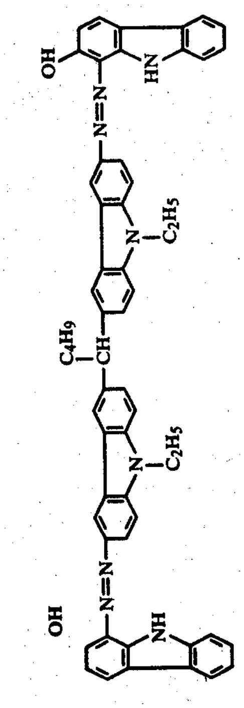
(124)
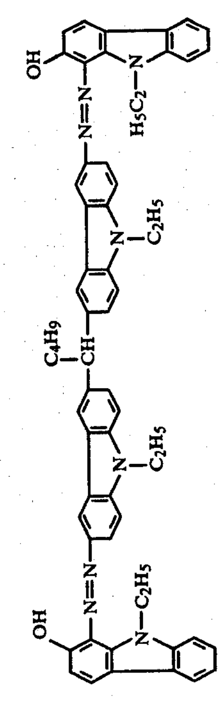
(125)
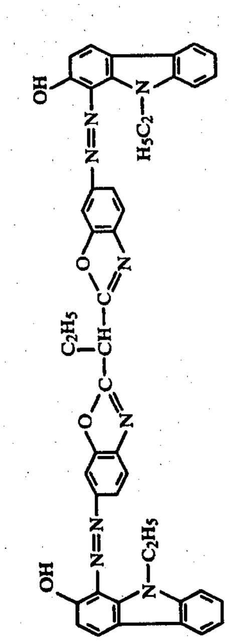
(126)
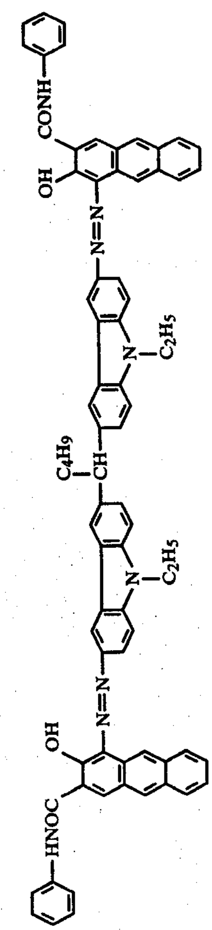

-continued
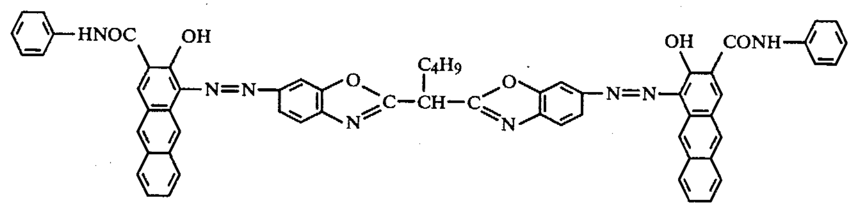
(127)
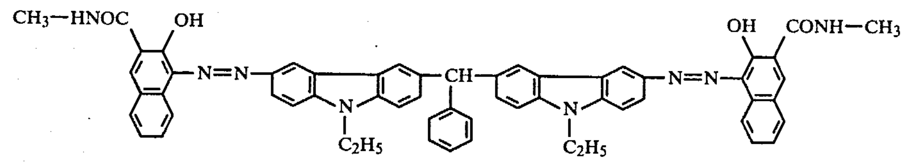
(128)
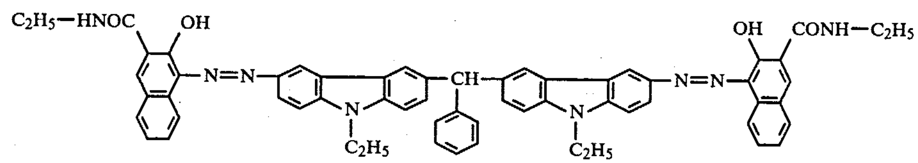
(129)
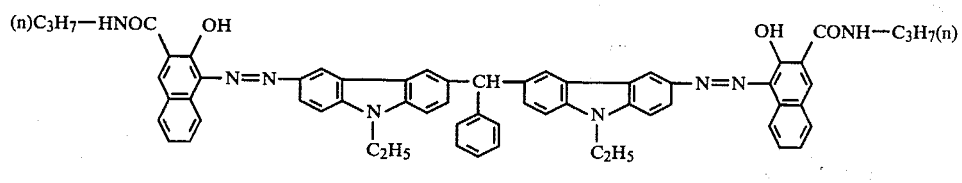
(130)
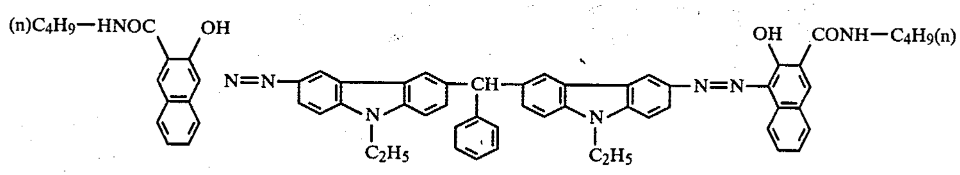
(131)
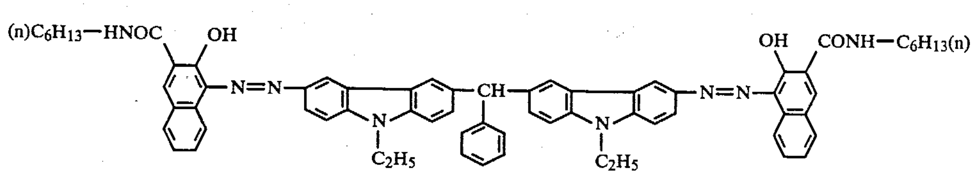
(132)

-continued
(133)
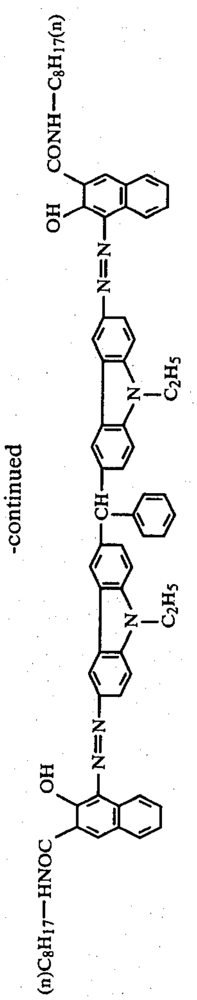
(134)
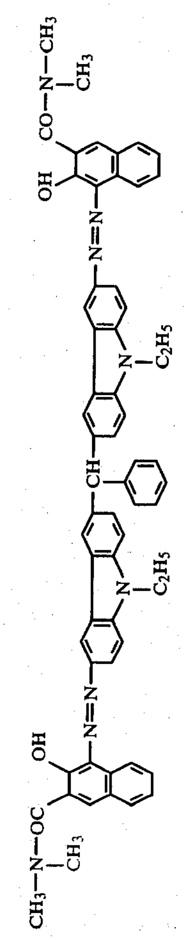
(135)
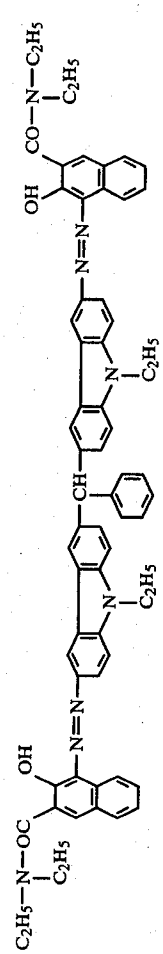
(136)
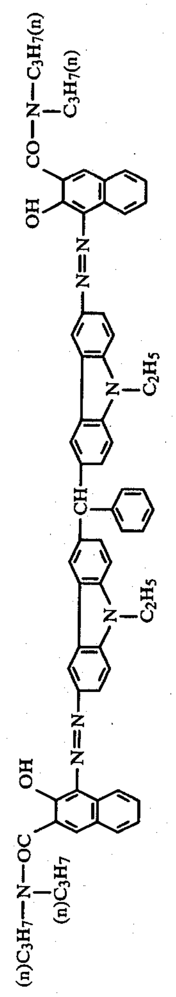
(137)
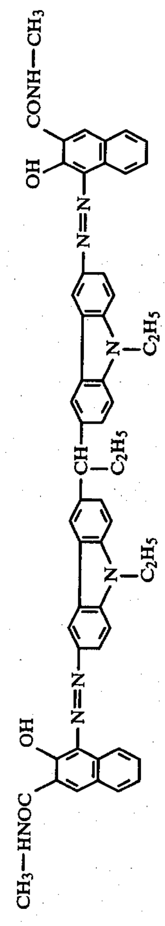
(138)
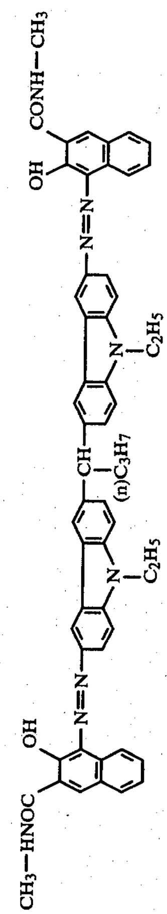

-continued
(139)
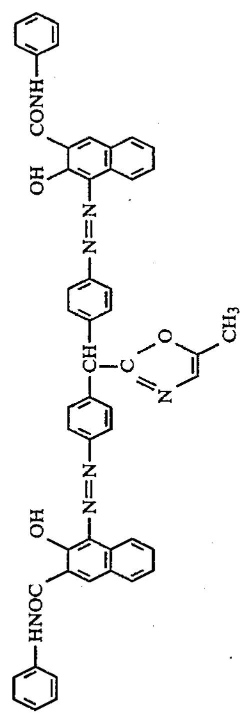
(140)
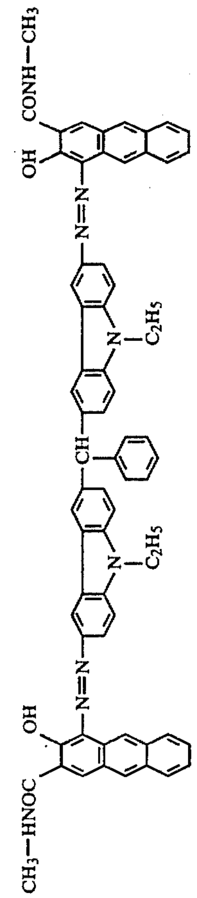
(141)
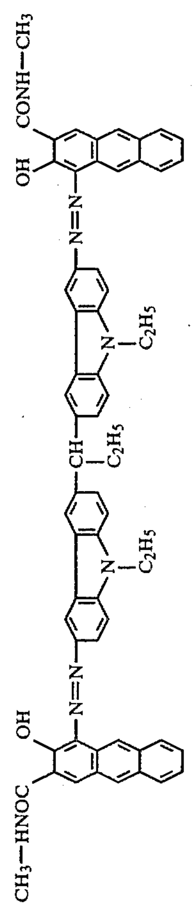
(142)
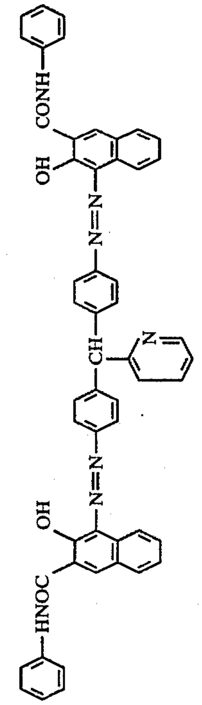
(143)
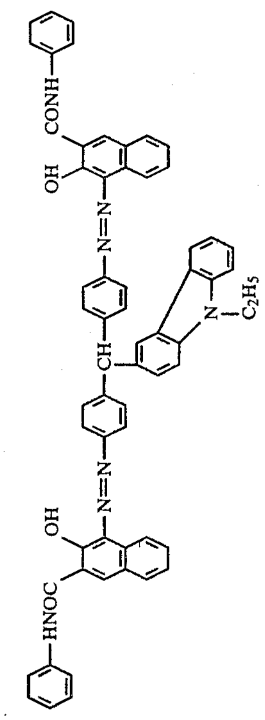
(144)
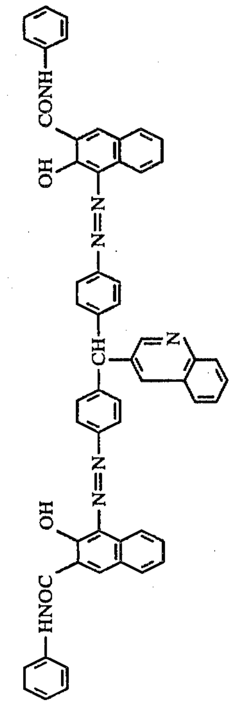
(145)
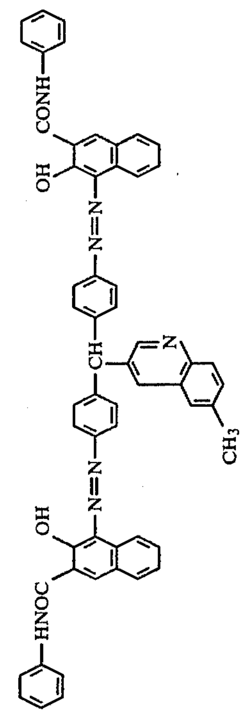
(146)
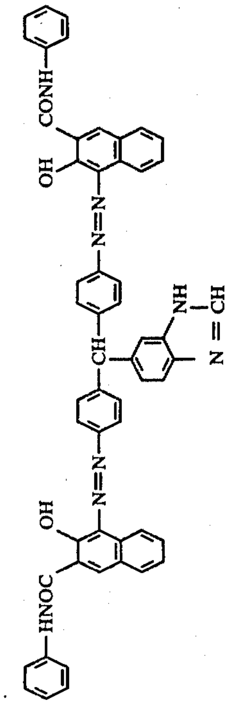

-continued
(147)
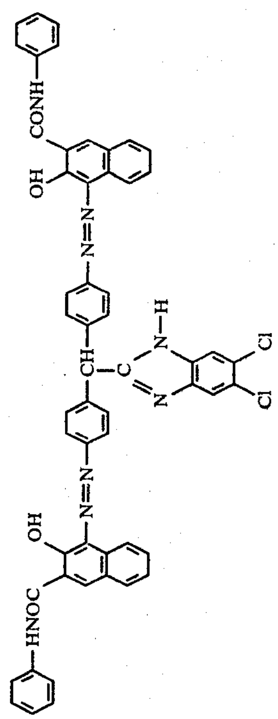
(148)
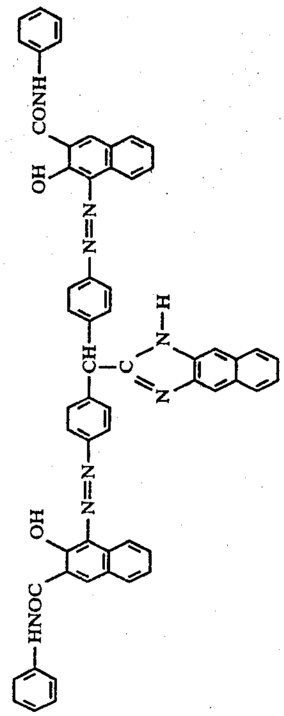
(149)
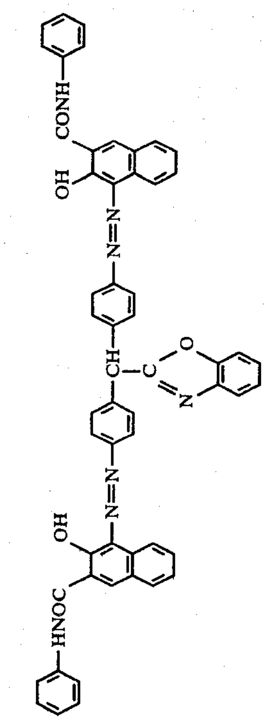
(150)
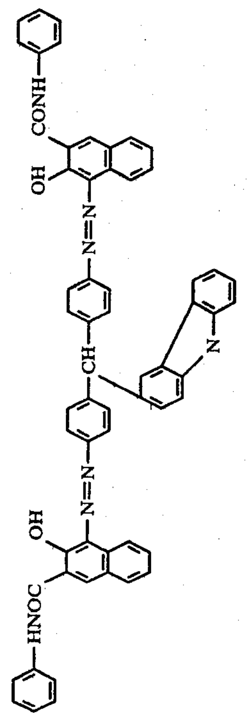

(151)
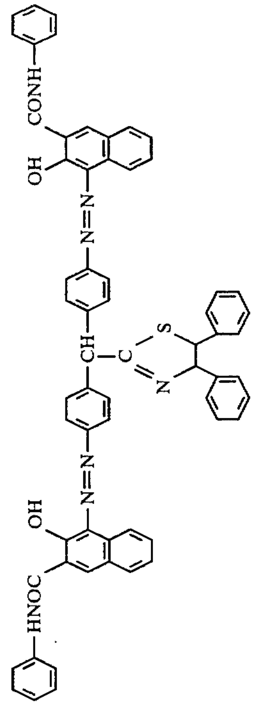
(152)
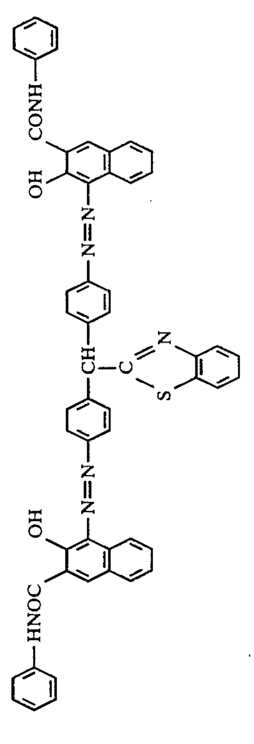
(153)
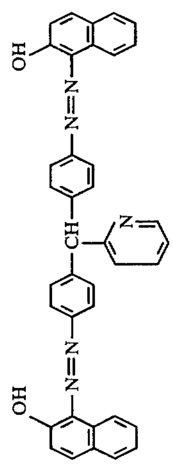
(154)
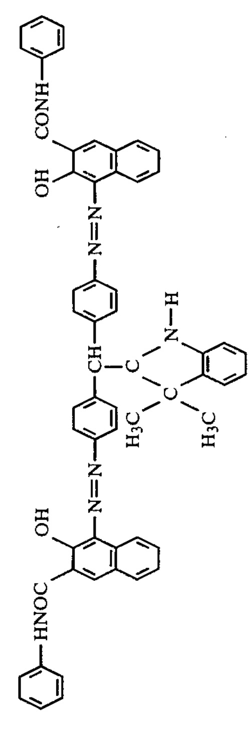
(155)
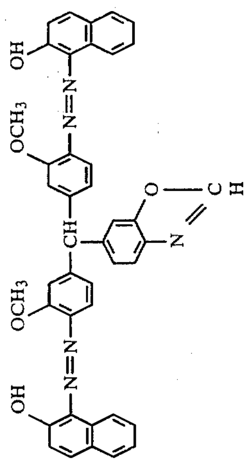
(156)
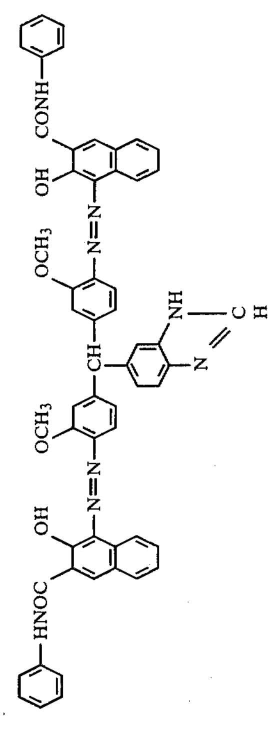
(157)
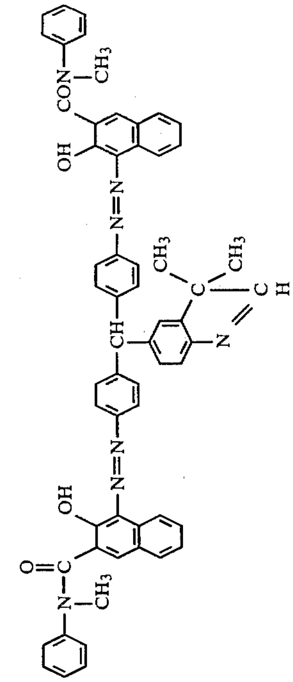
(158)
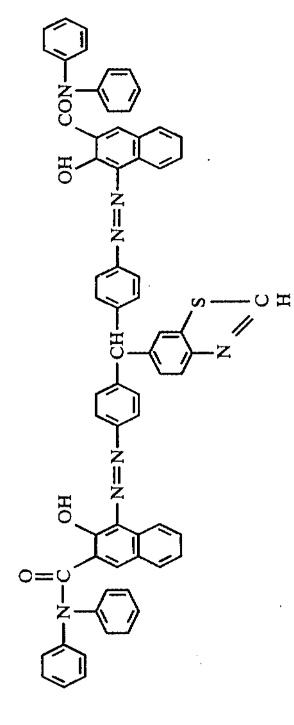

-continued
(159)
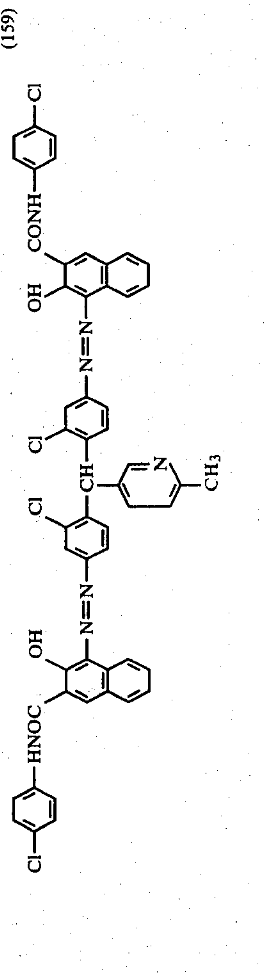
(160)
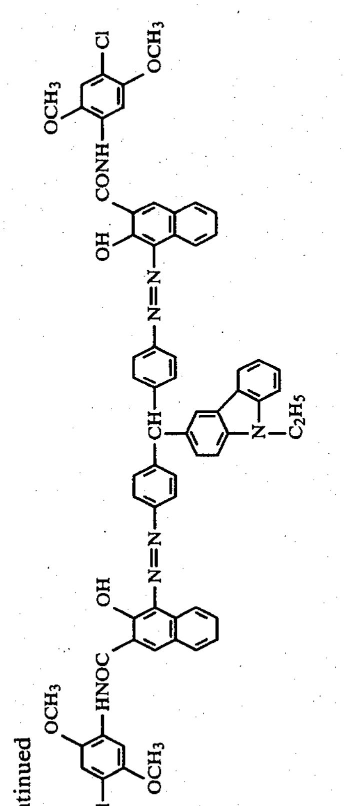
(161)
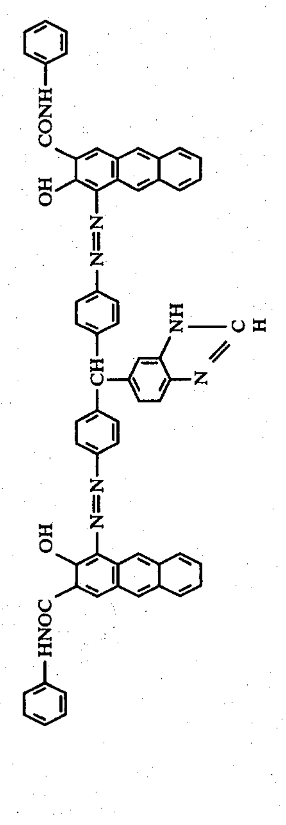
(162)
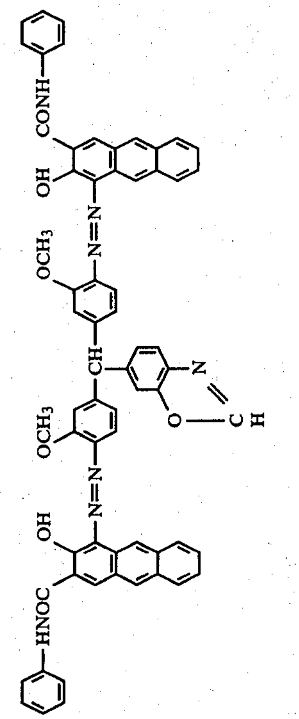
(163)
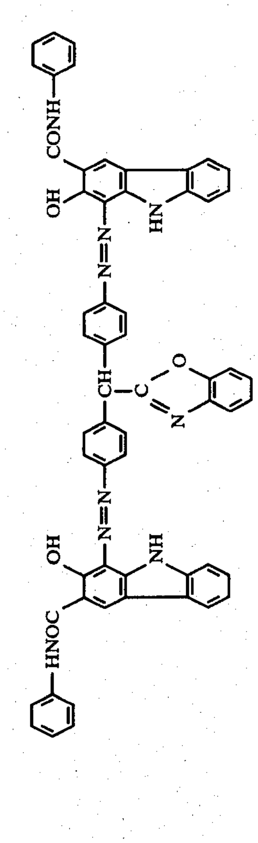
(164)
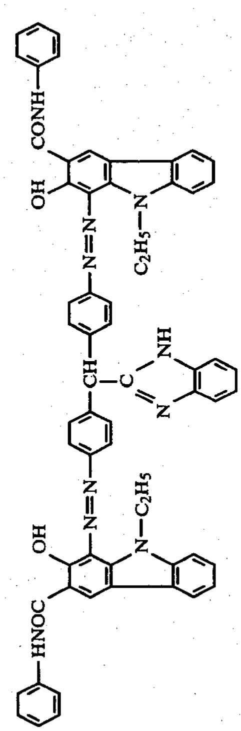
(165)
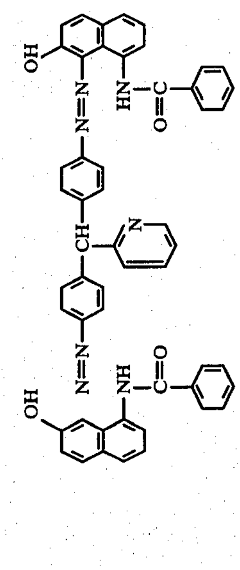
(166)
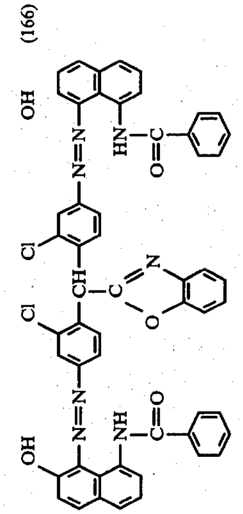
(167)
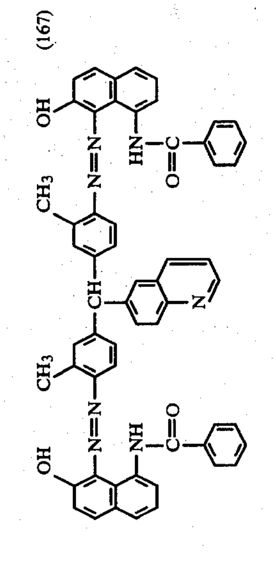

-continued
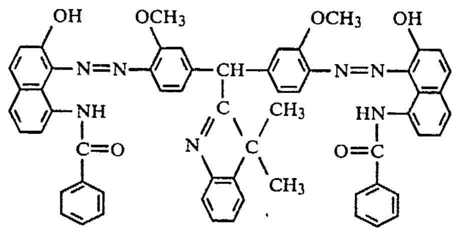
(168) 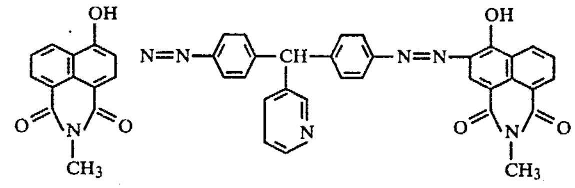 (169)
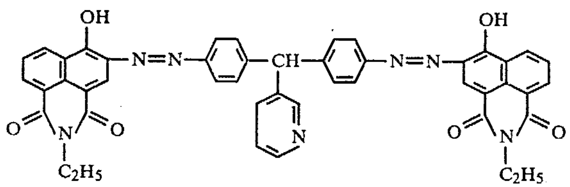
(170) 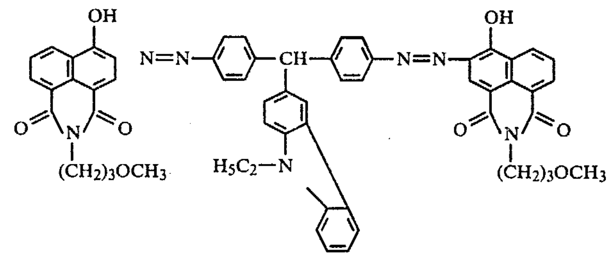 (171)
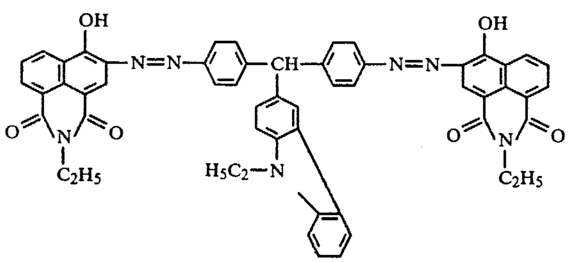
(172) 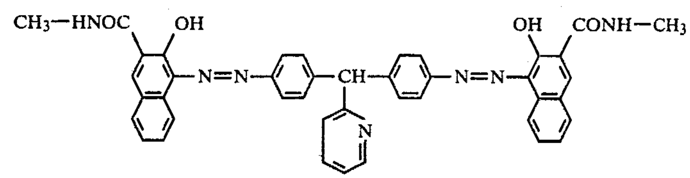 (173)
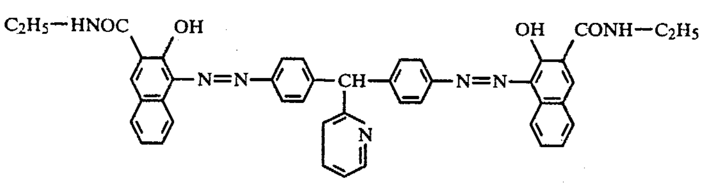
(174) 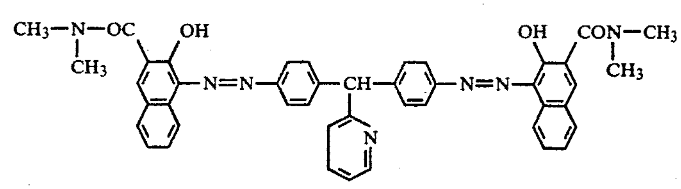 (175)

-continued
(176)
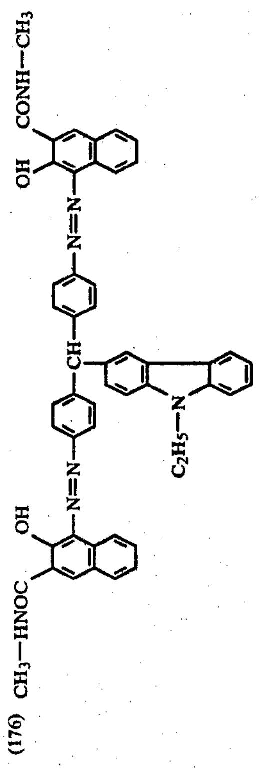
(177)
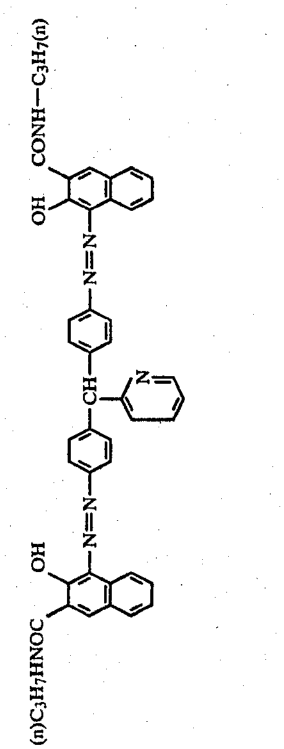
(178)
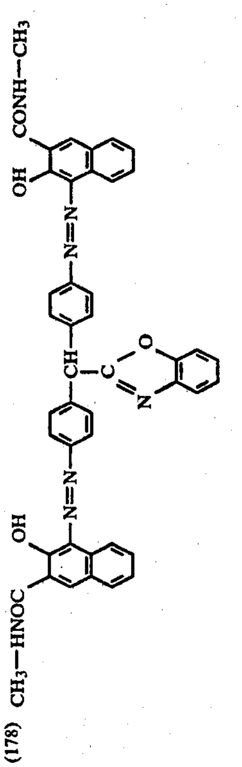
(179)
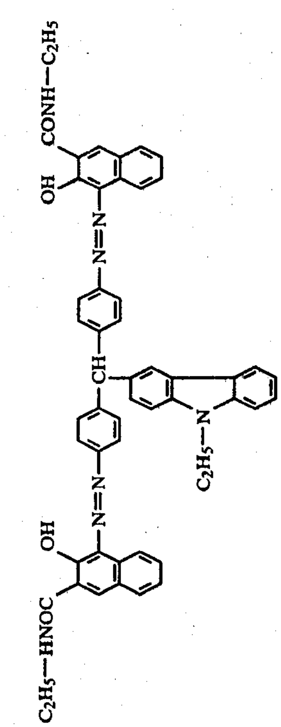
(180)
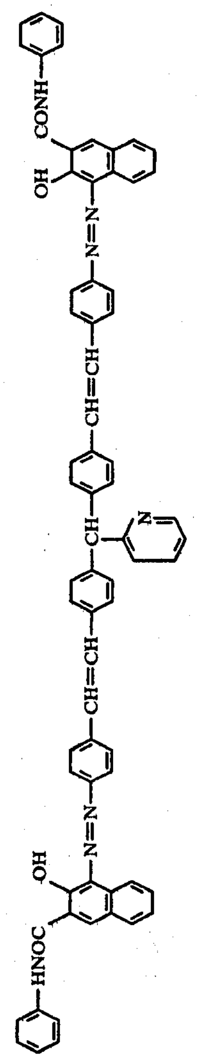
(181)
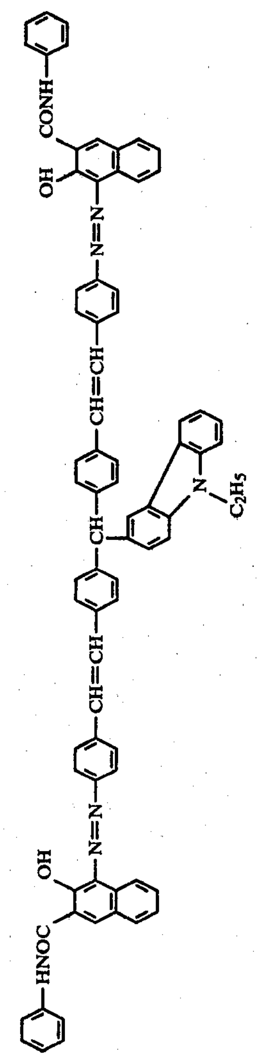

-continued
(182)
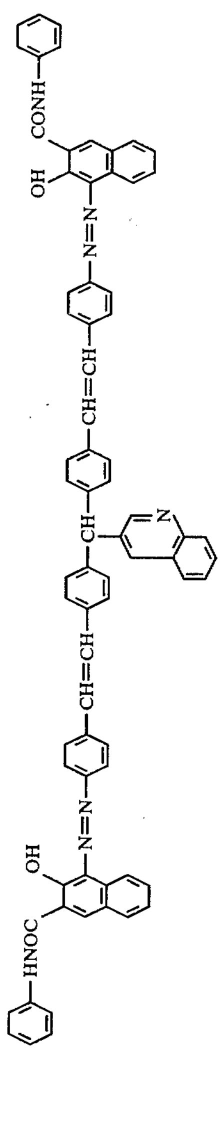
(183)
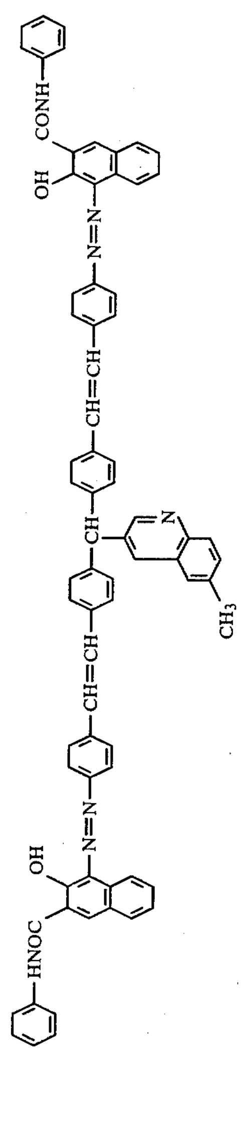
(184)
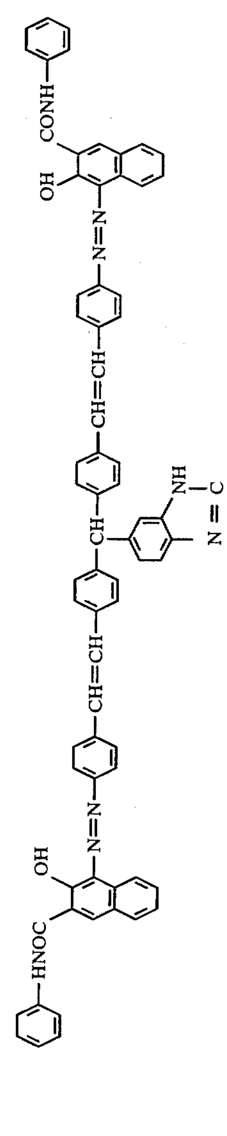
(185)
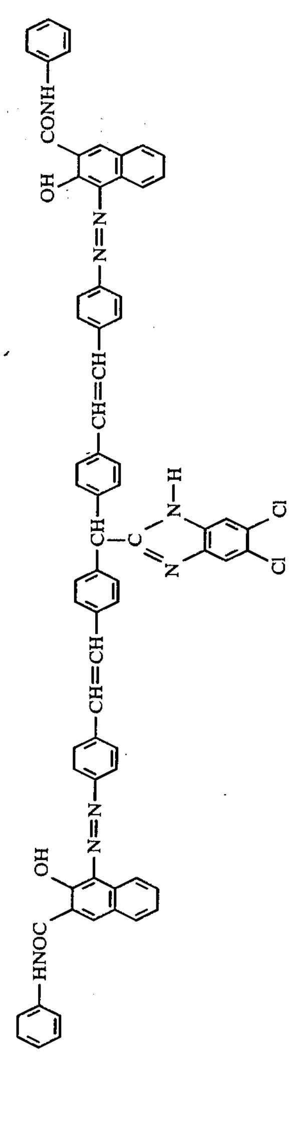

-continued
(186)
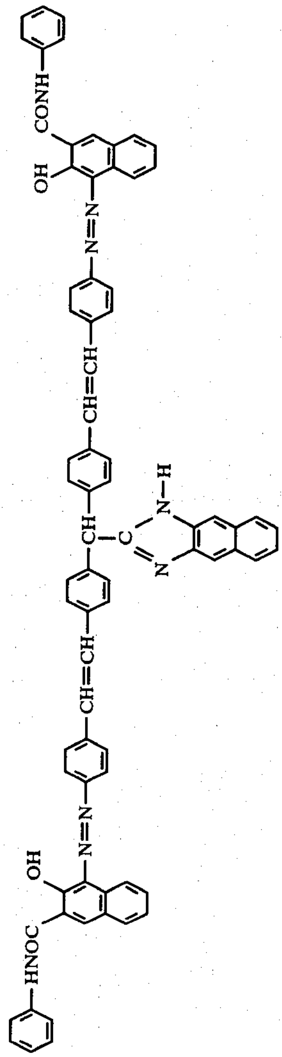
(187)
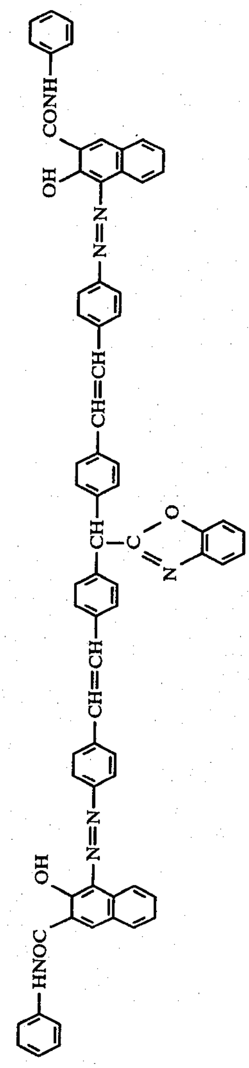
(188)
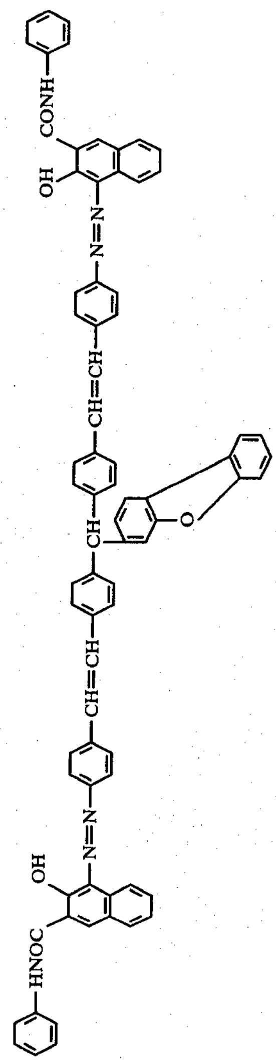
(189)
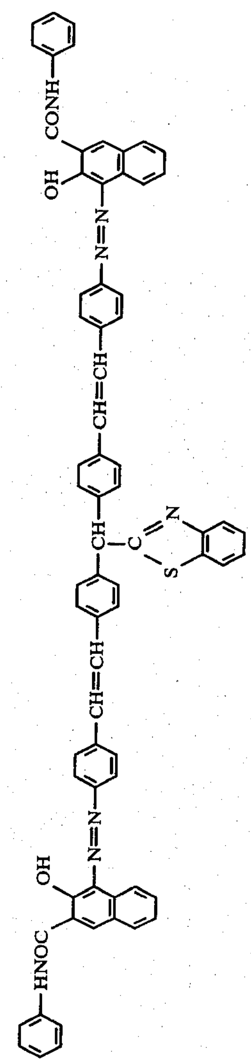

-continued
(190)
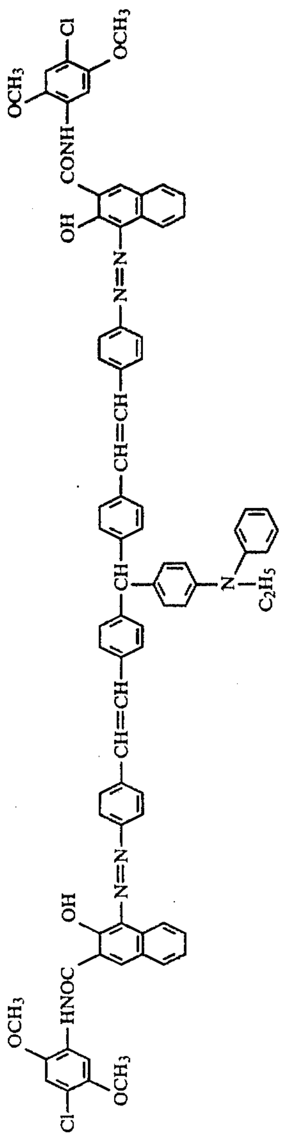
(191)
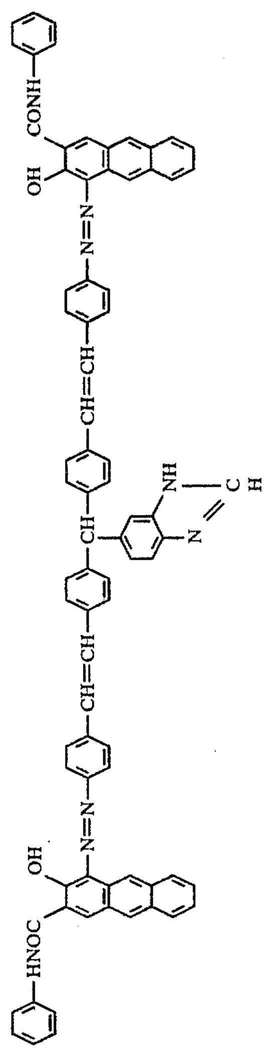
(192)
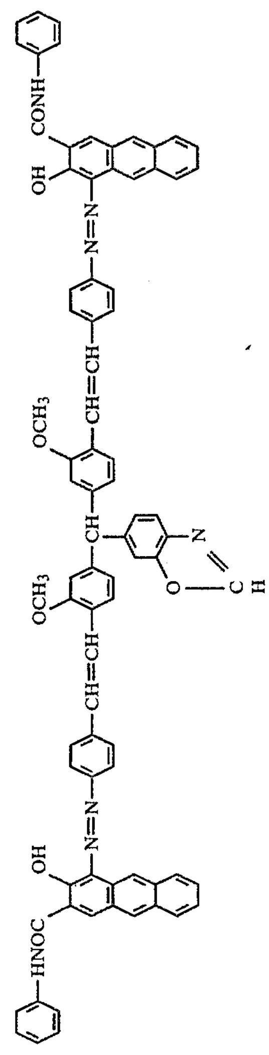
(193)
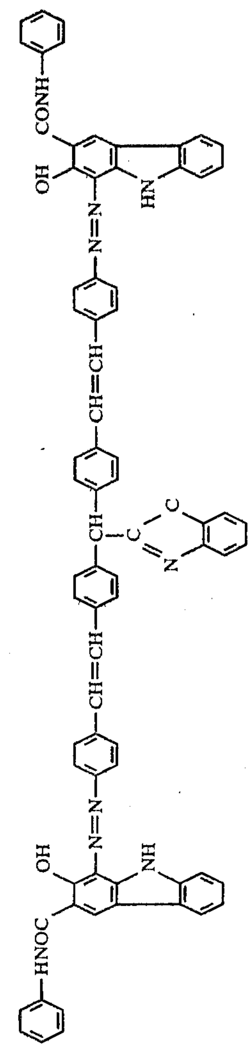

-continued
(194)
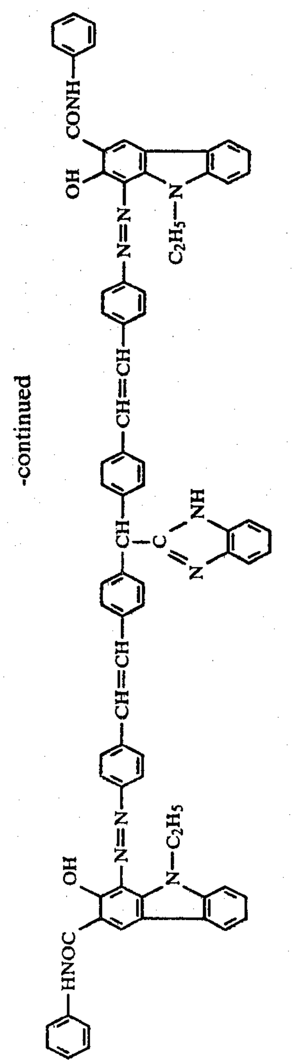
(195)
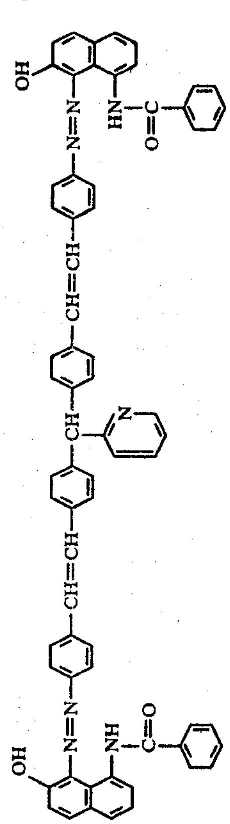
(196)
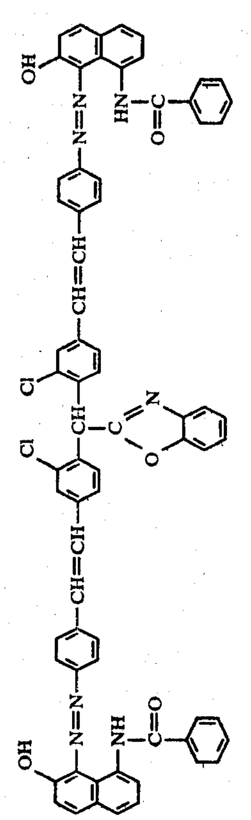
(197)
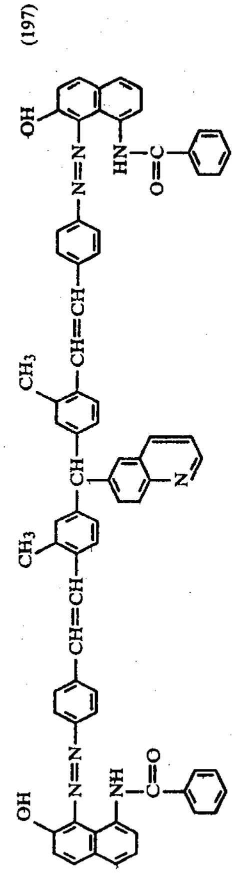
(198)
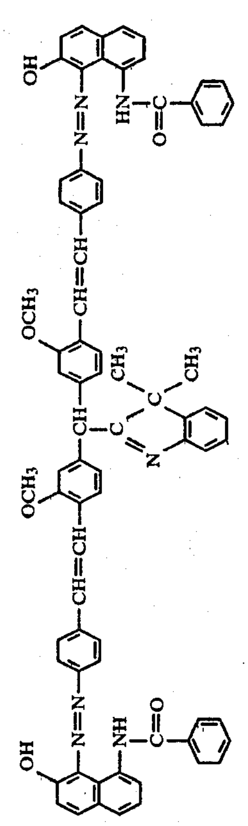
(199)
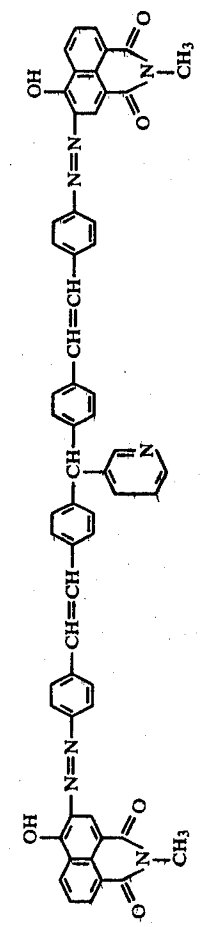
(200)
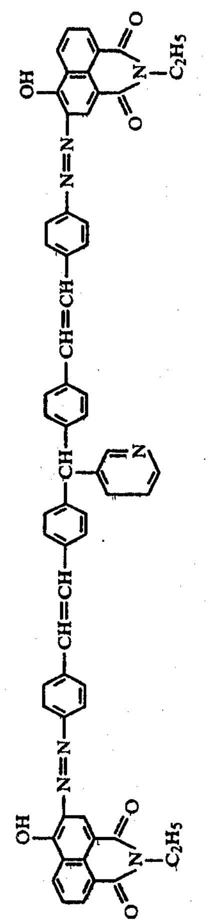

-continued
(201)
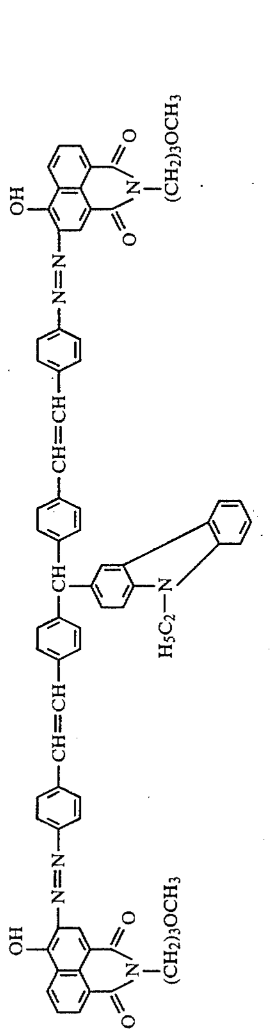
(202)
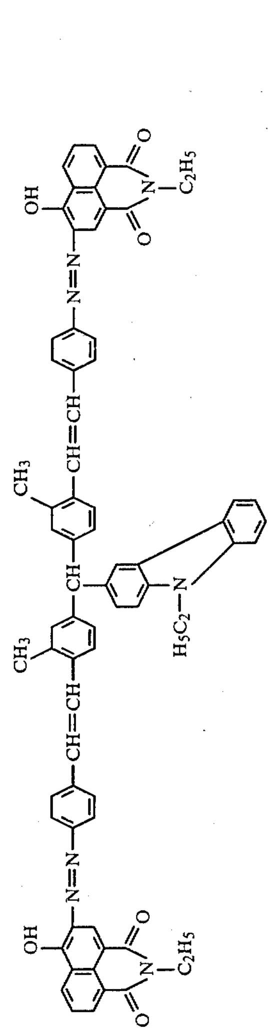
(203)
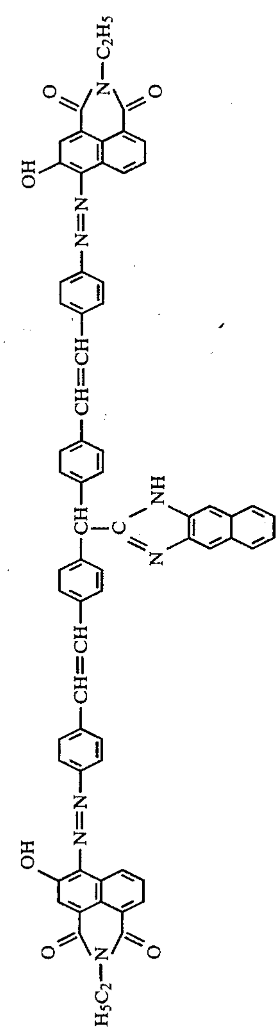
(204)
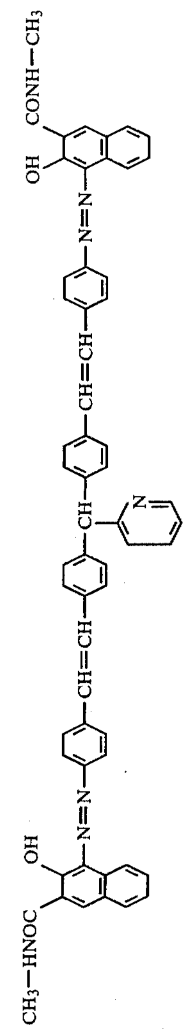

-continued
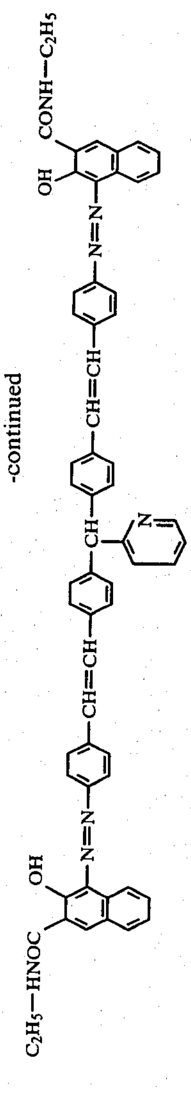
(205)
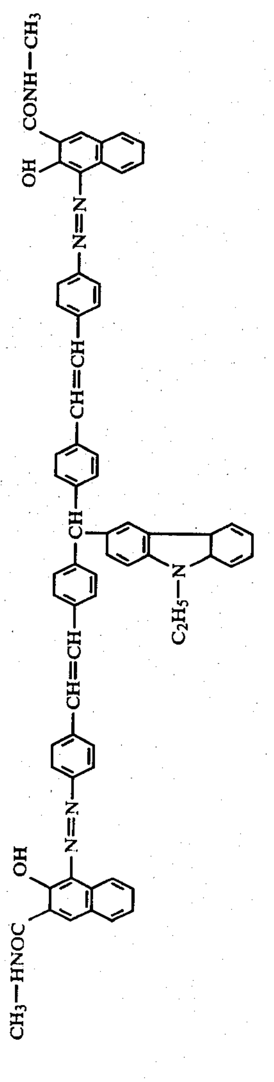
(206)
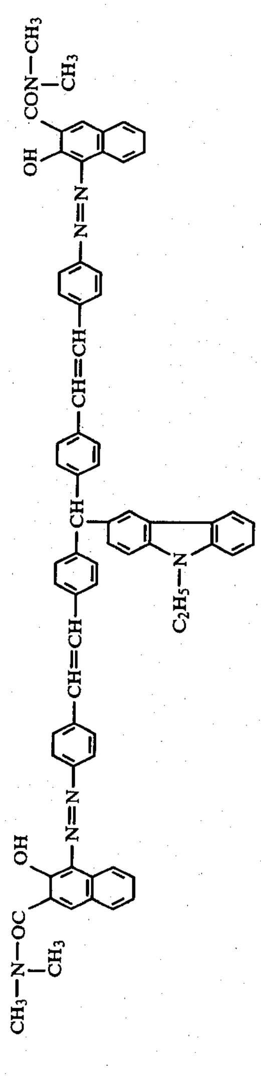
(207)
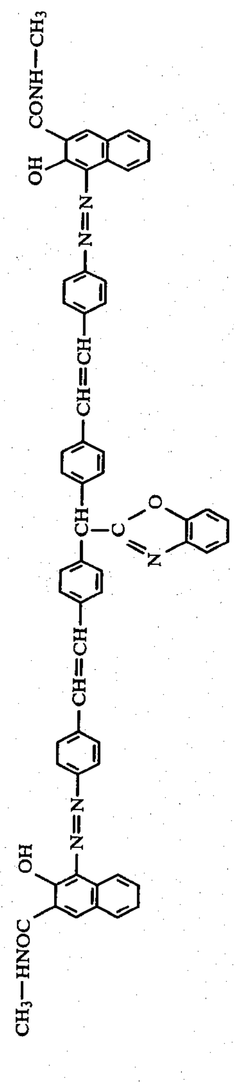
(208)
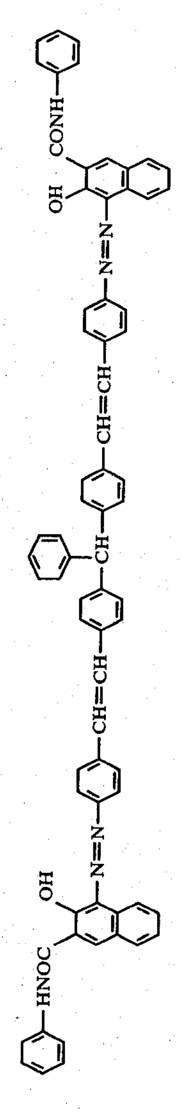
(209)

-continued
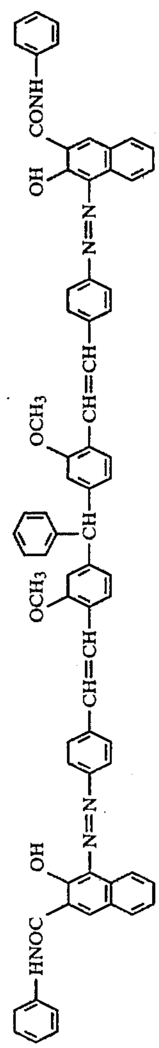
(210)
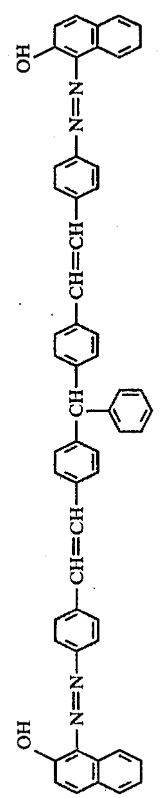
(211)
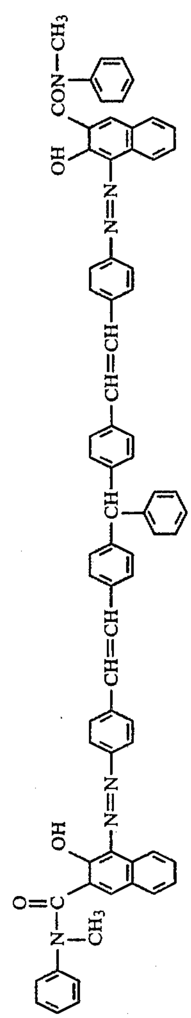
(212)
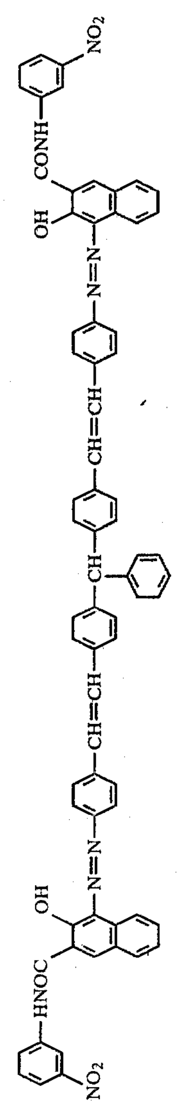
(213)
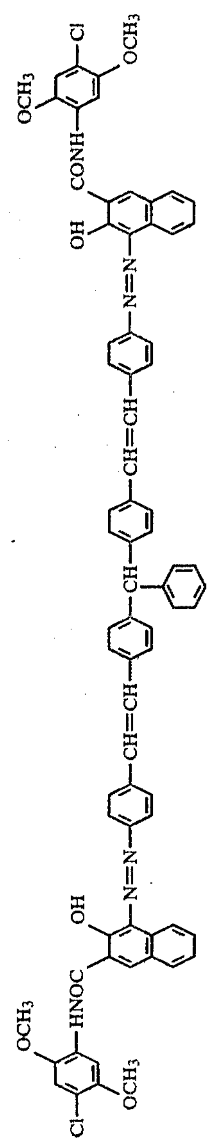
(214)

-continued
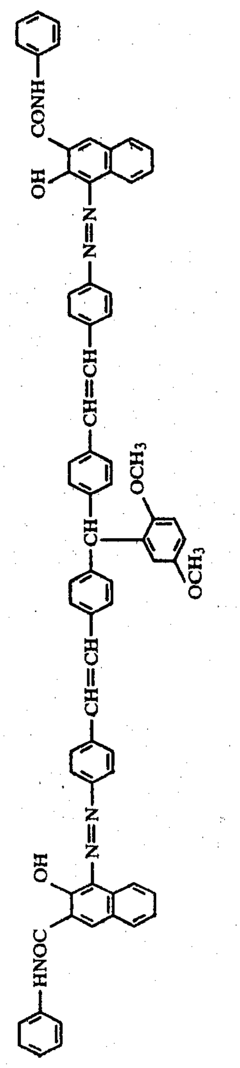
(215)
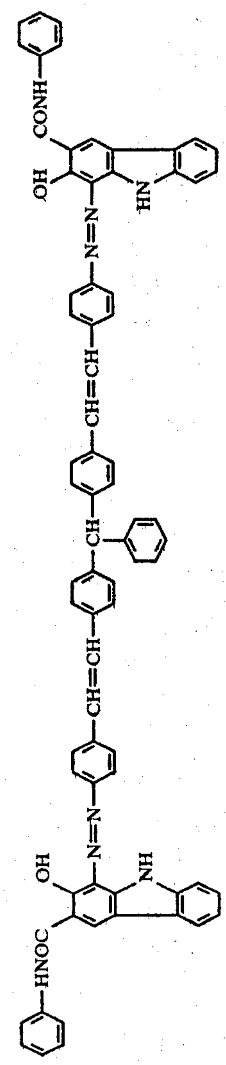
(216)
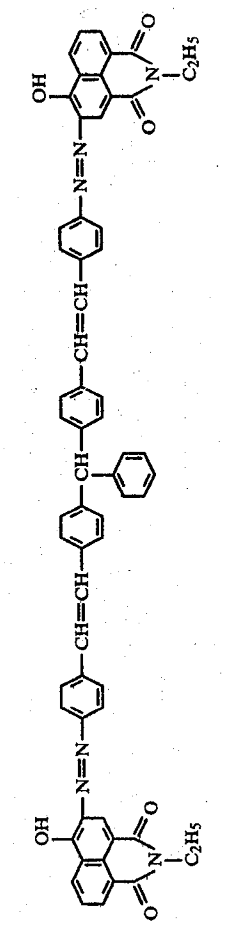
(217)
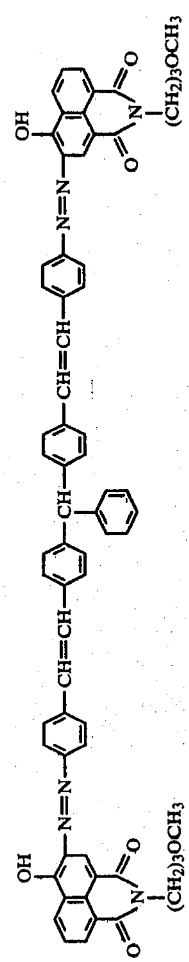
(218)
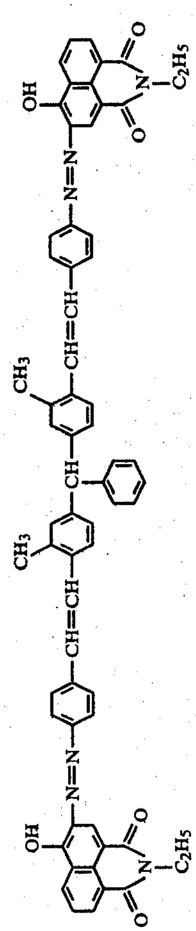
(219)

-continued
(220)
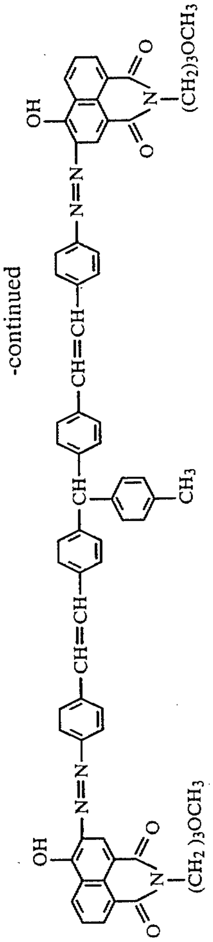
(221)
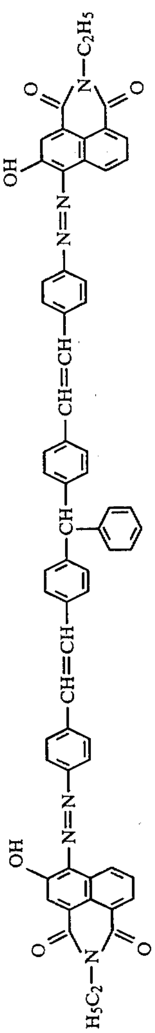
(222)
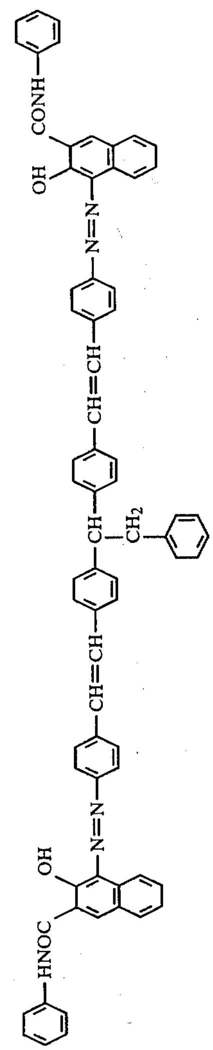
(223)
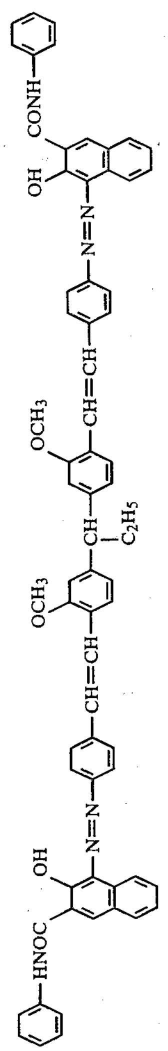

(224)
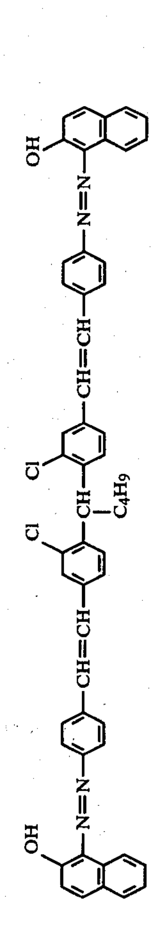
(225)
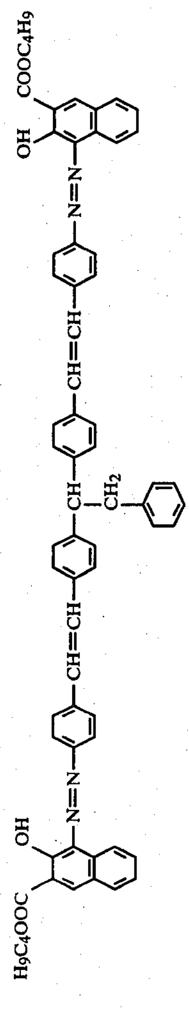
(226)
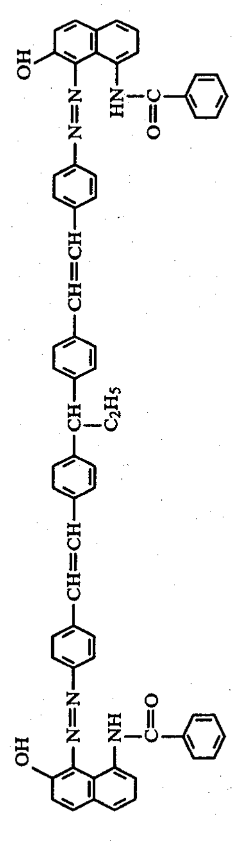
(227)
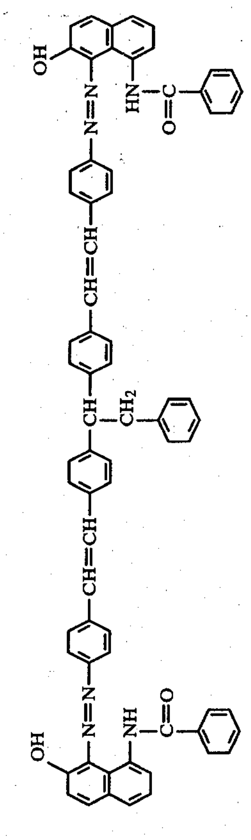
(228)
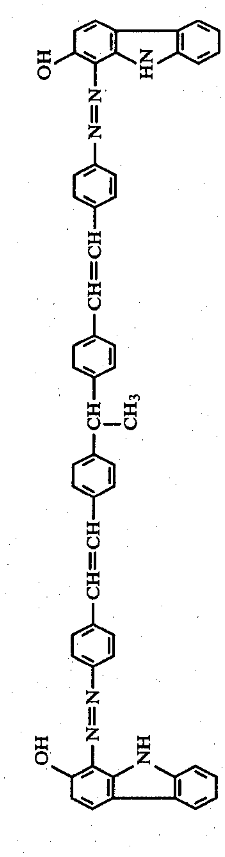

-continued
(229)
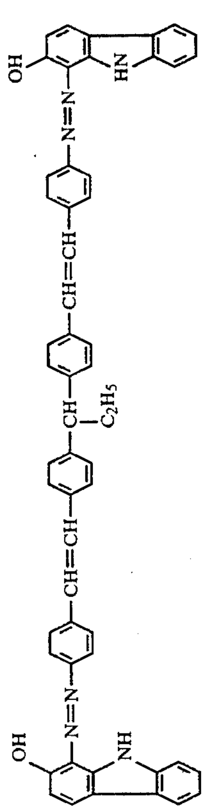
(230)
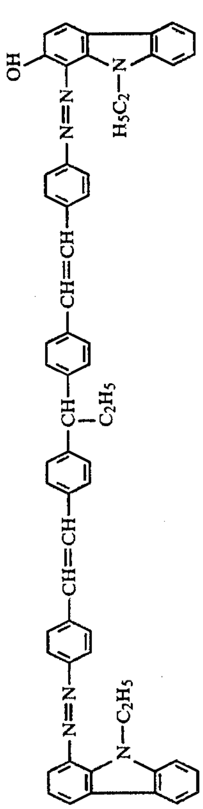
(231)
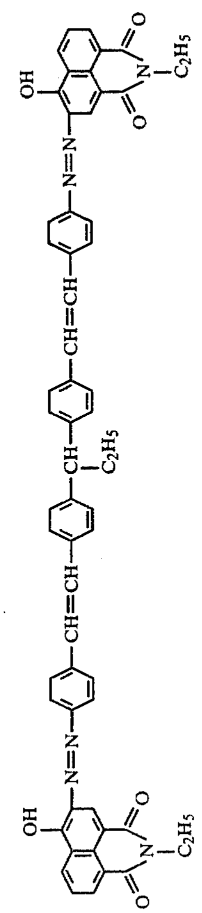
(232)
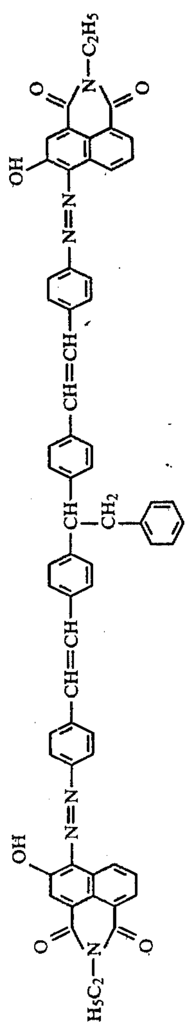
(233)
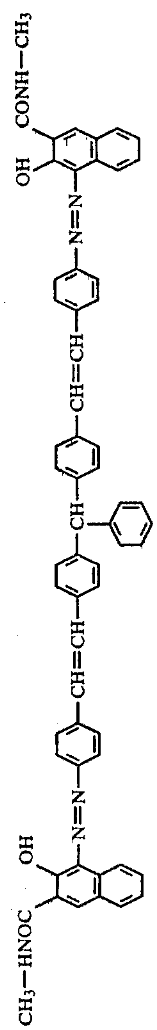

-continued
(234)
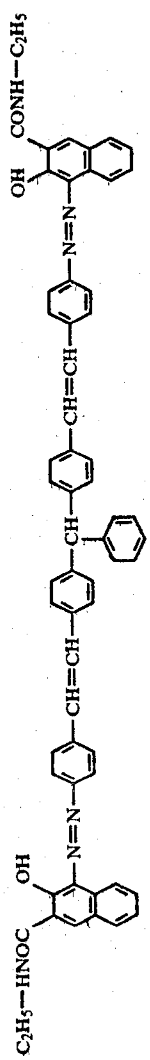
(235)
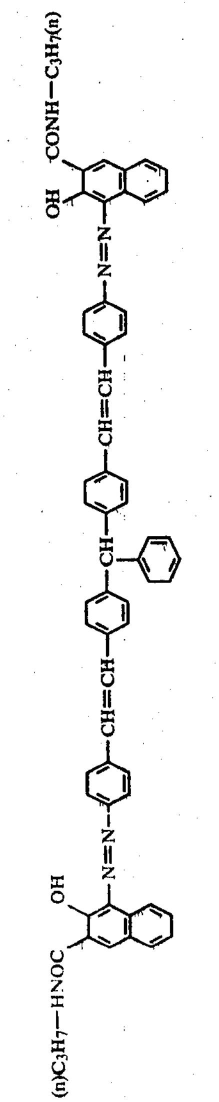
(236)
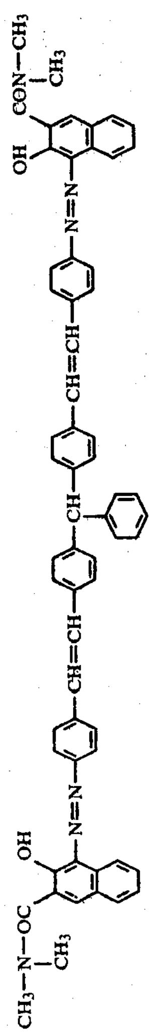
(237)
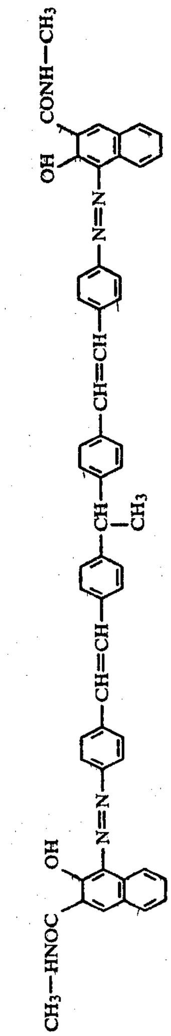
(238)
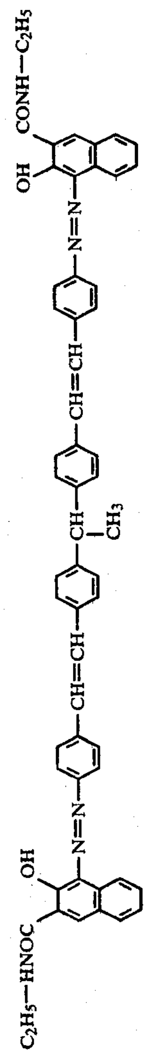
(239)
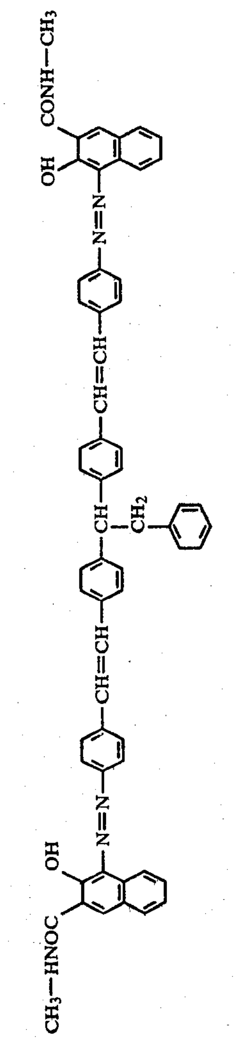

-continued
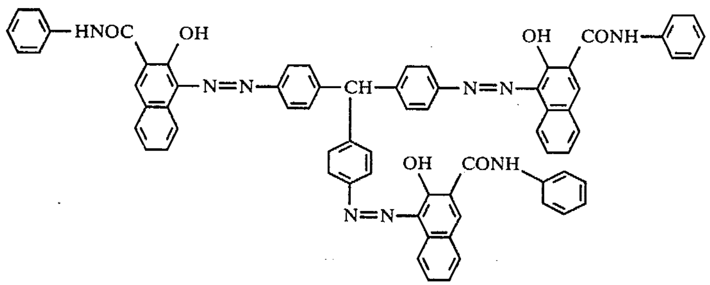
(240)
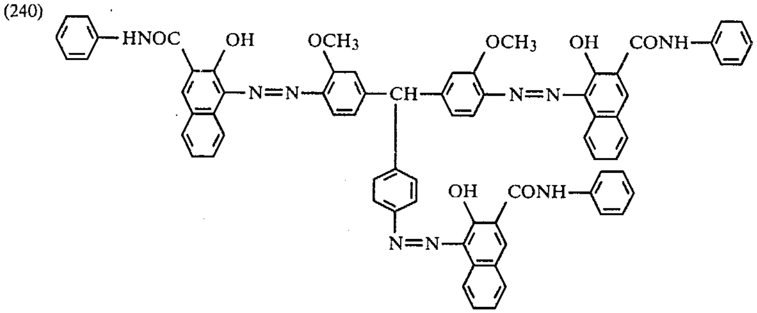
(241)
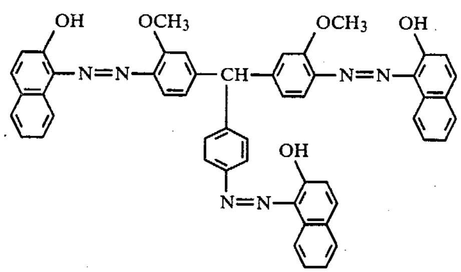
(242)
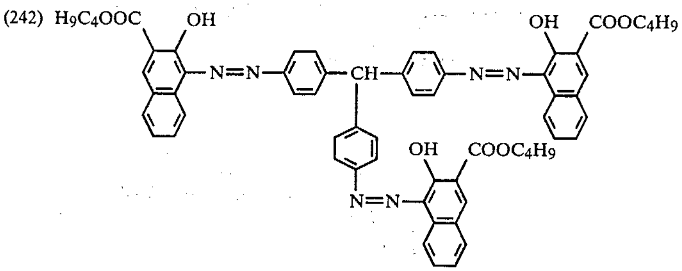
(243)
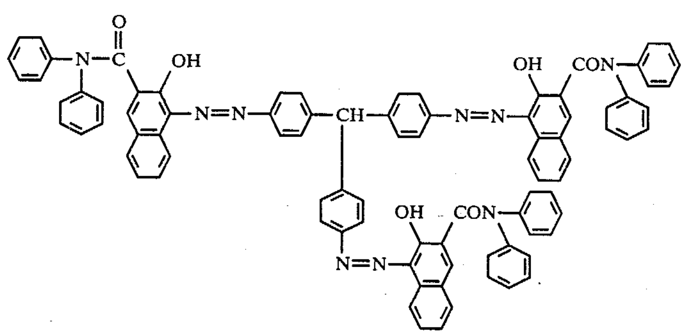
(244)
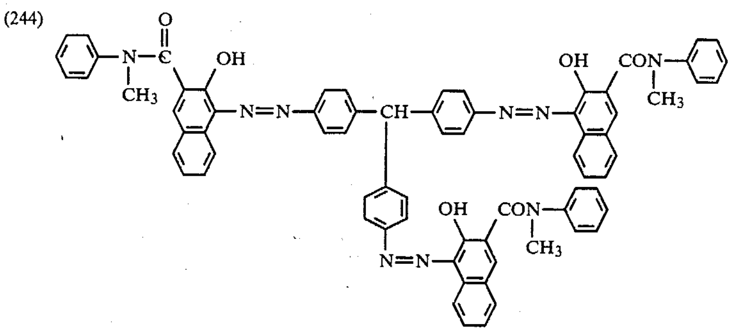
(245)

-continued
(246)
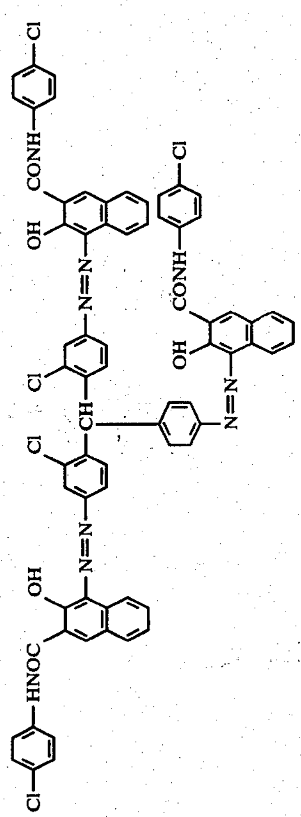
(247)
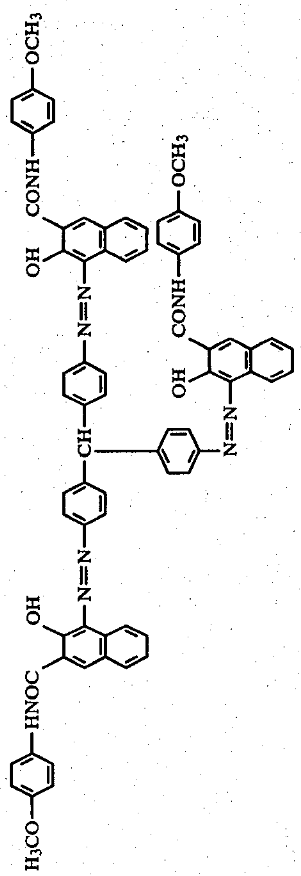
(248)
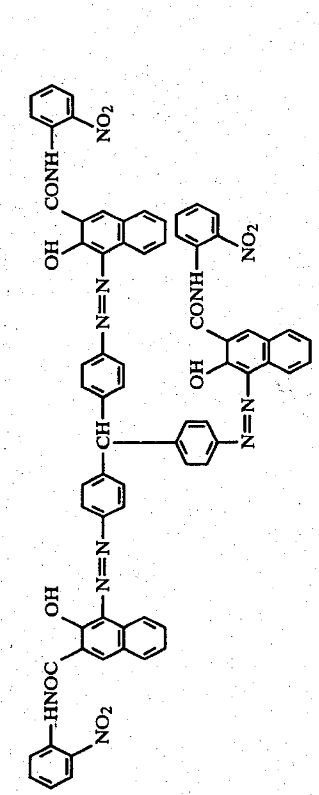
(249)
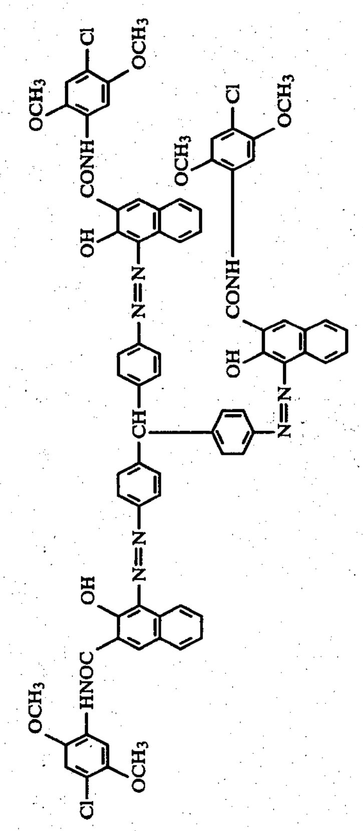
(250)
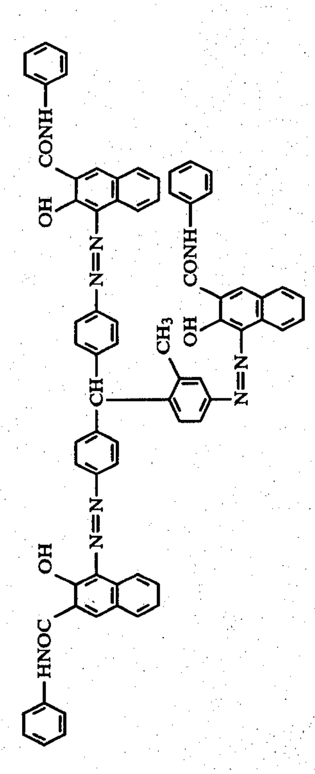
(251)
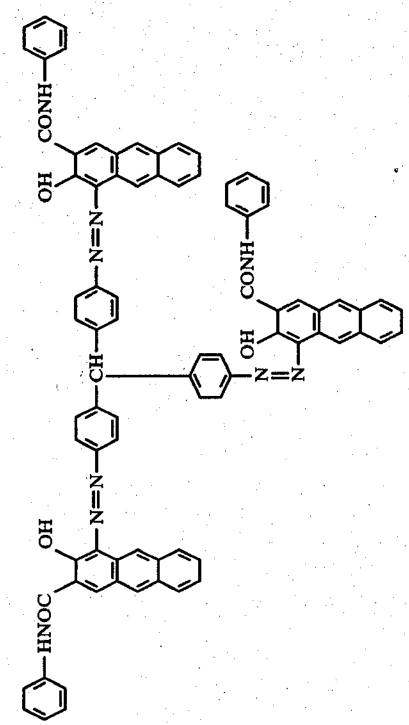

-continued
(252)
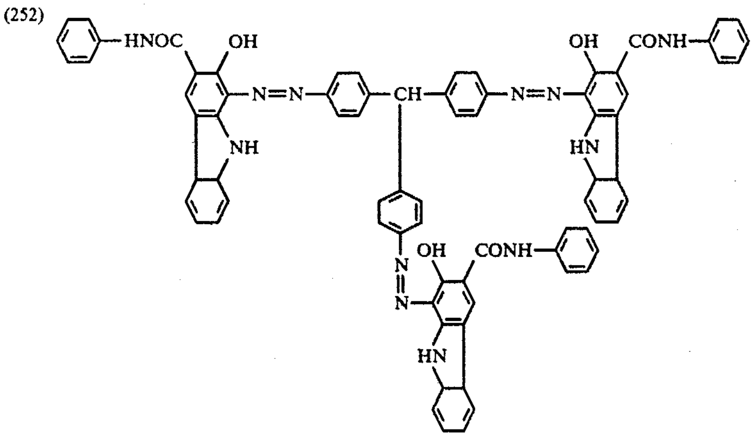
(253)
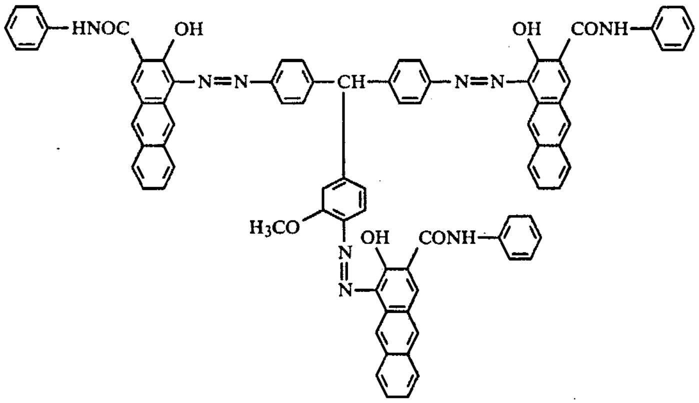
(254)
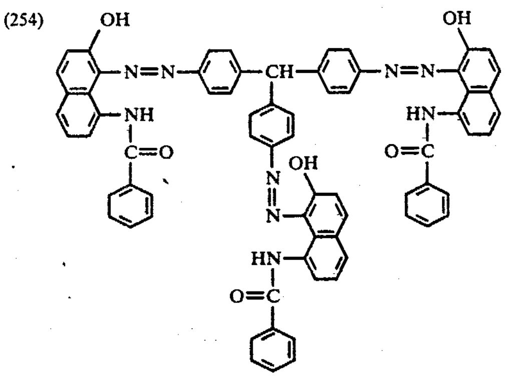
(255)
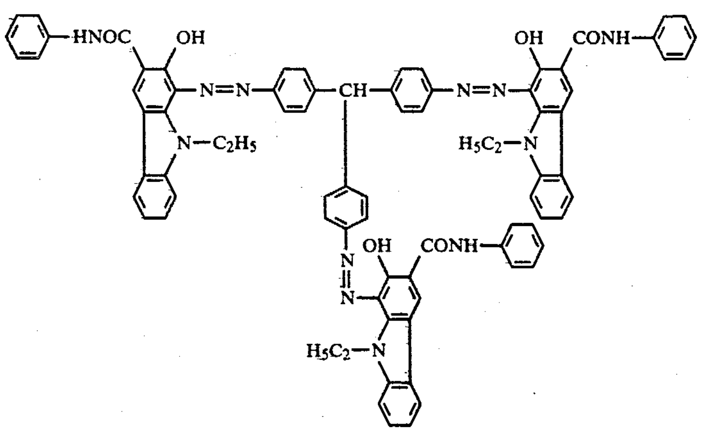

-continued
(256)
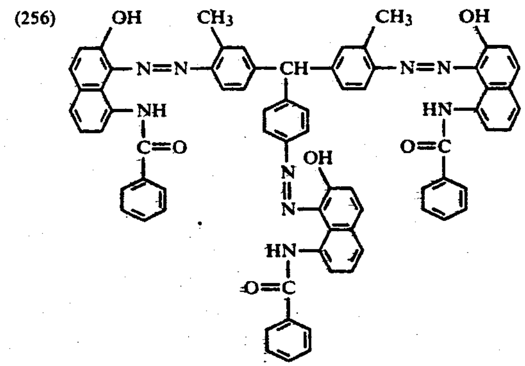
(257)
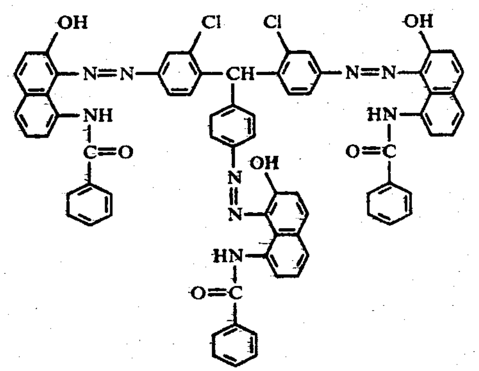
(258)
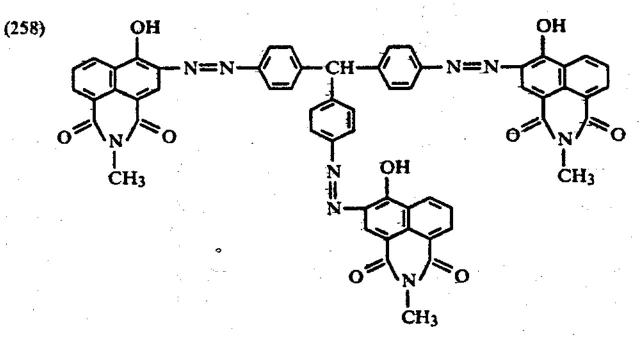
(259)
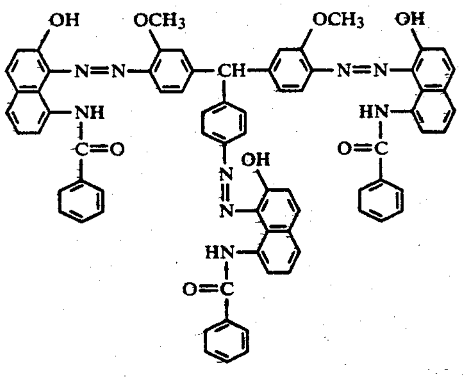
(260)
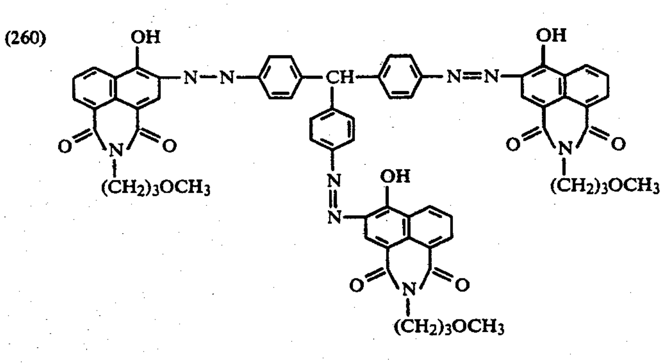
(261)
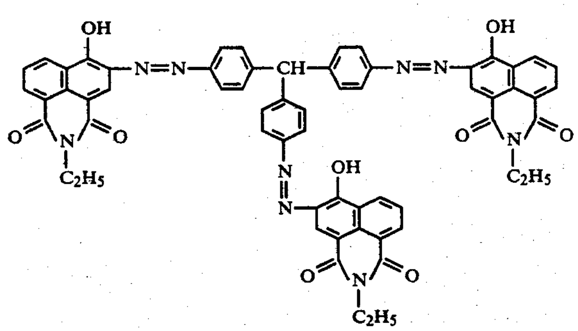

-continued
(262)
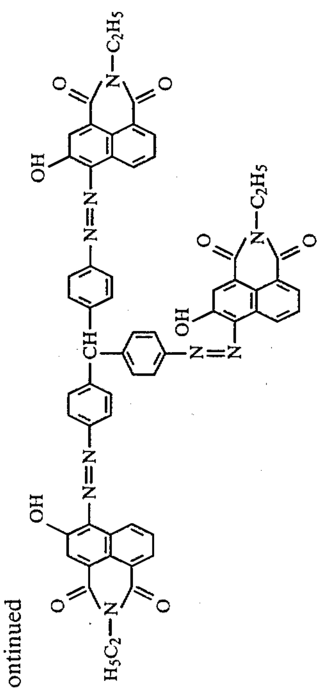
(263)
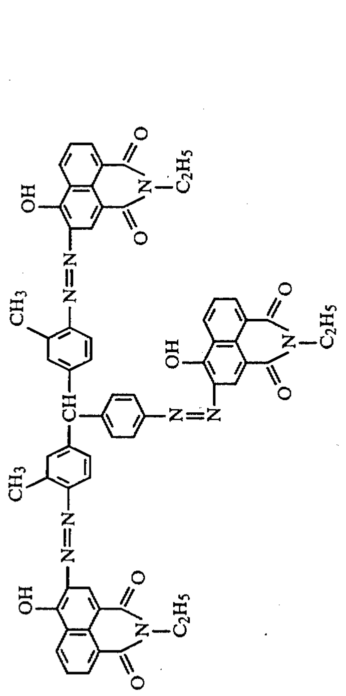
(264)
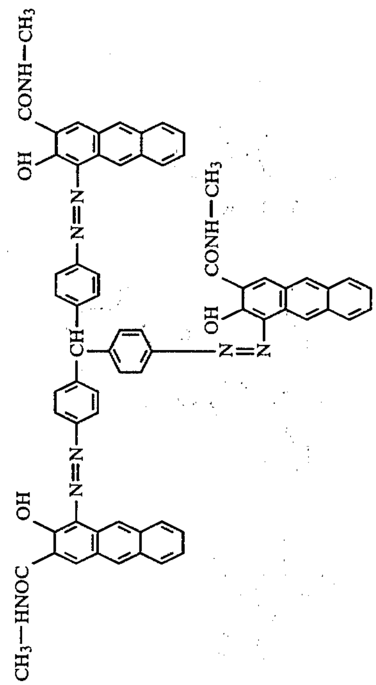
(265)
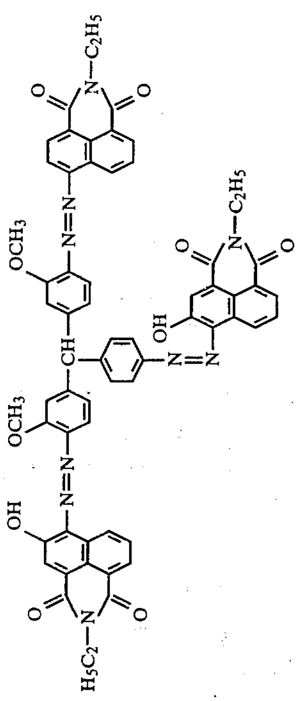
(266)
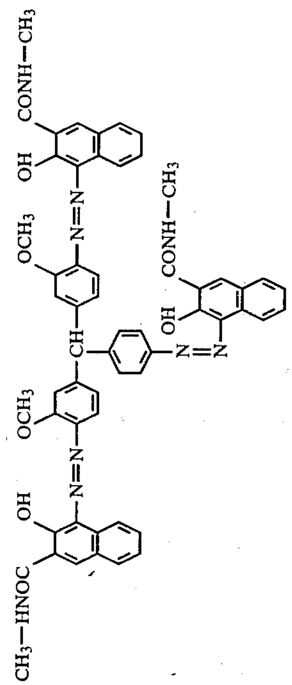
(267)
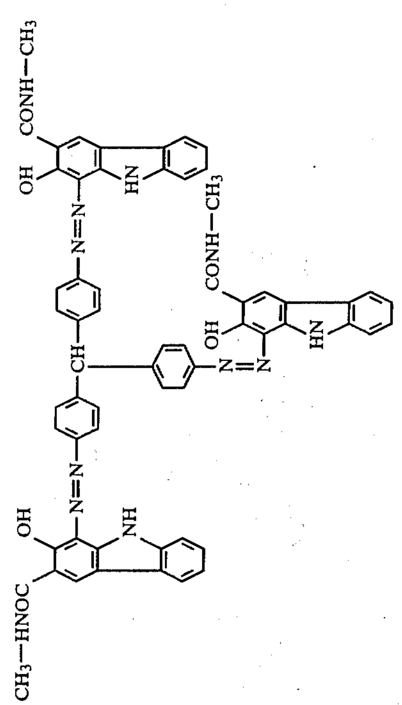

-continued
(268)
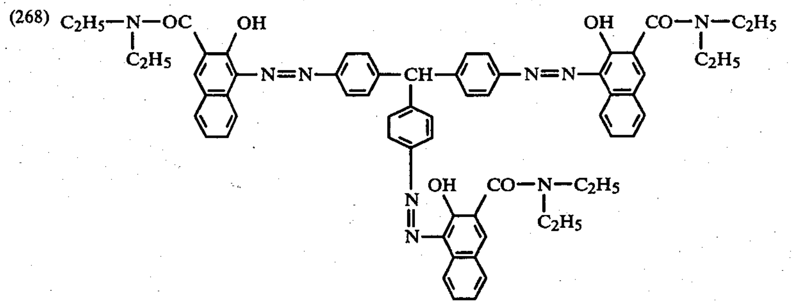
(269)
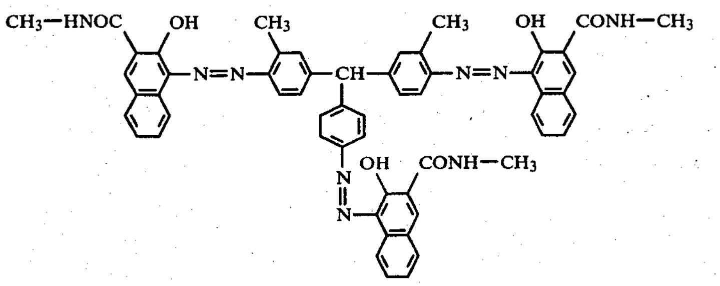
(270)
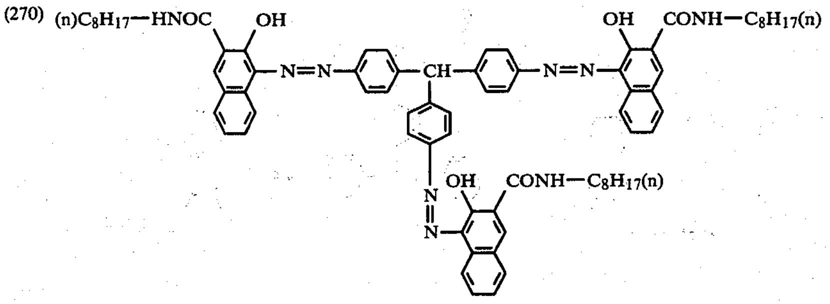
(271)
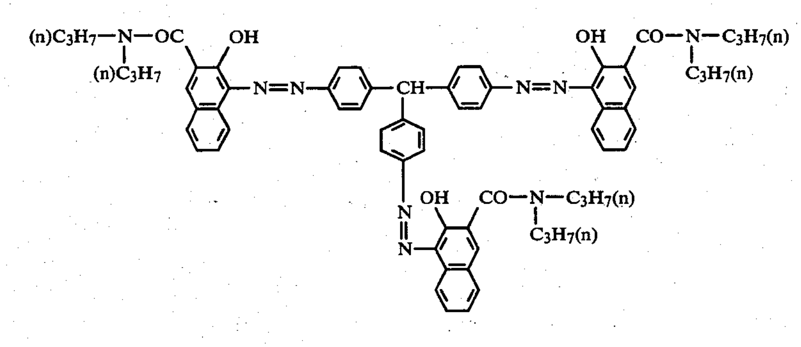
(272)
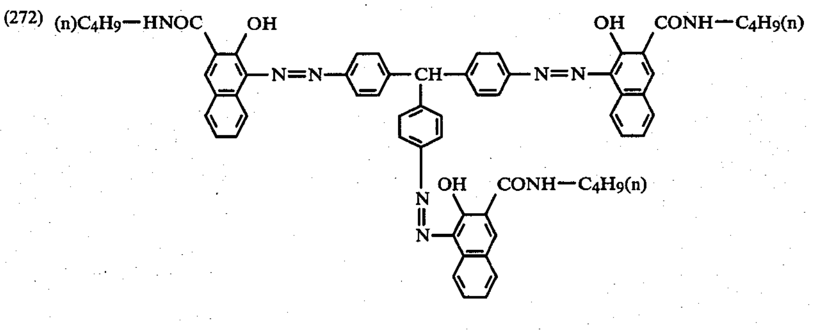
(273)
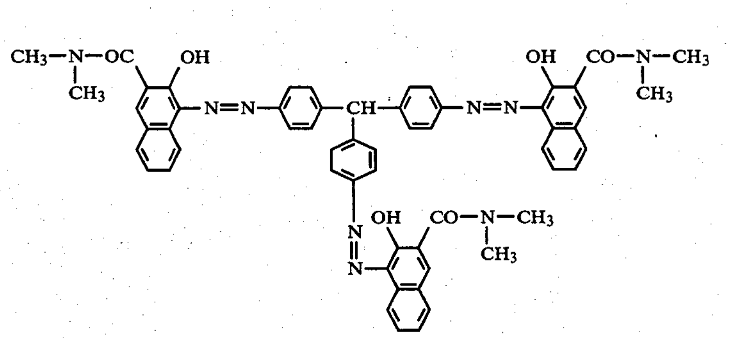

-continued
(274)
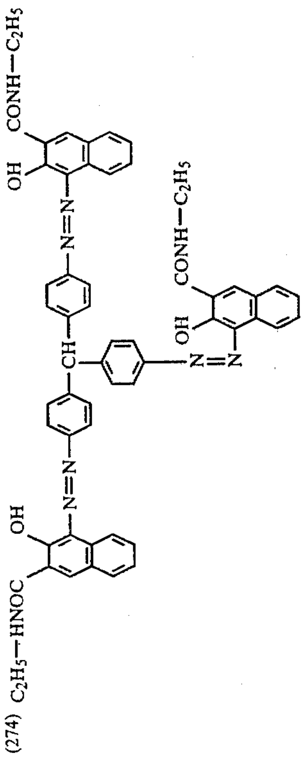
(275)
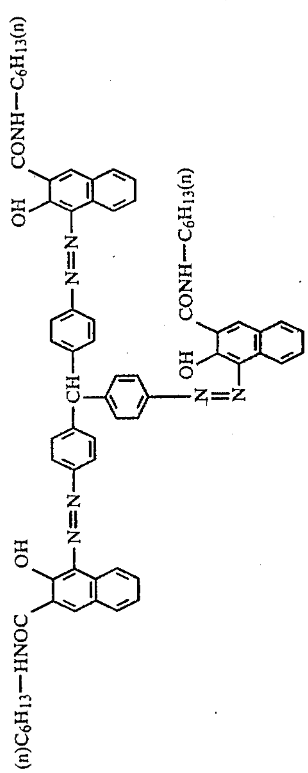
(276)
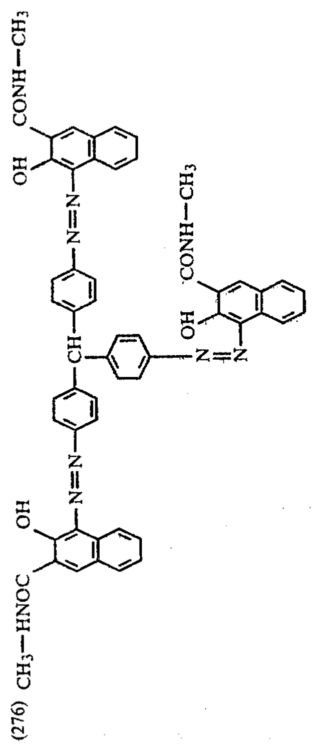
(277)
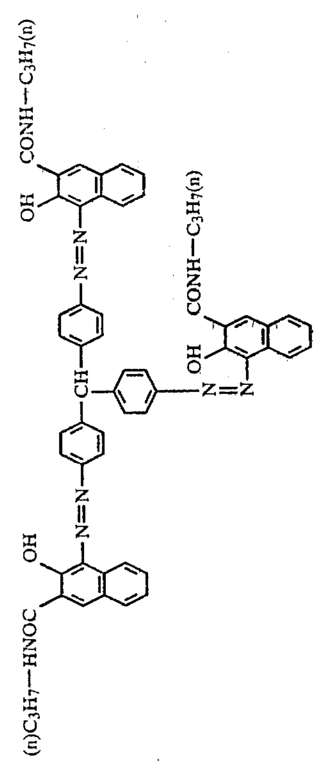
(278)
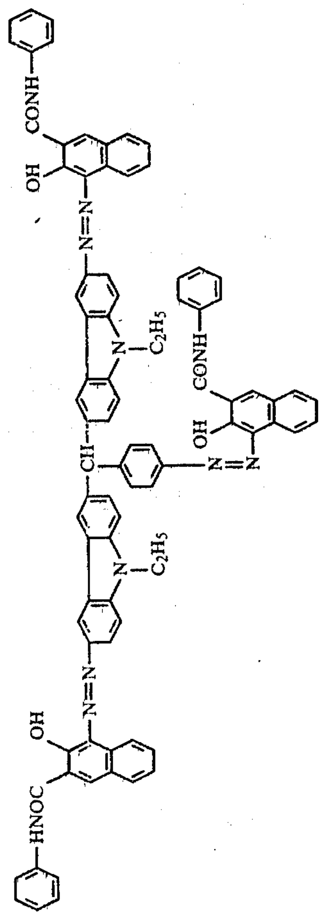

-continued
(279)
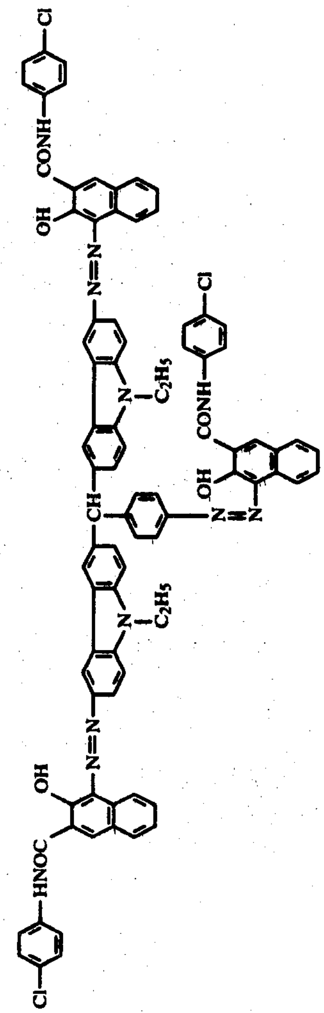
(280)
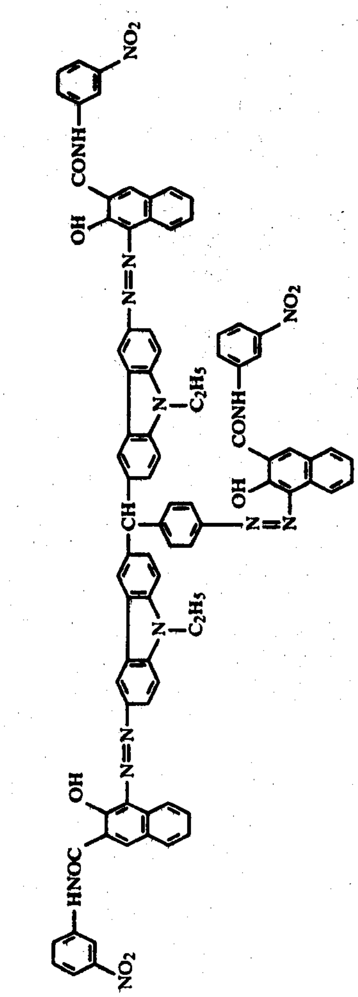
(281)
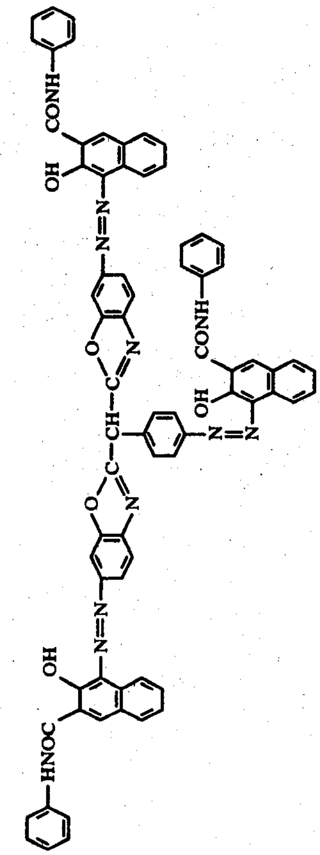

-continued
(282)
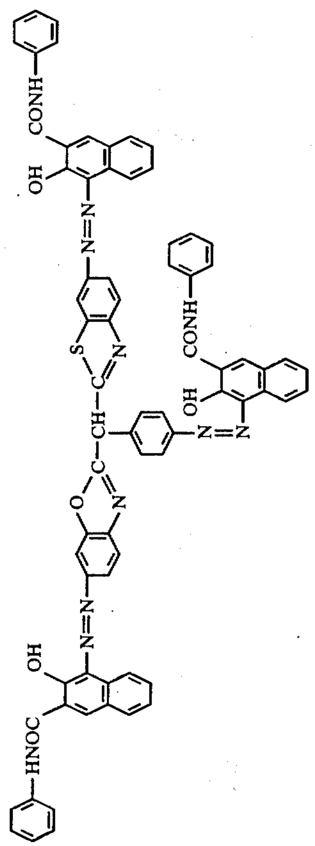
(283)
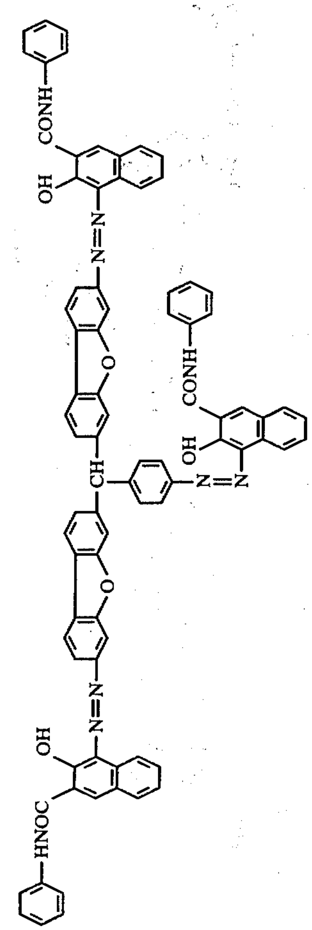
(284)
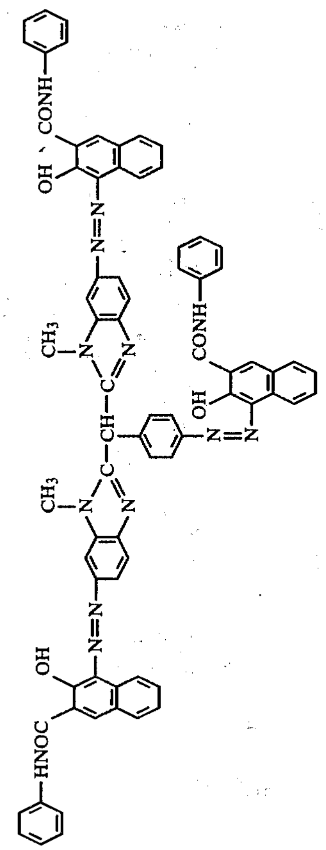

-continued
(285)
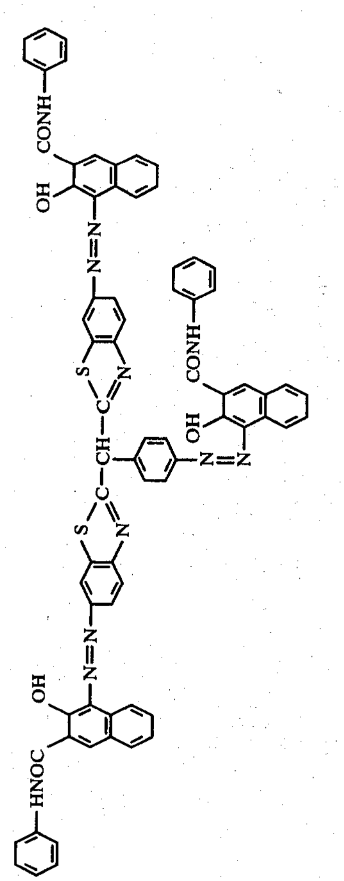
(286)
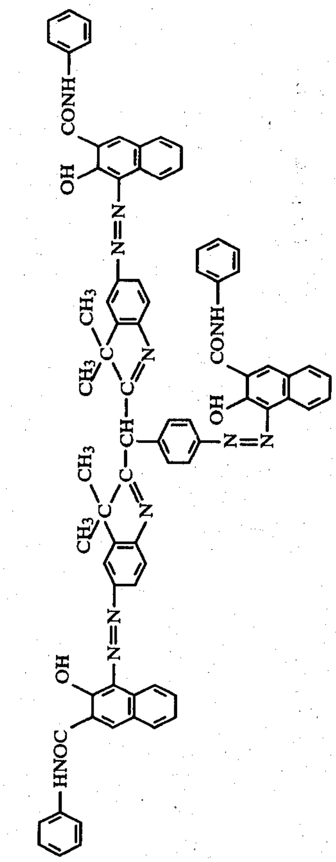
(287)
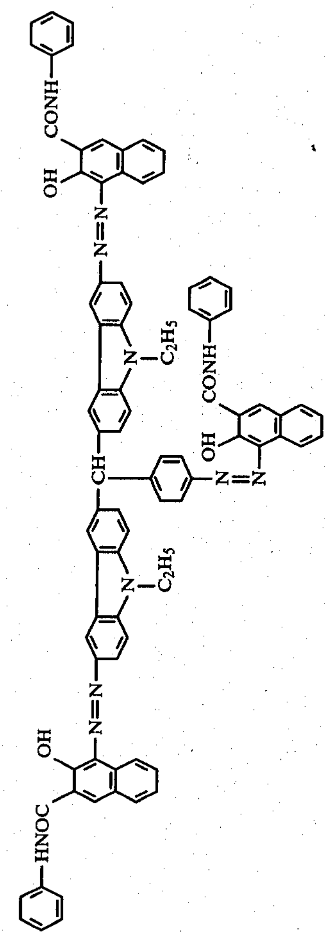

-continued
(288)
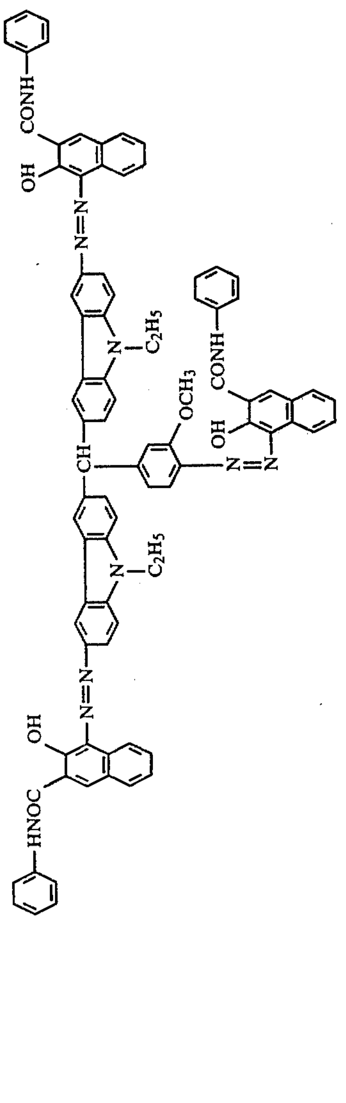
(289)
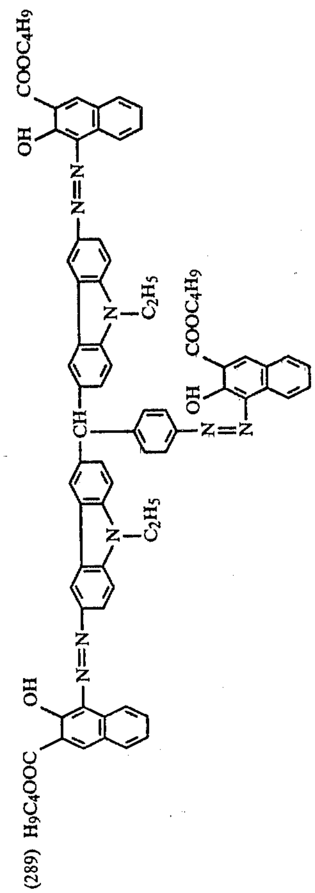
(290)
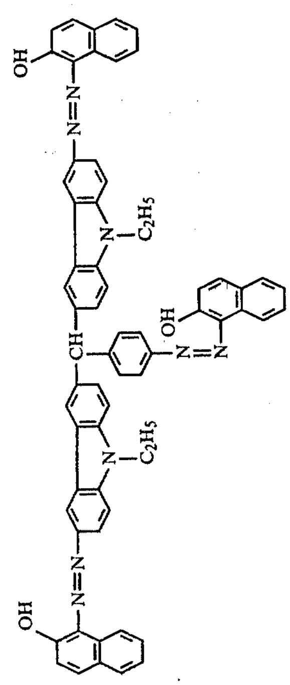
(291)
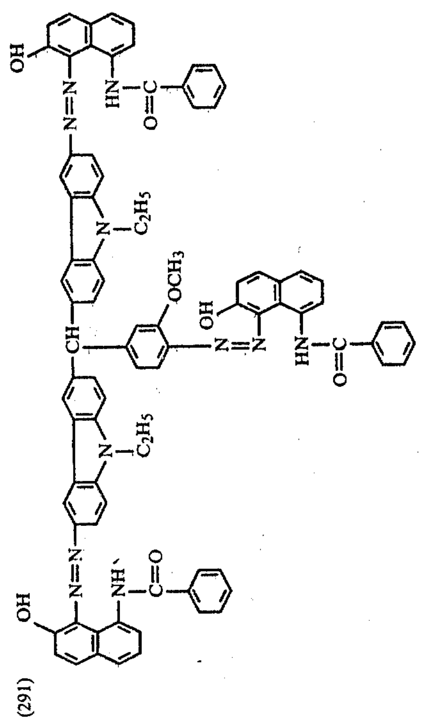
(292)
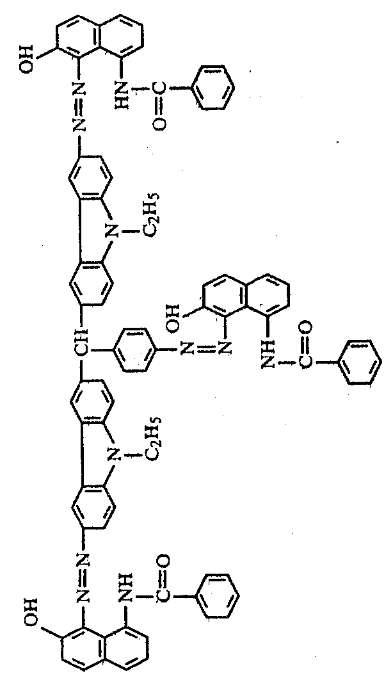

-continued
(293)
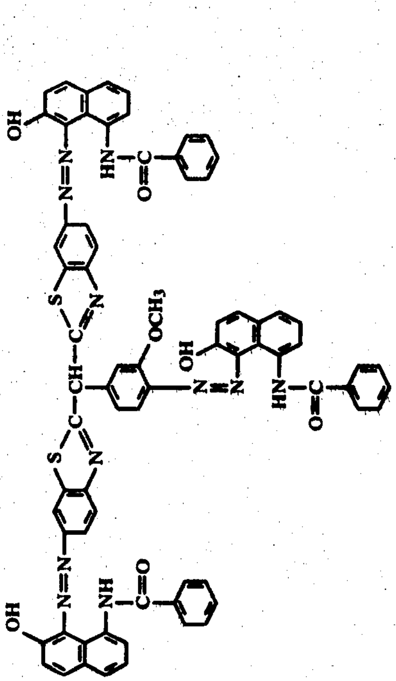
(294)
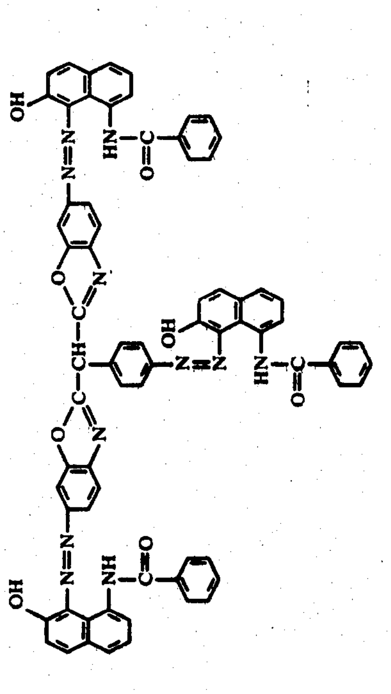
(295)
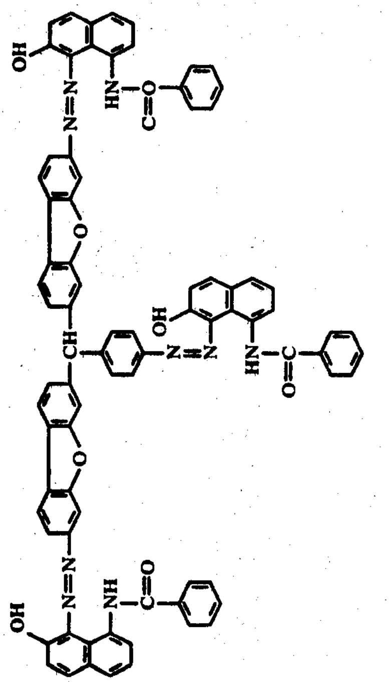
(296)
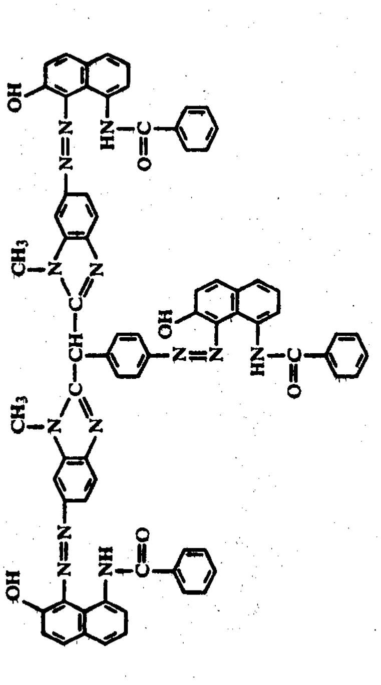
(297)
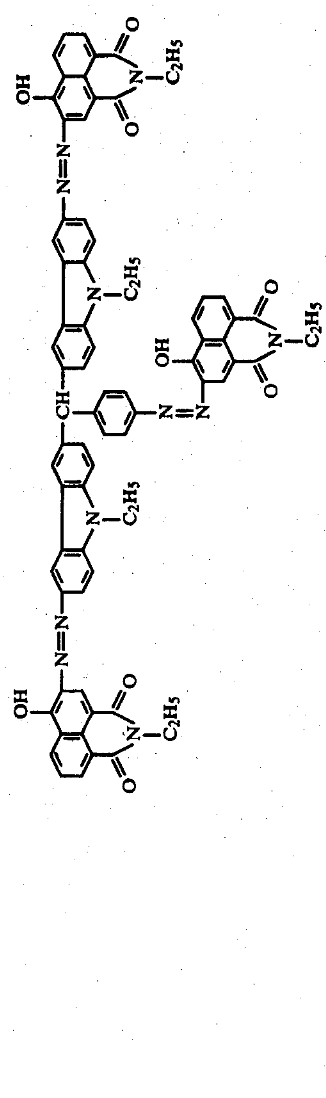

-continued
(298)
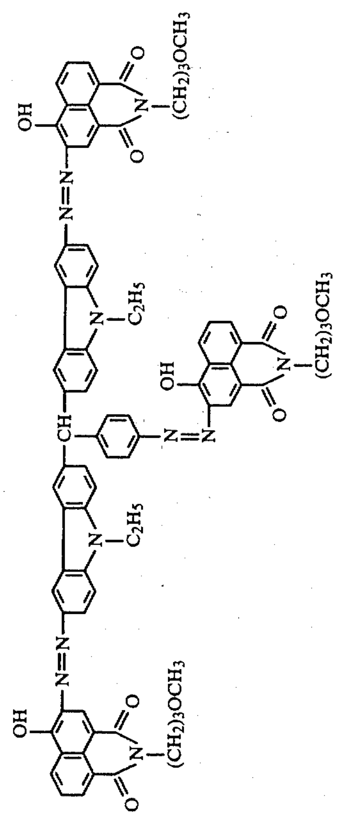
(299)
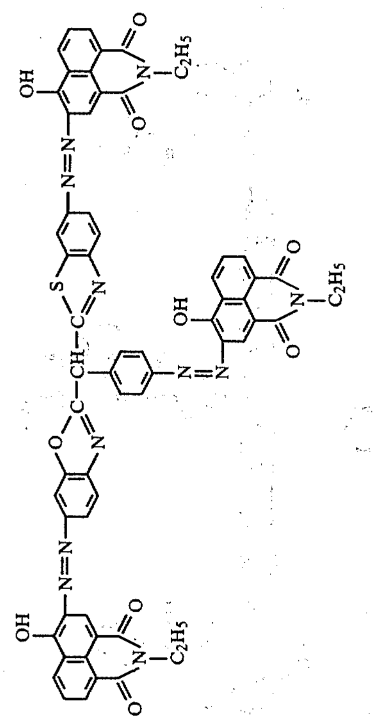
(300)
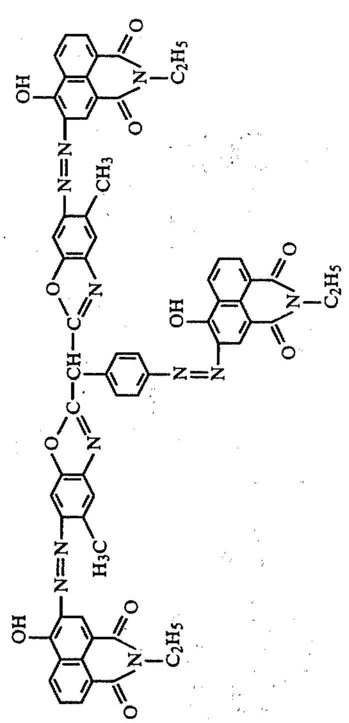

(301)
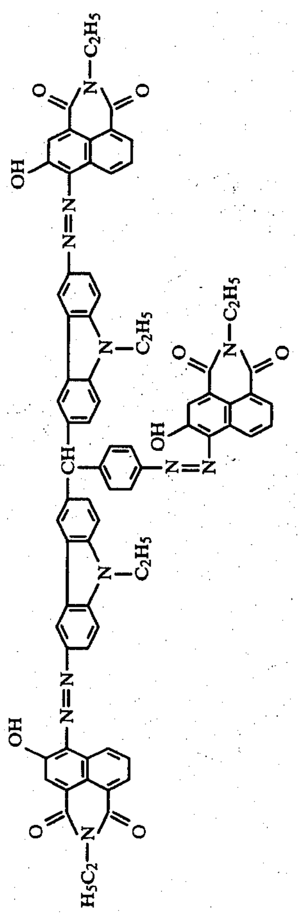
(302)
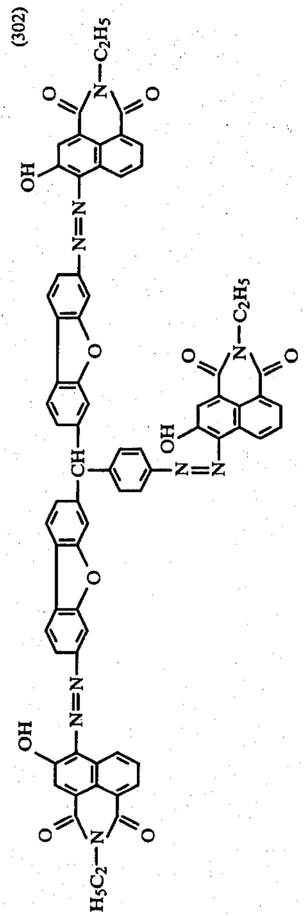
(303)
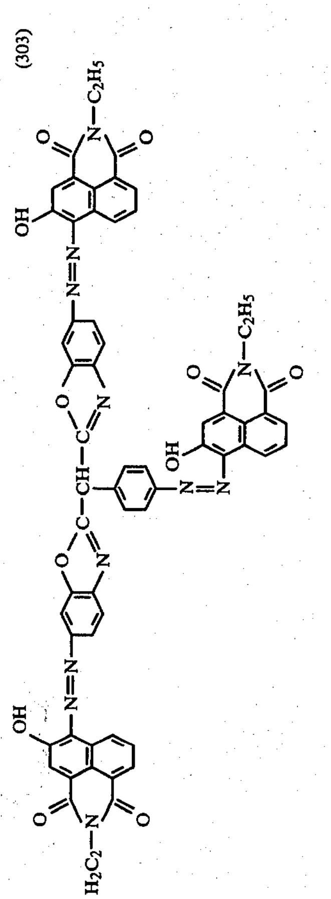
(304)
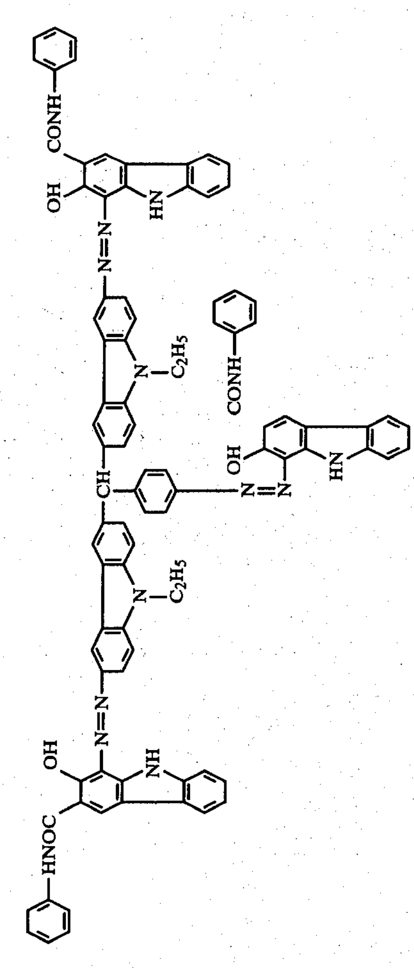

-continued
(305)
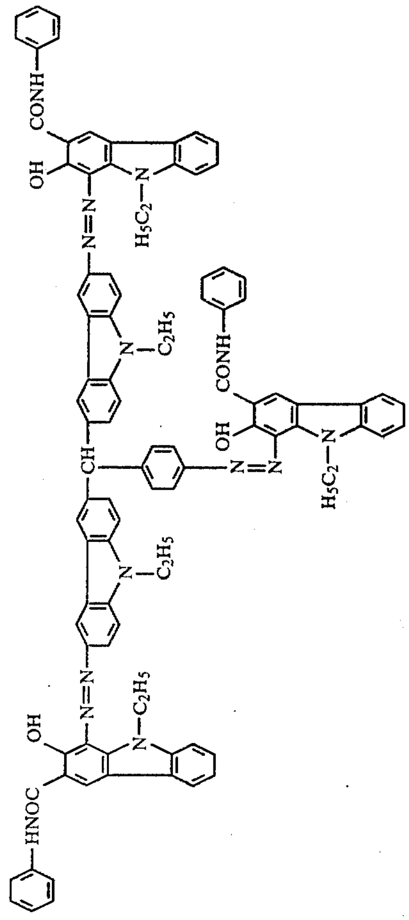
(306)
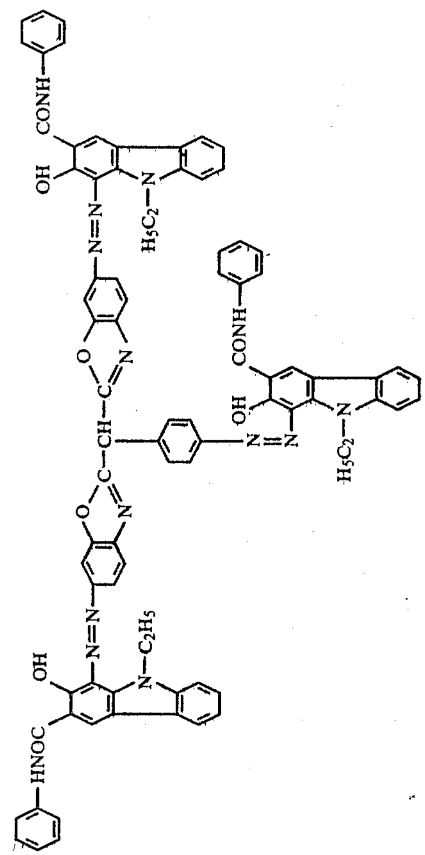

-continued
(307)
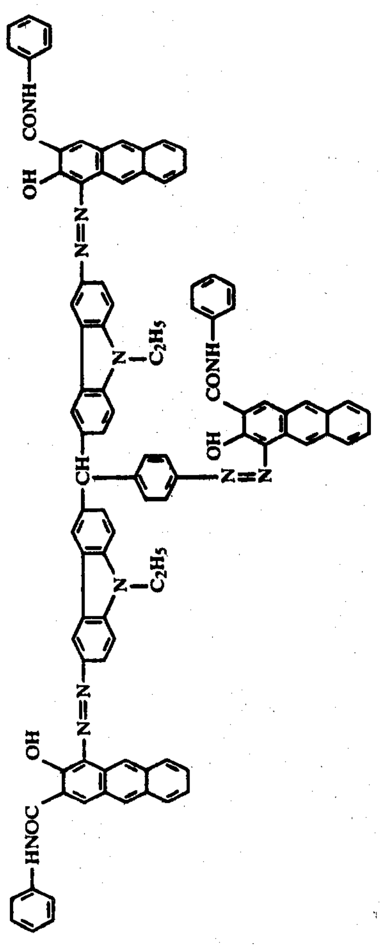
(308)
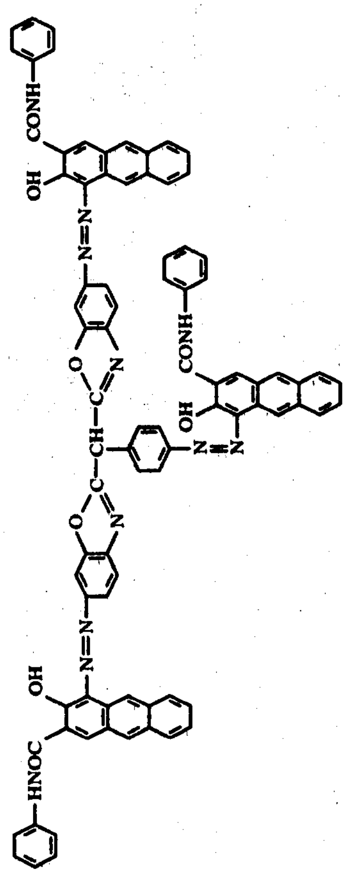
(309)
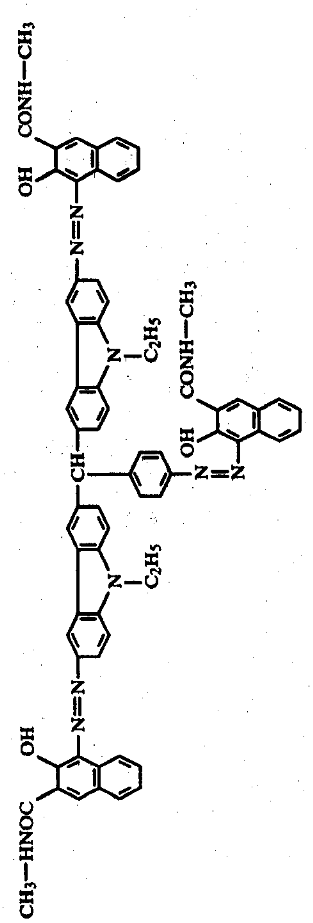

-continued
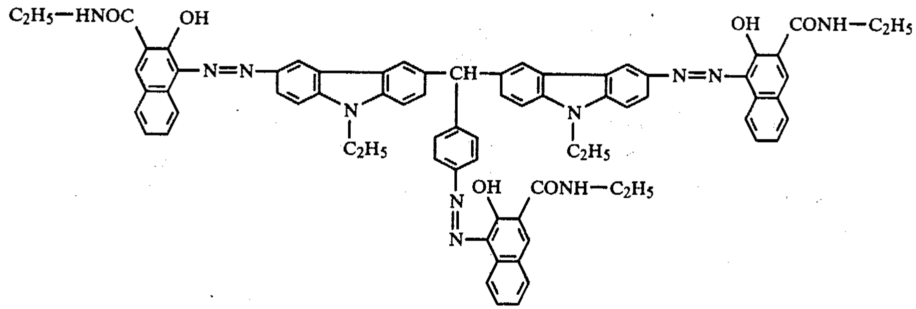
(310)
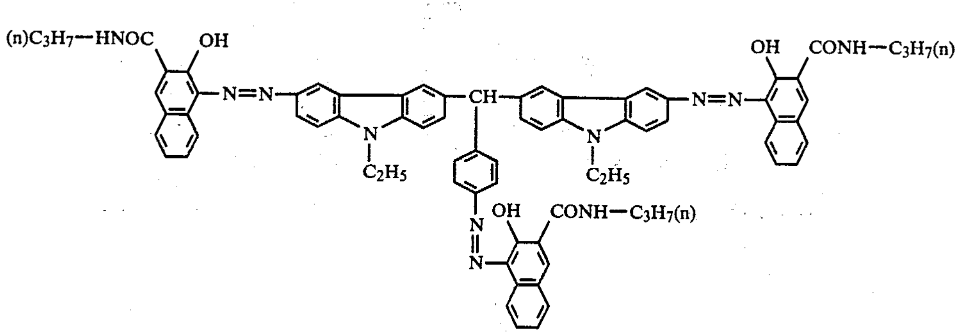
(311)
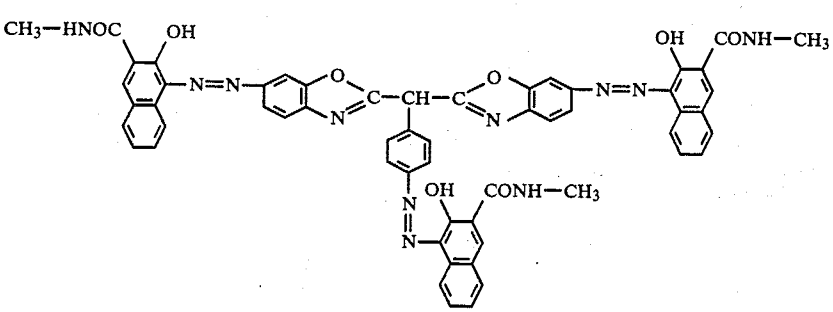
(312)
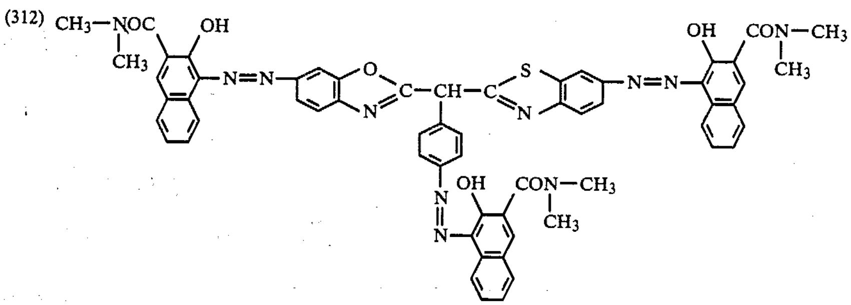
(313)

-continued
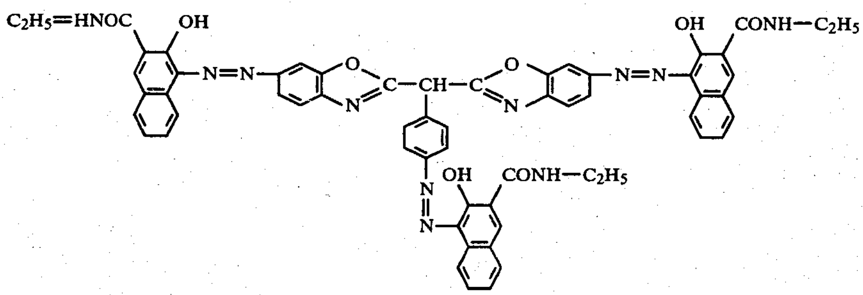
(314)
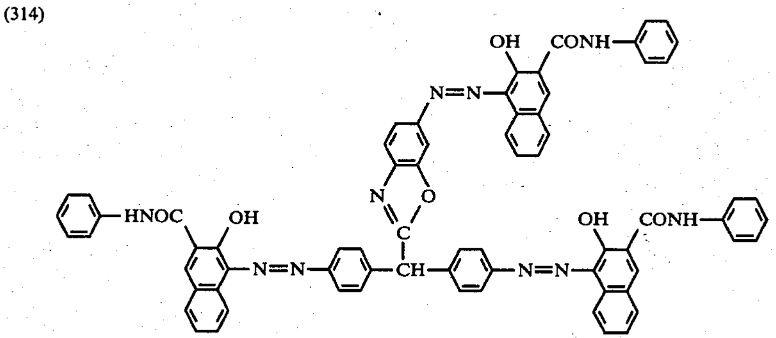
(315)
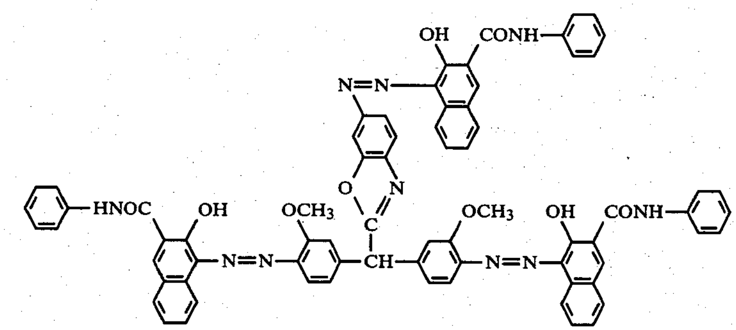
(316)
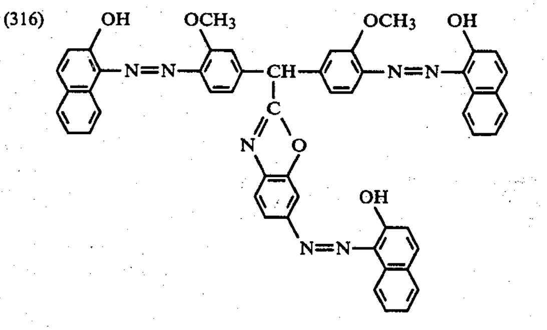
(317)
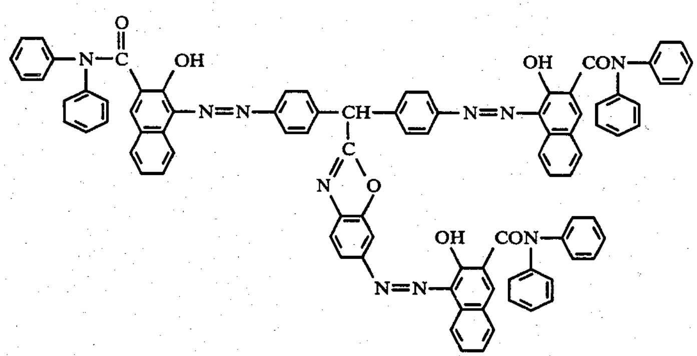
(318)
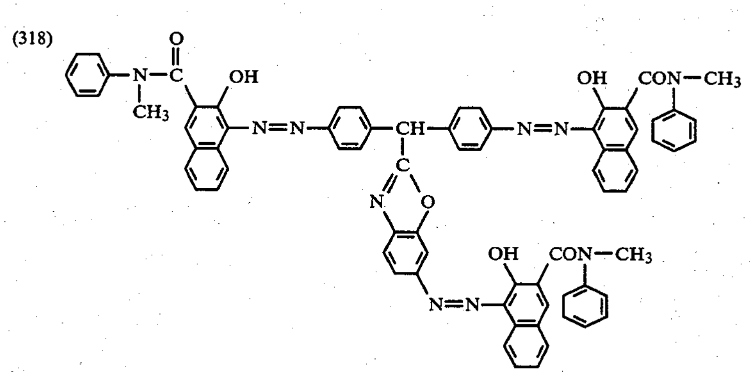
(319)

-continued
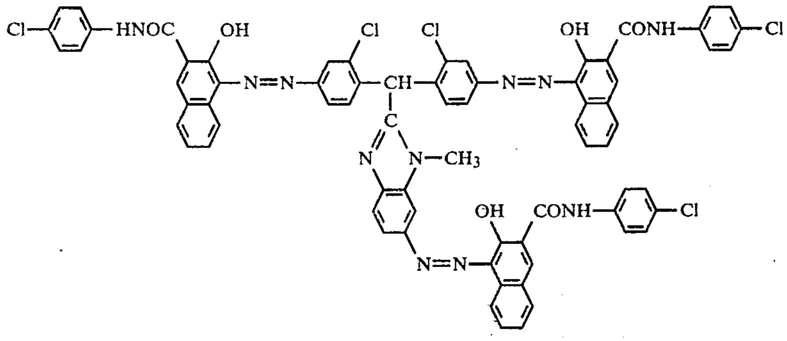
(320)
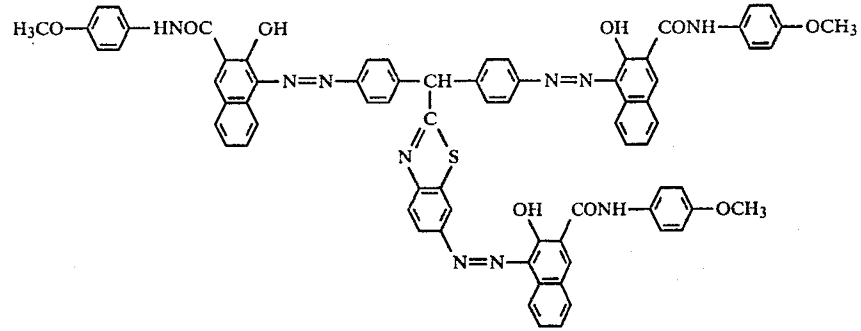
(321)
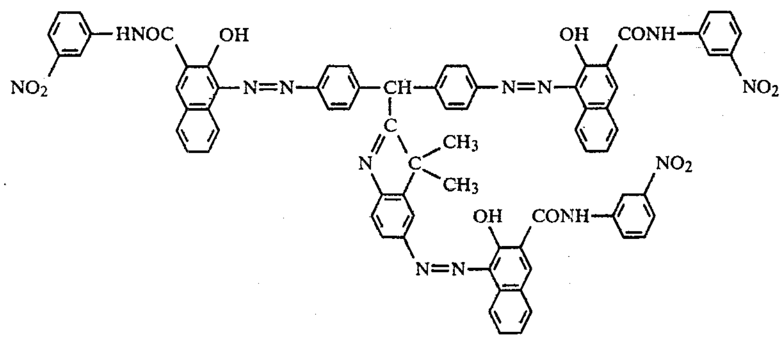
(322)
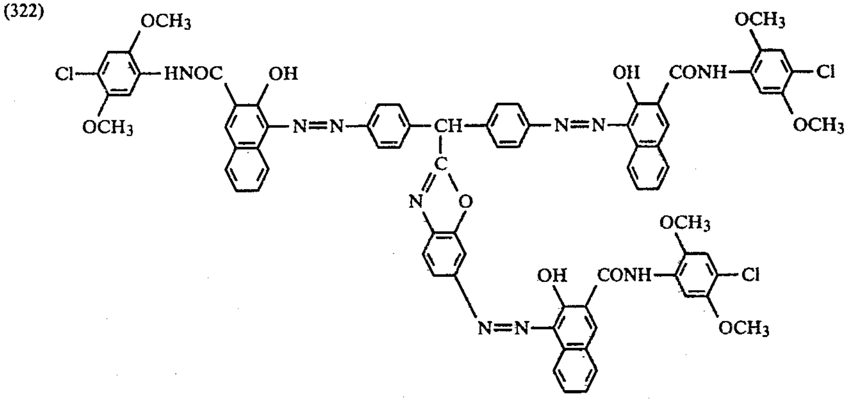
(323)
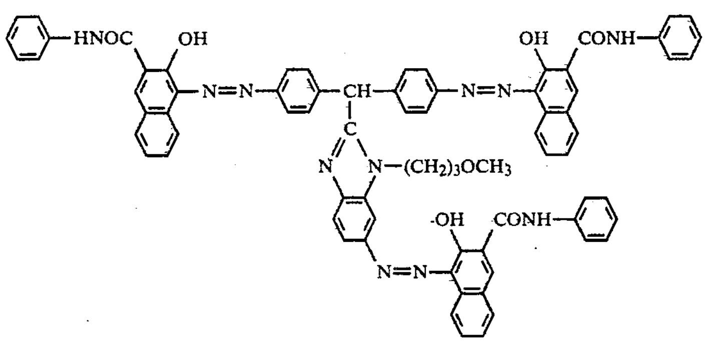
(324)
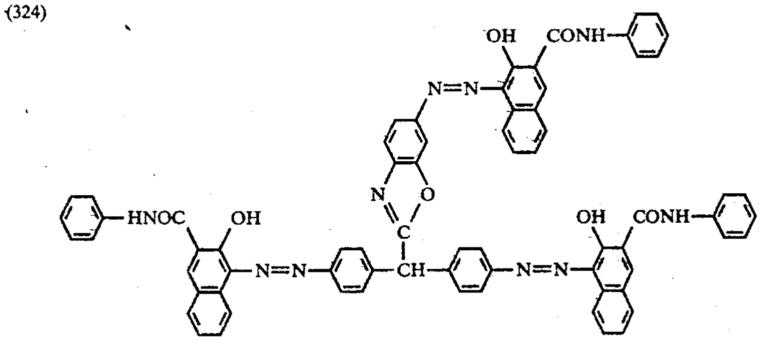
(325)

-continued
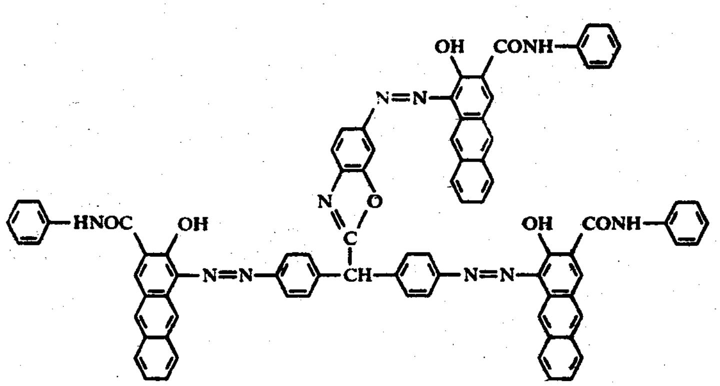
(326)
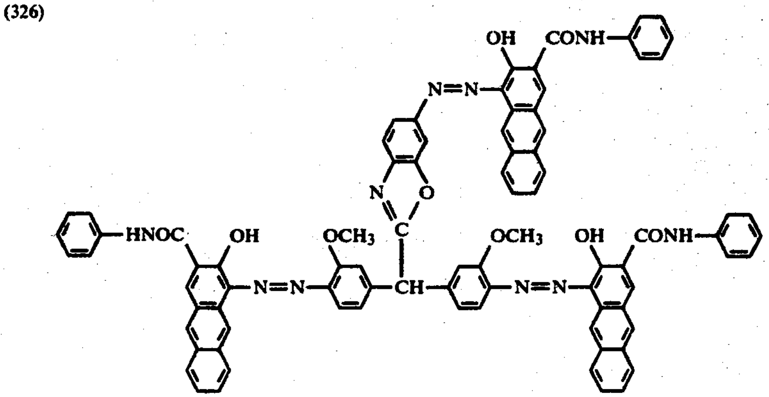
(327)
(328)
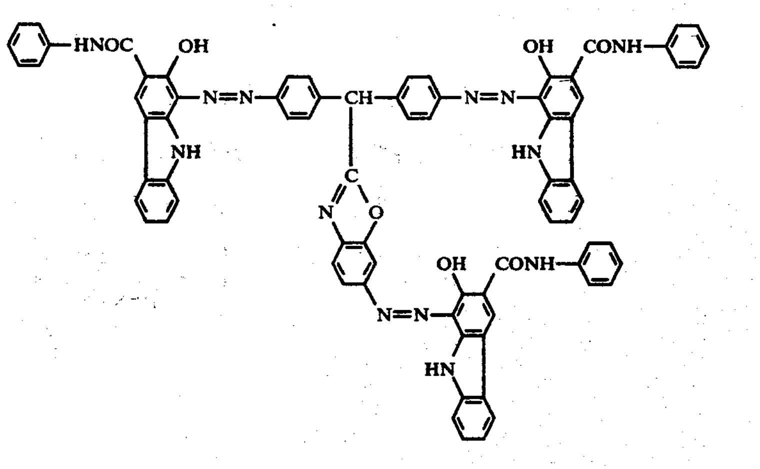
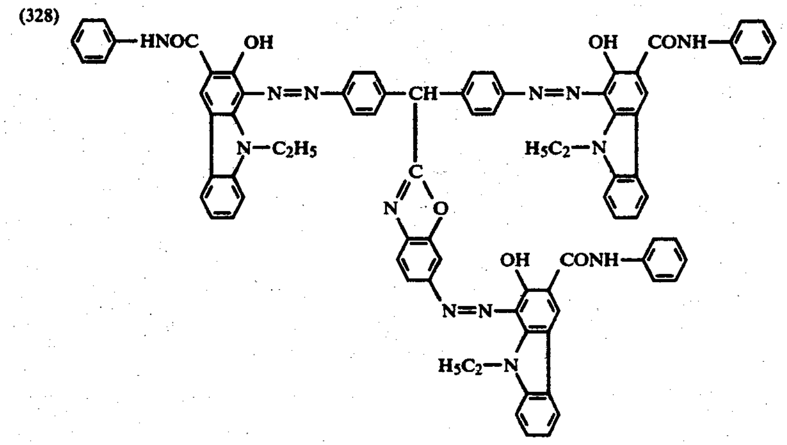
(329)

-continued
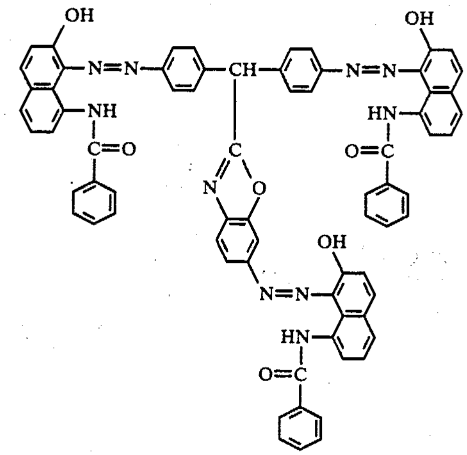
(330)
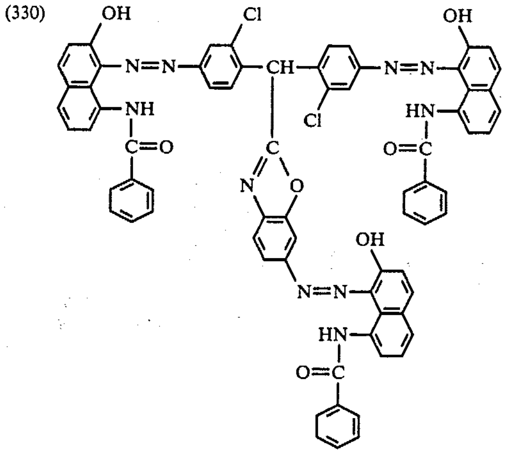
(331)
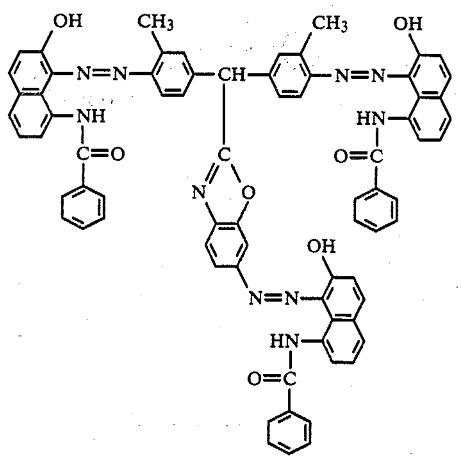
(332)
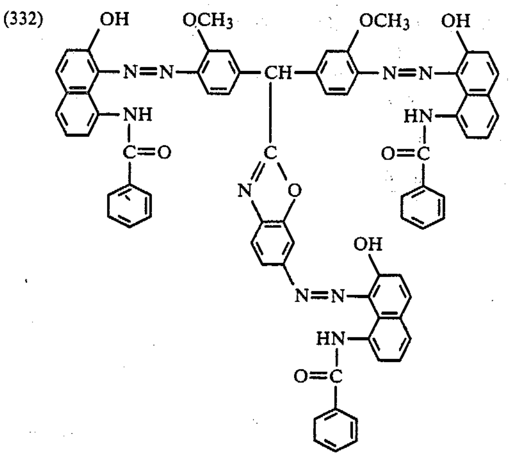
(333)

-continued
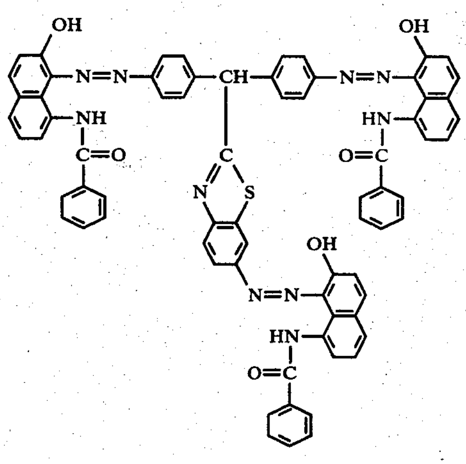
(334)
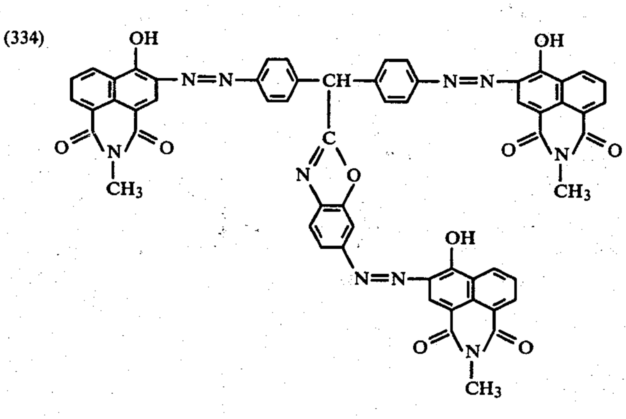
(335)
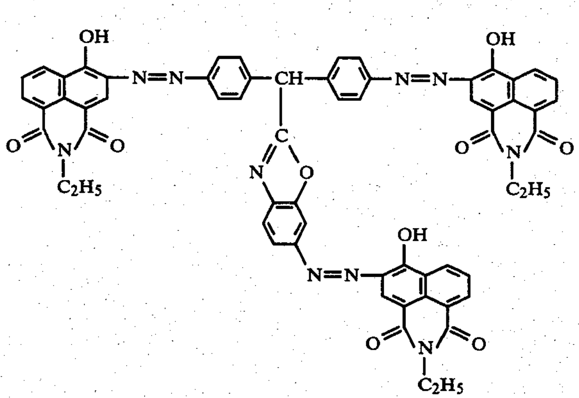
(336)
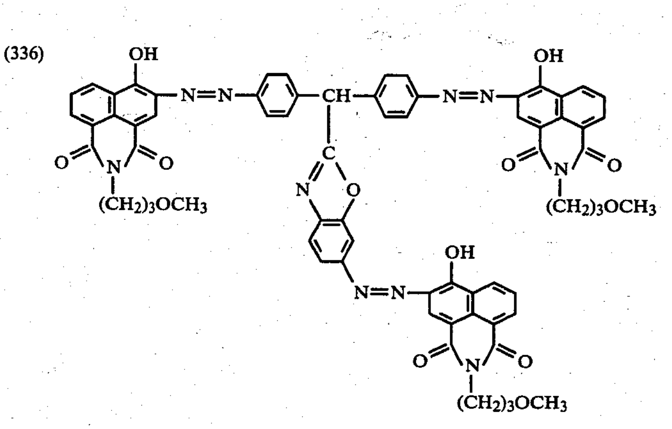
(337)

-continued
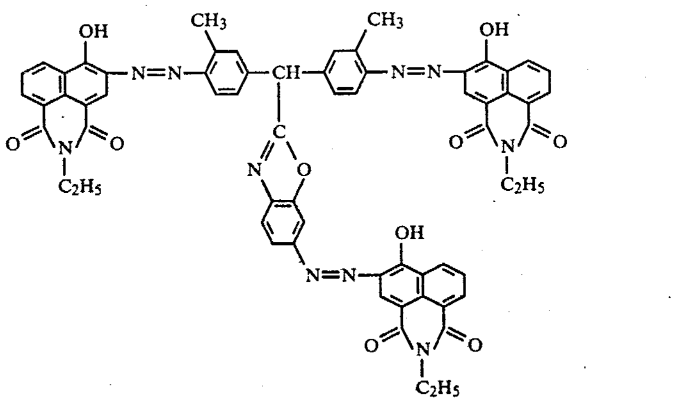
(338)
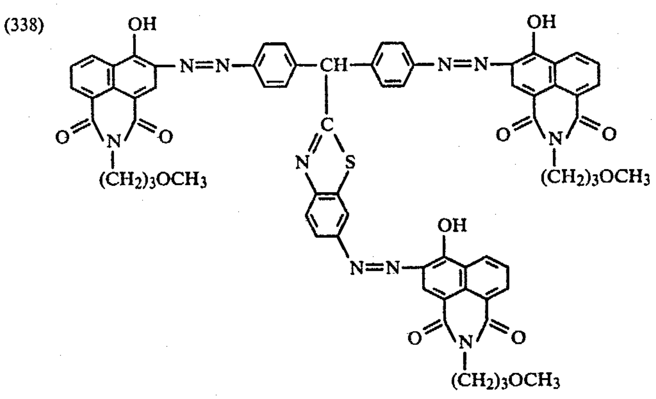
(339)
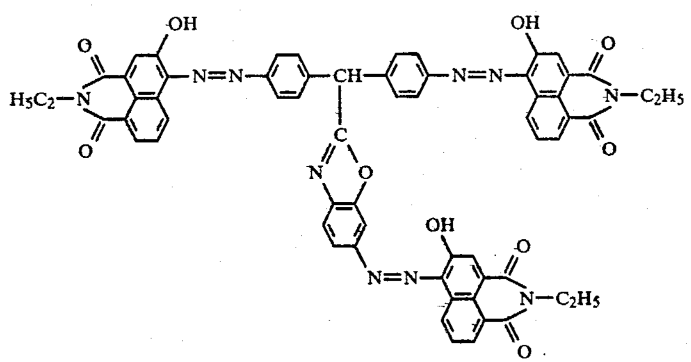
(340)
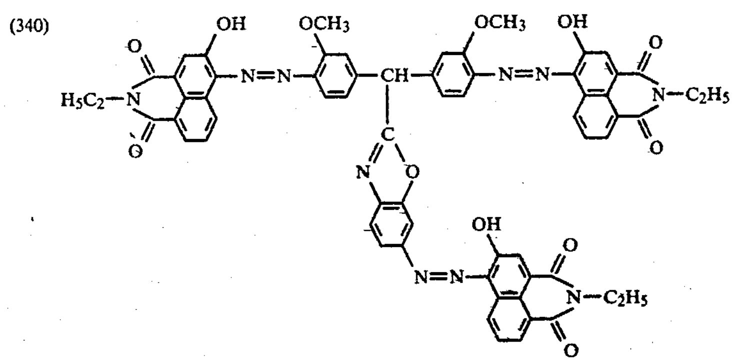
(341)

-continued
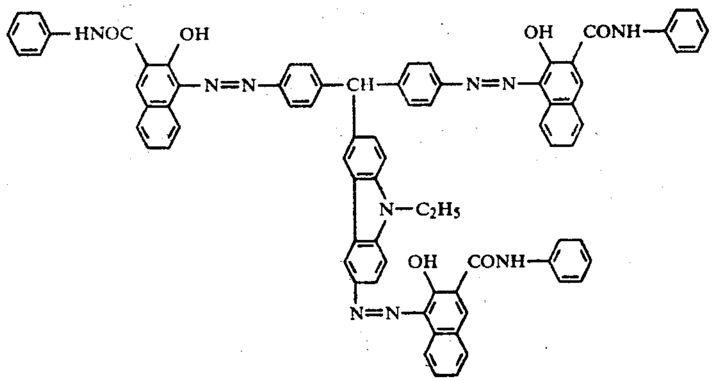
(342)
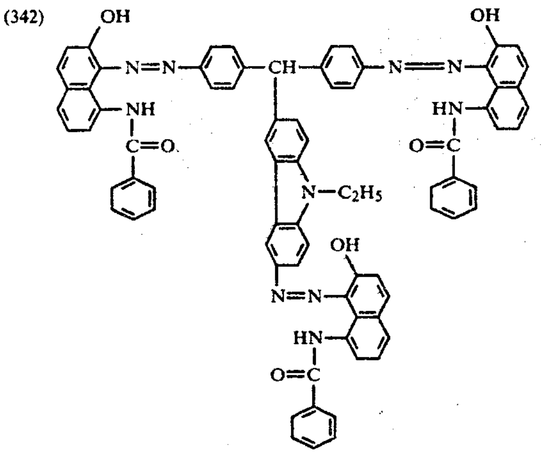
(343)
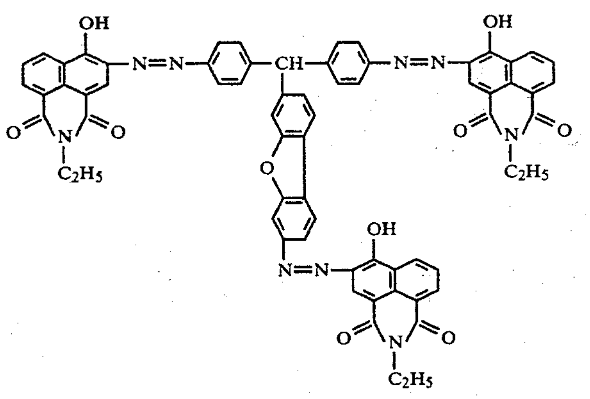
(344)
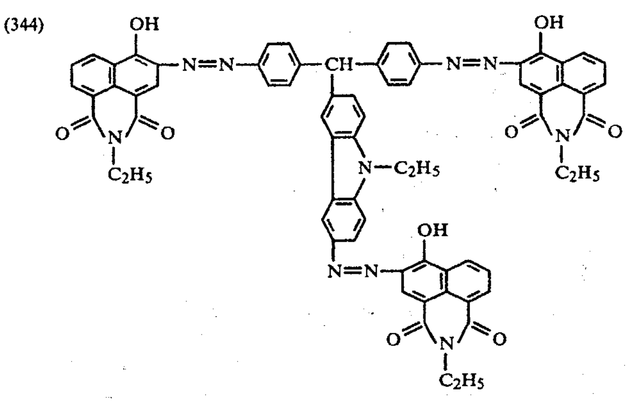
(345)

-continued
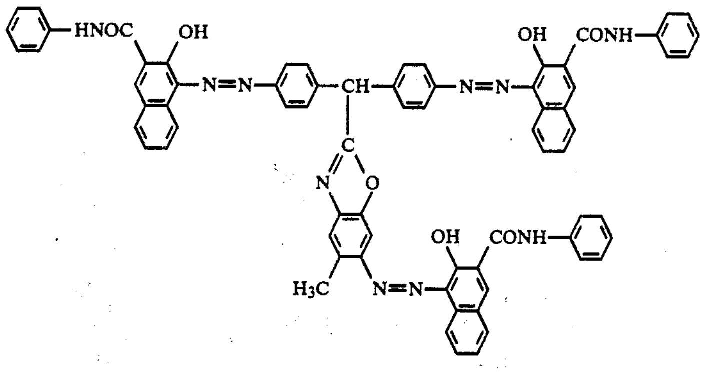
(346) 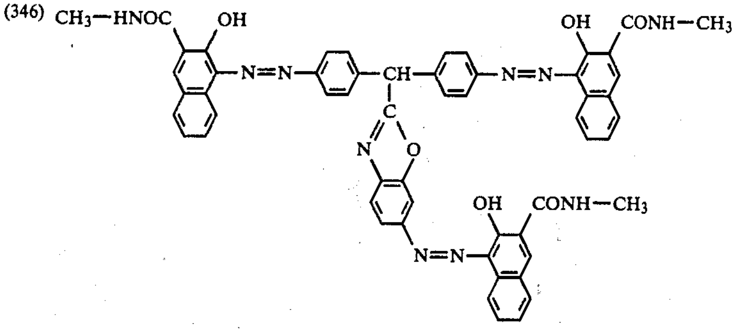 (347)
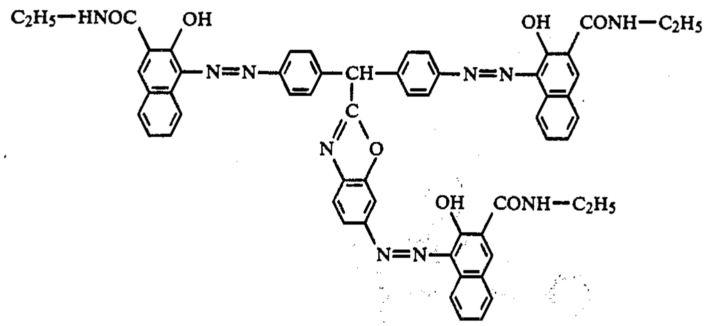
(348) 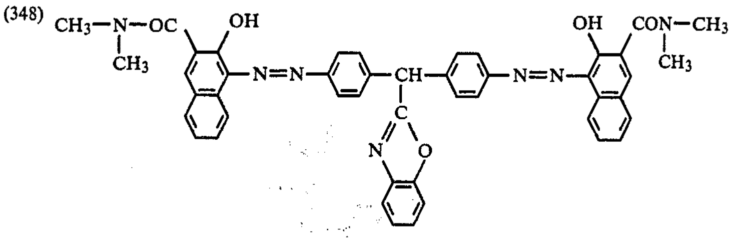 (349)
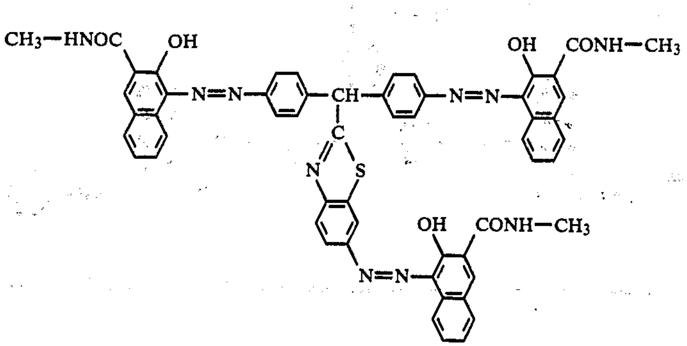
(350) 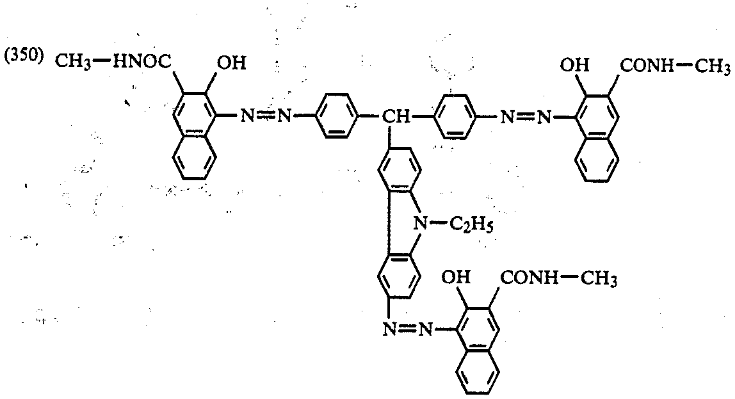 (351)

-continued
(352)
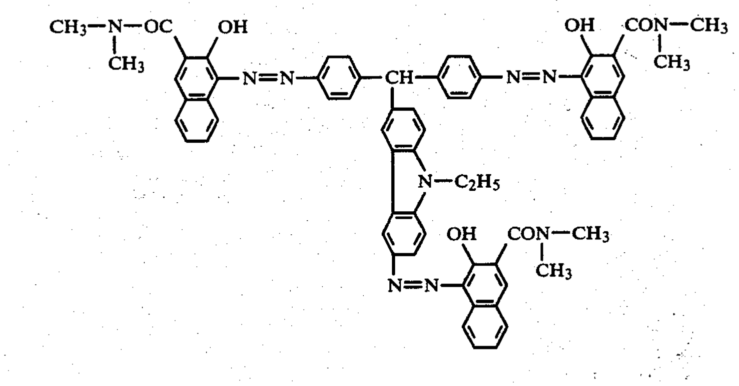
(353)
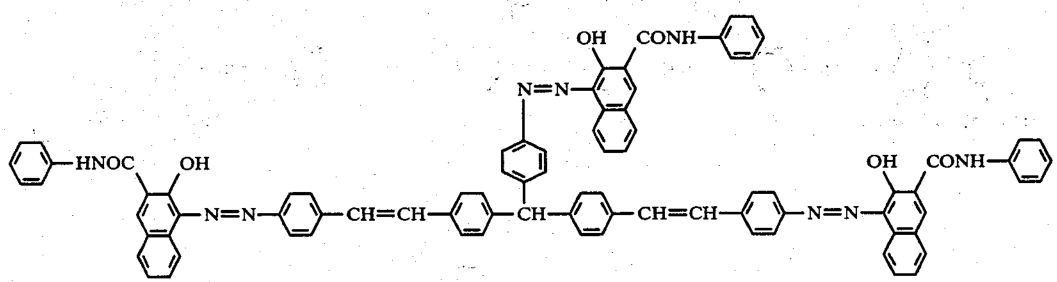
(354)
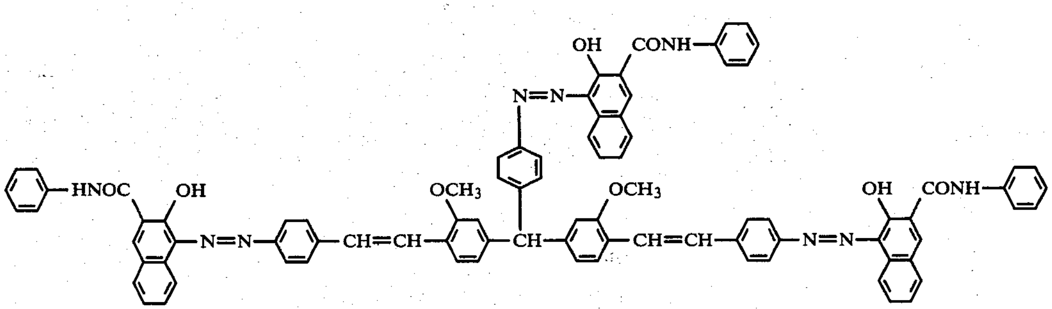

-continued
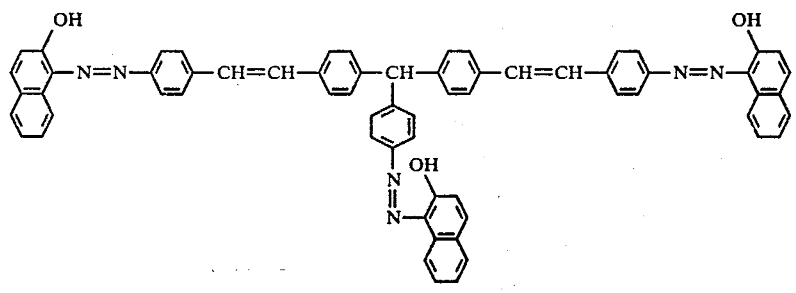
(355)
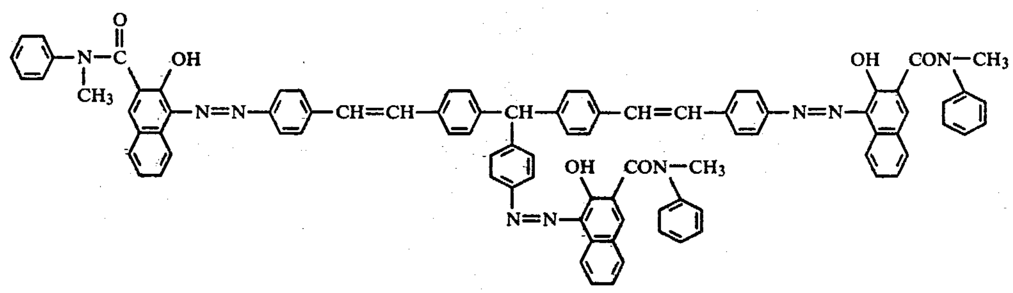
(356)
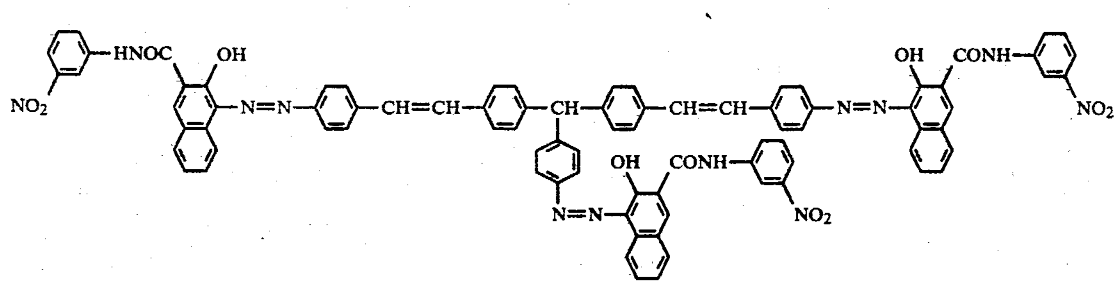
(357)

-continued
(358)
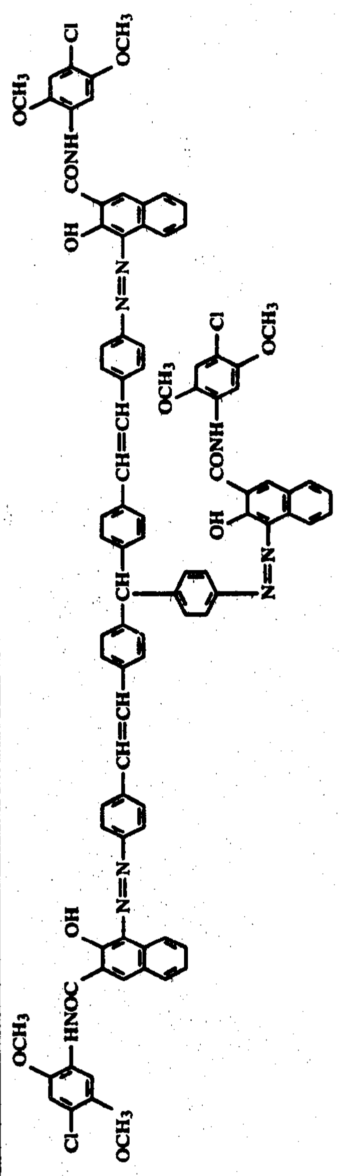
(359)
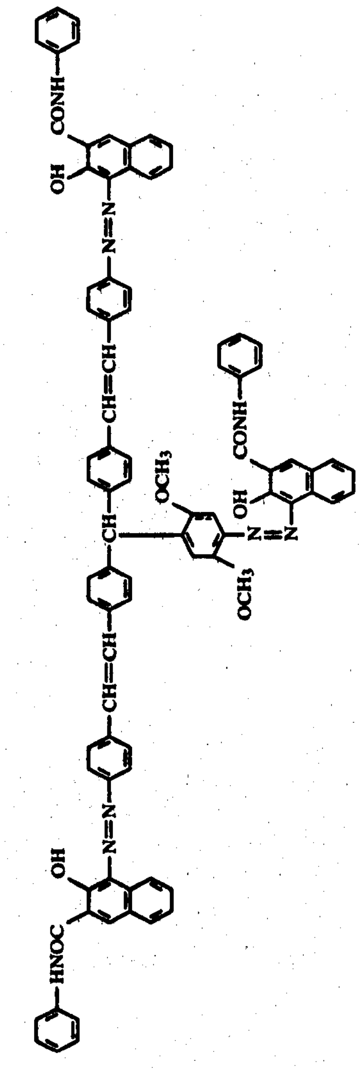
(360)
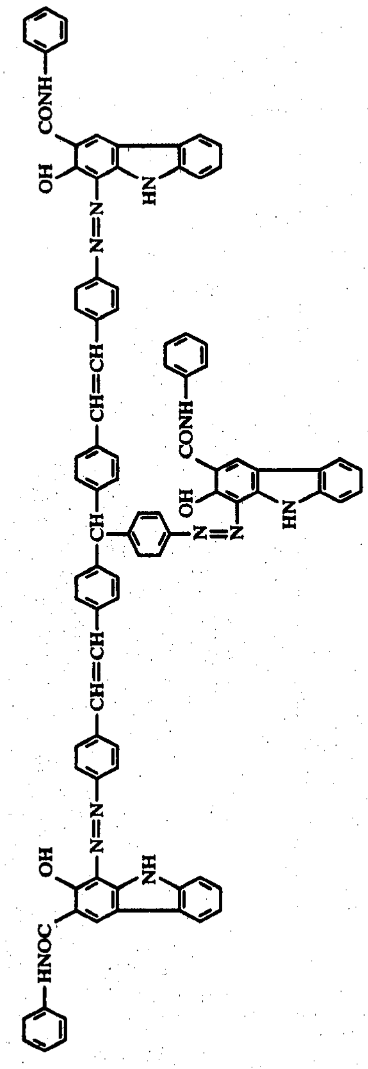

-continued
(361)
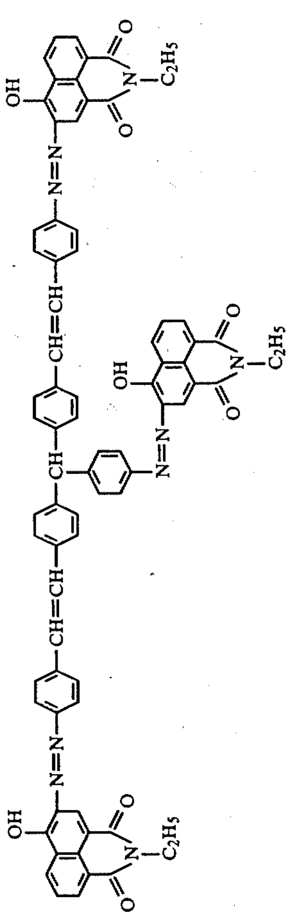
(362)
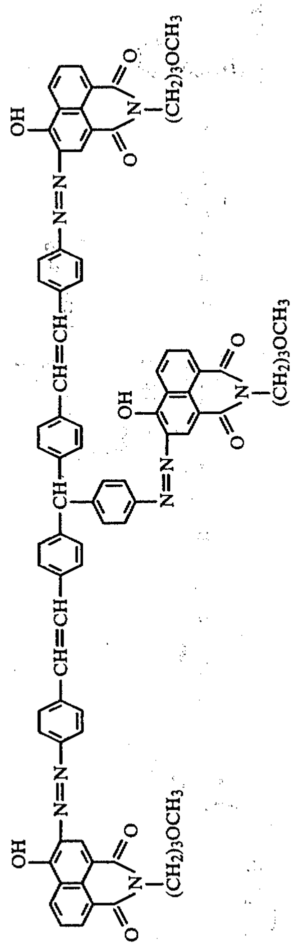
(363)
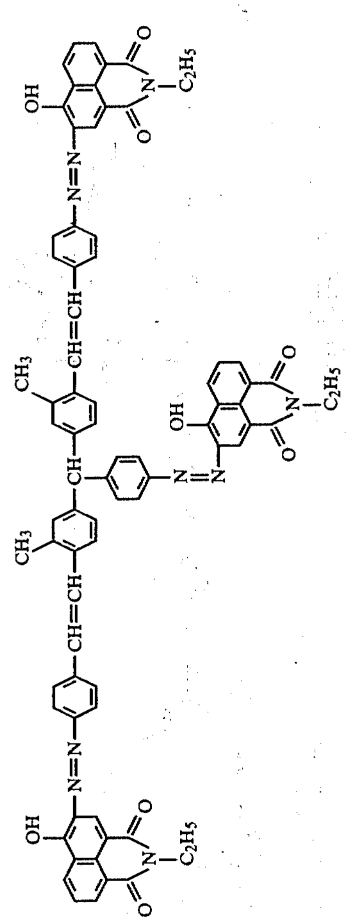

-continued
(364)
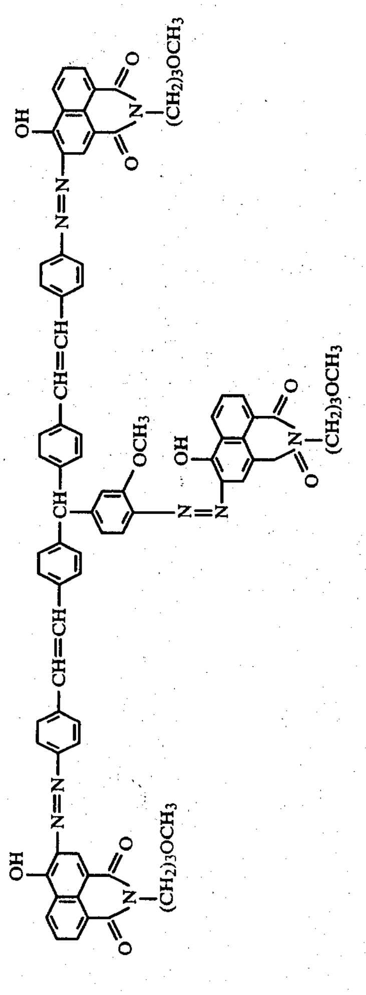
(365)
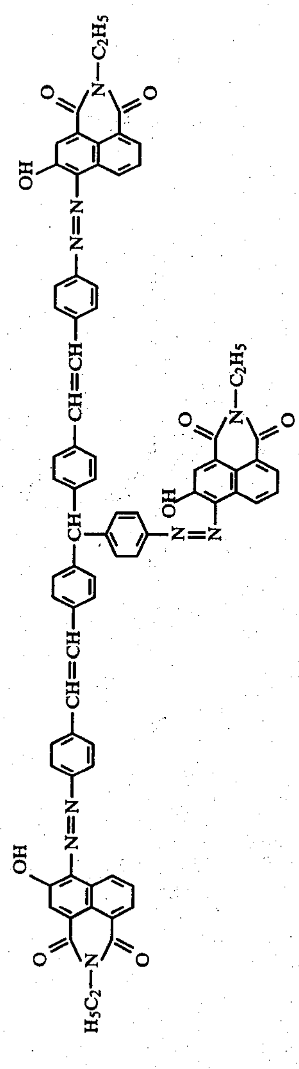
(366)
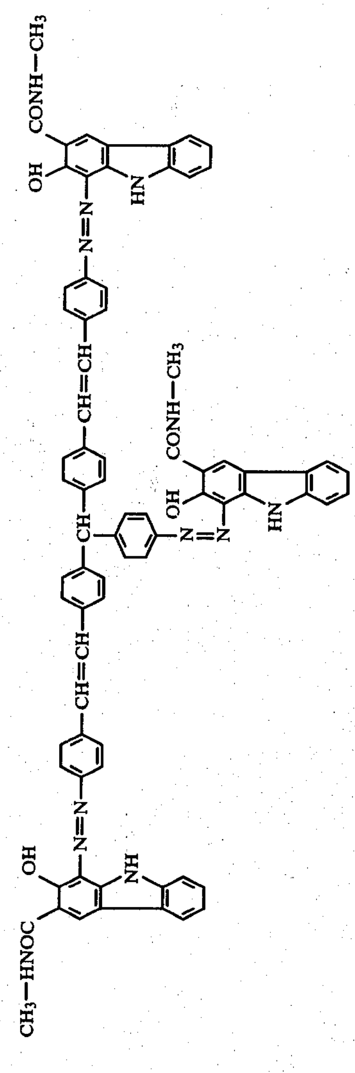

-continued
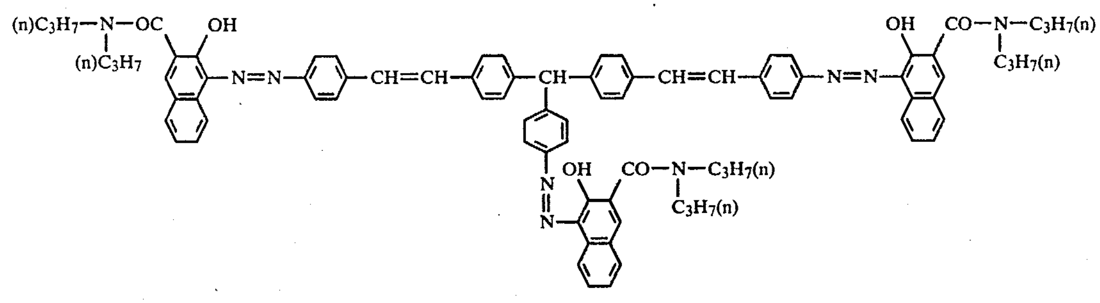
(367)
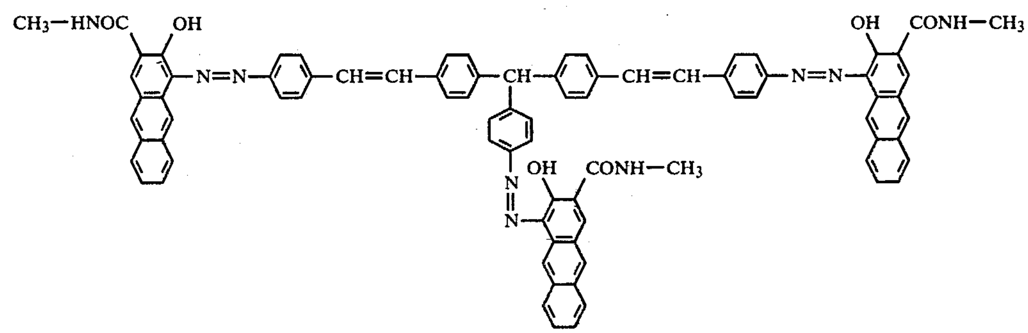
(368)
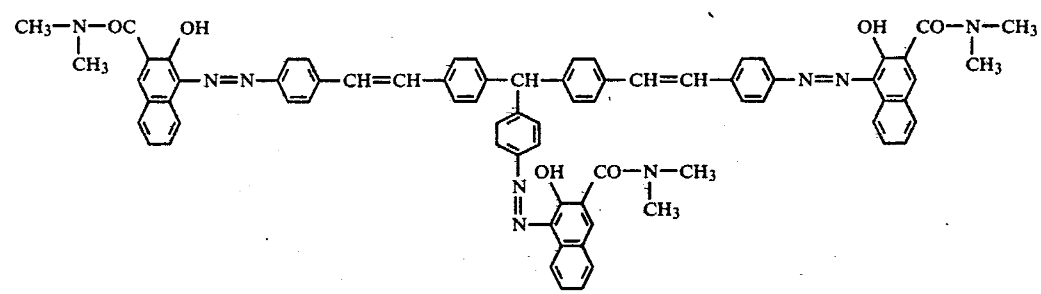
(369)

-continued
(370)
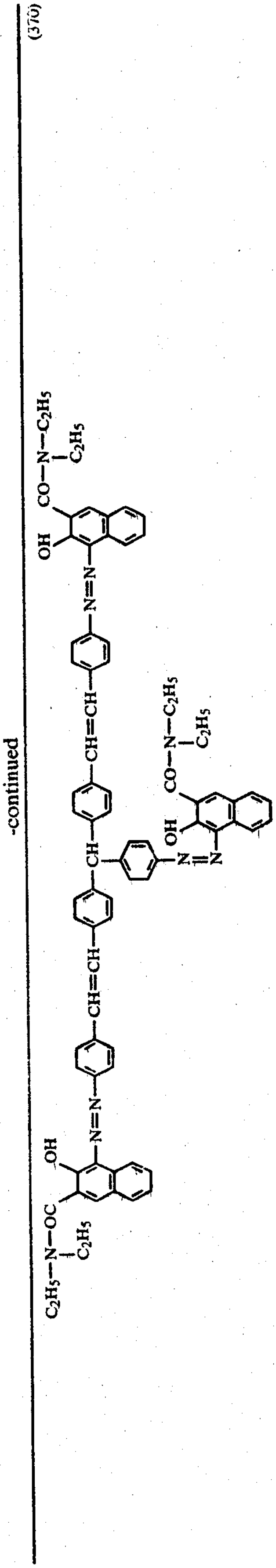
(371)
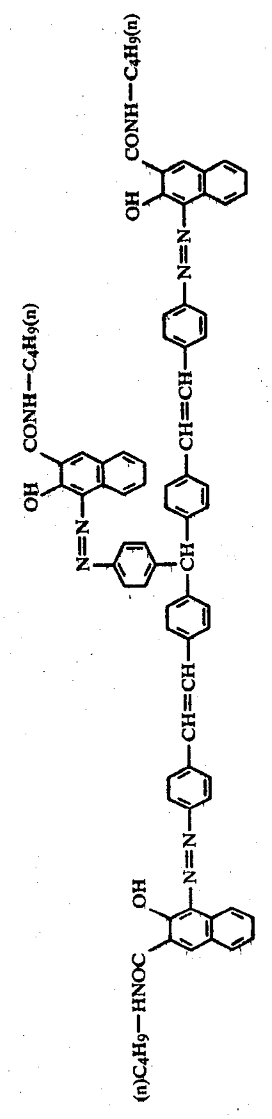
(372)
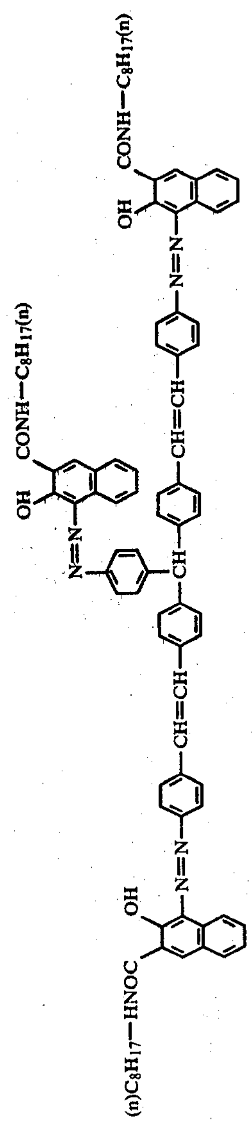
(373)
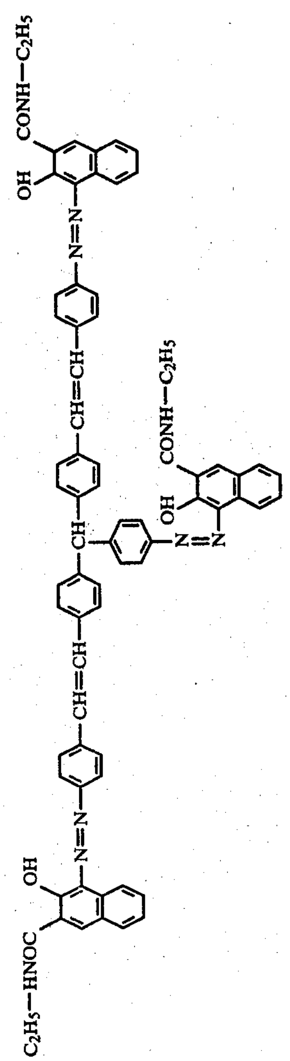

-continued
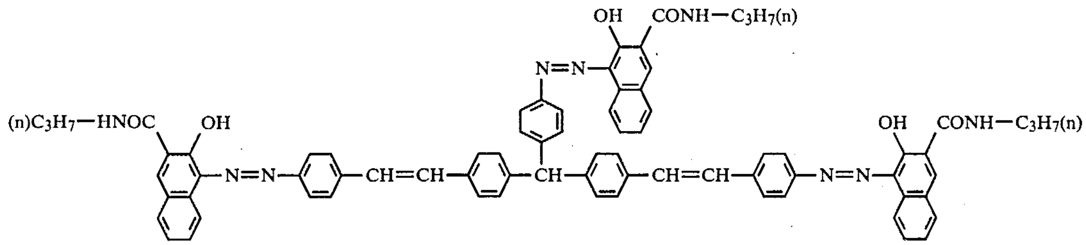
(374)
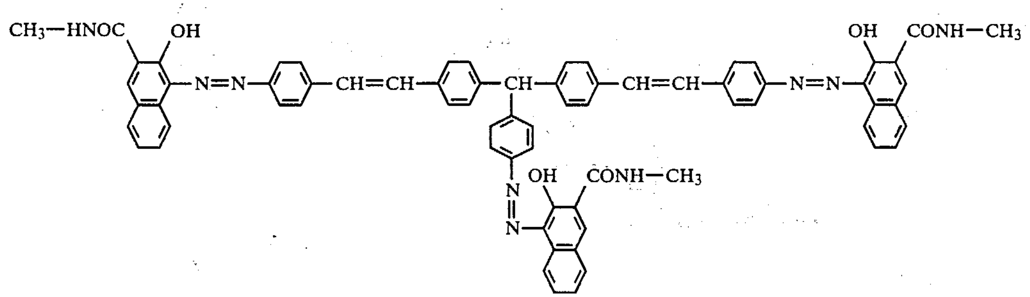
(375)

(376)
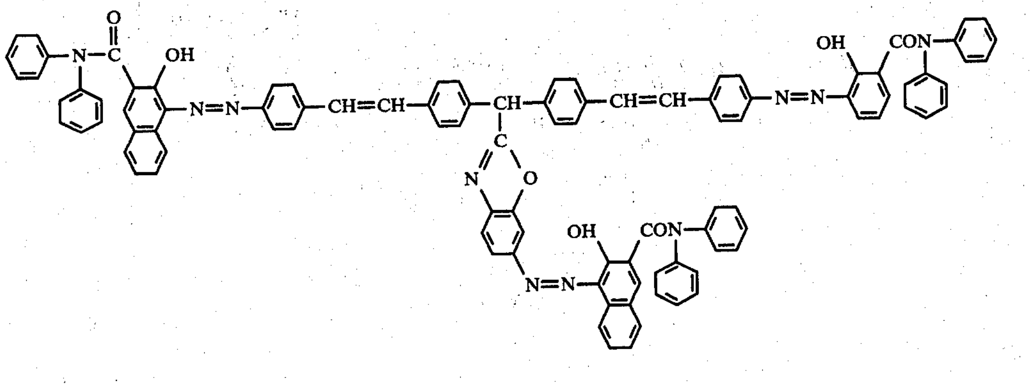
(377)
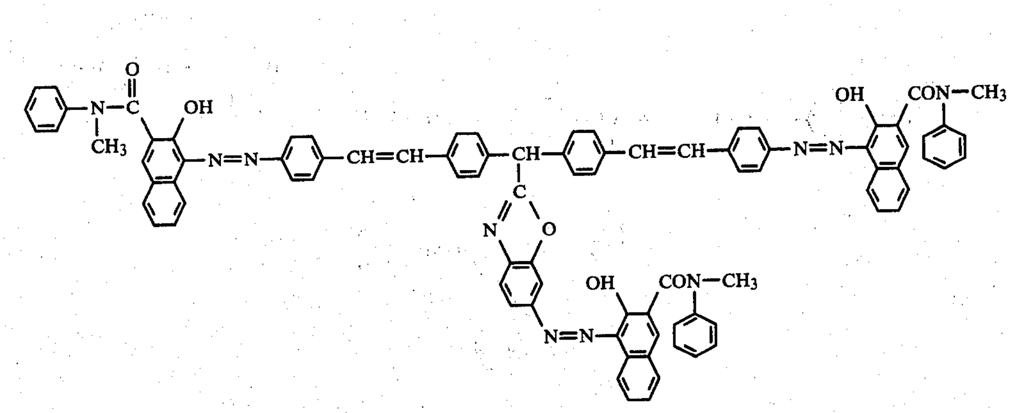
(378)
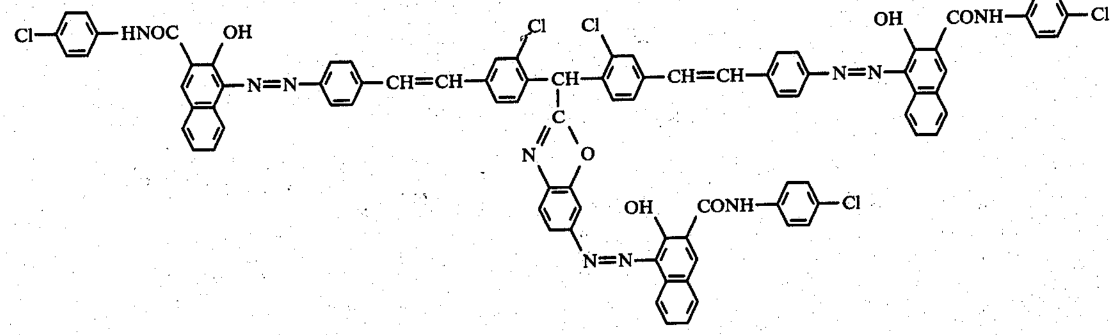
(379)
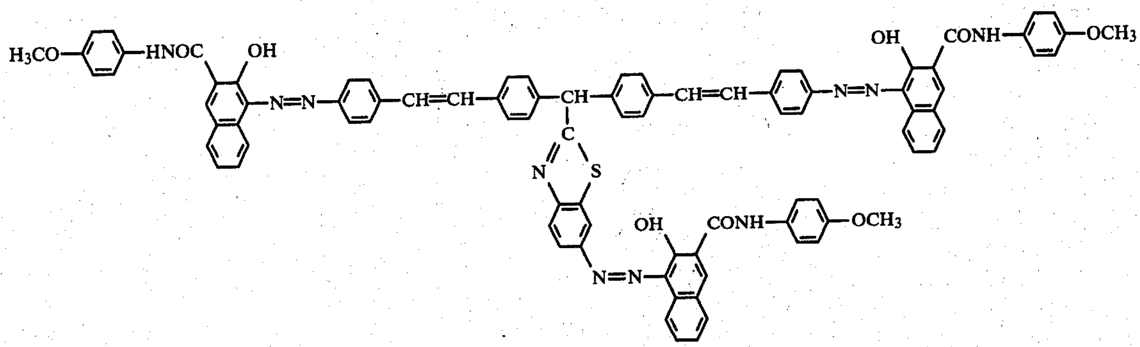

-continued
(380)
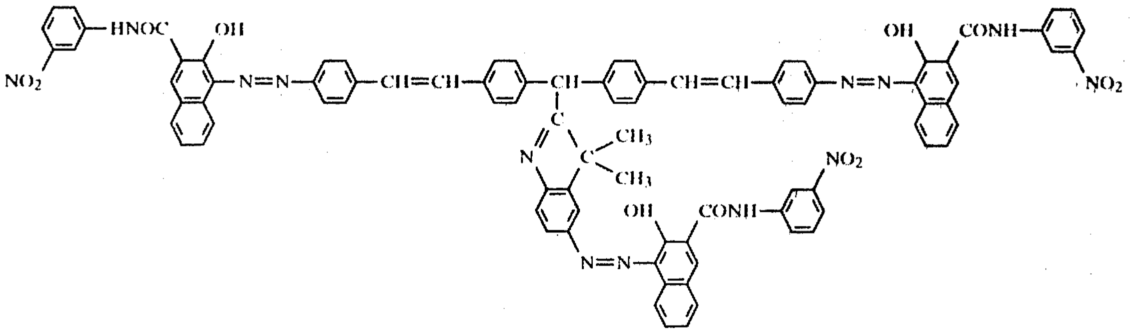
(381)
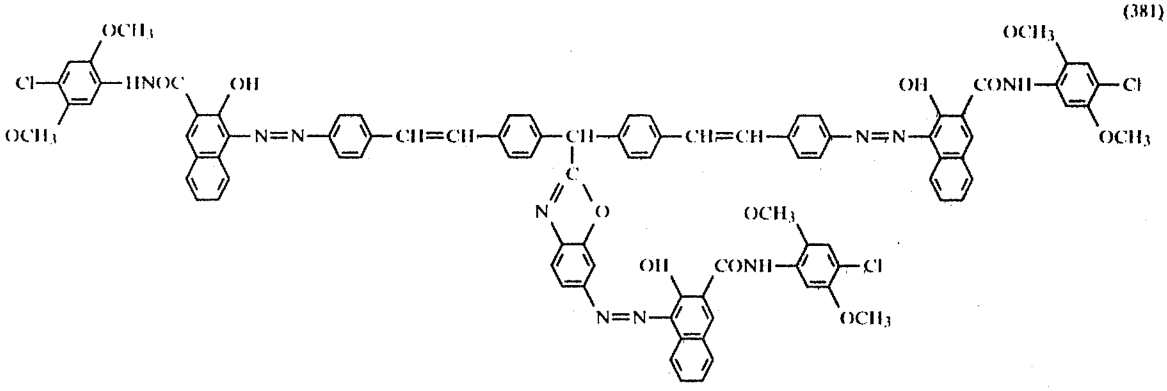
(382)
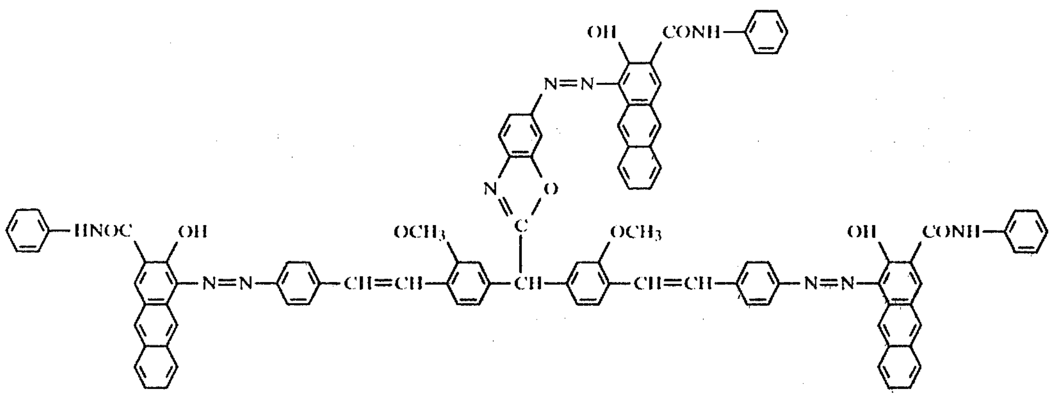
(383)
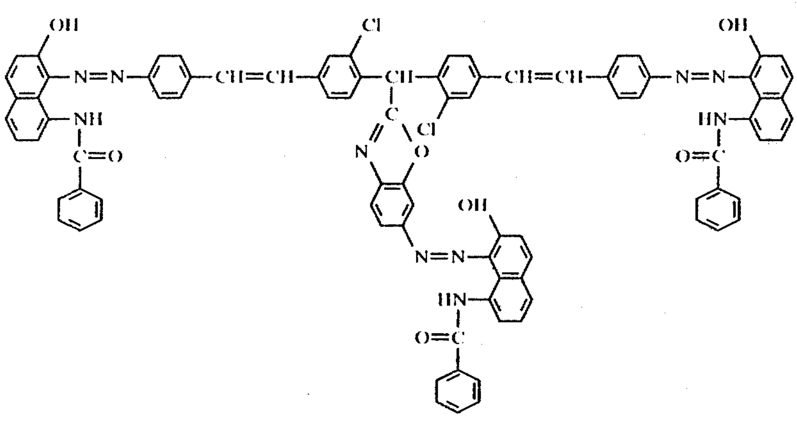

-continued
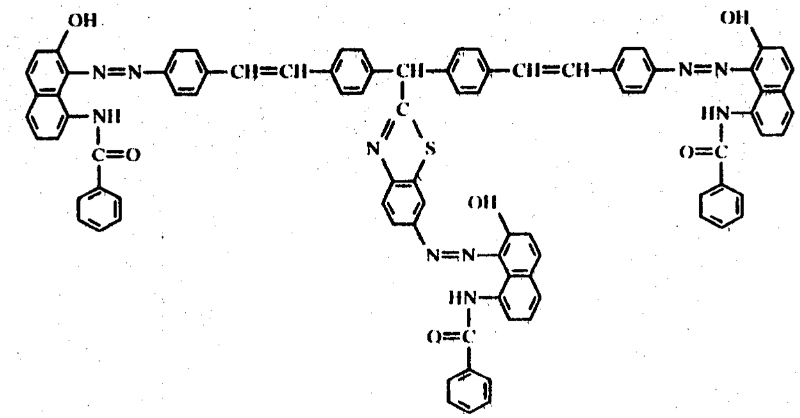
(384)
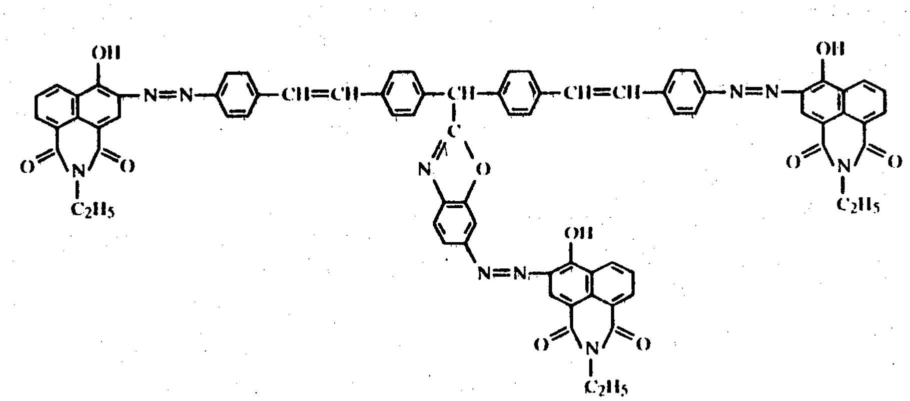
(385)
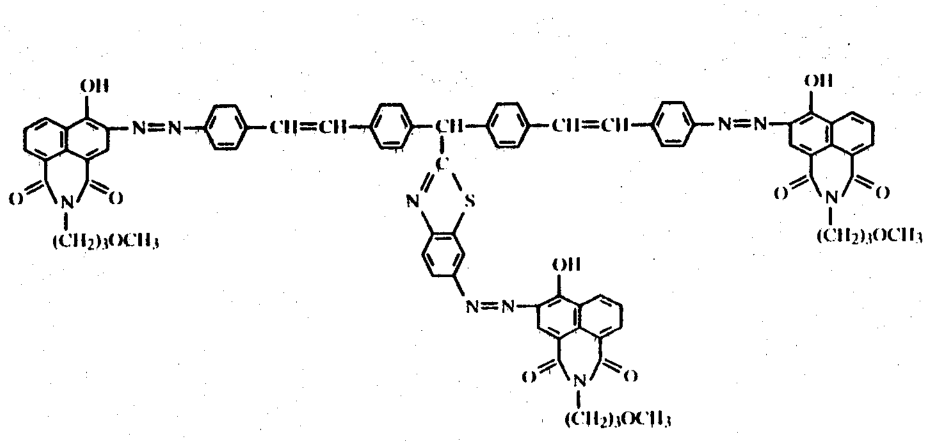
(386)
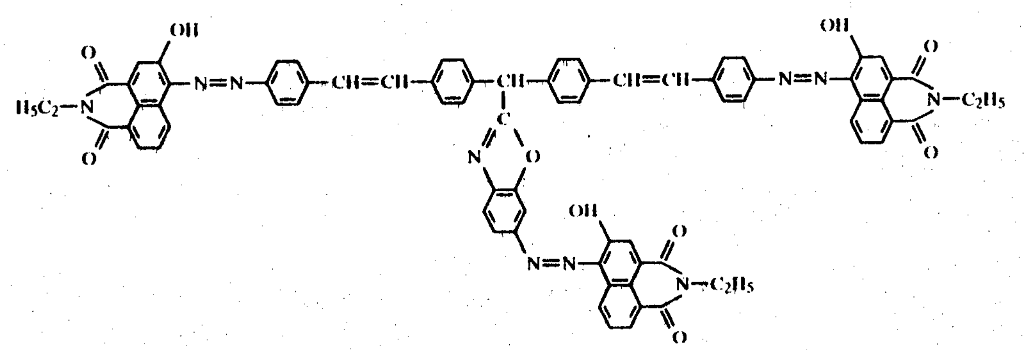
(387)

-continued
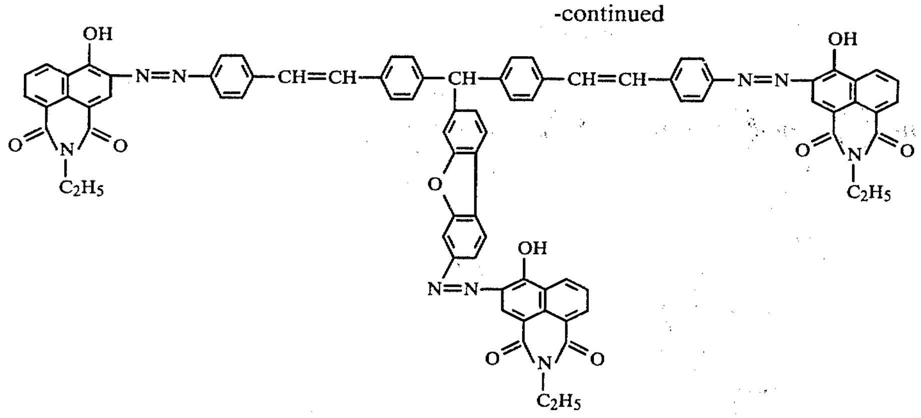
(388)
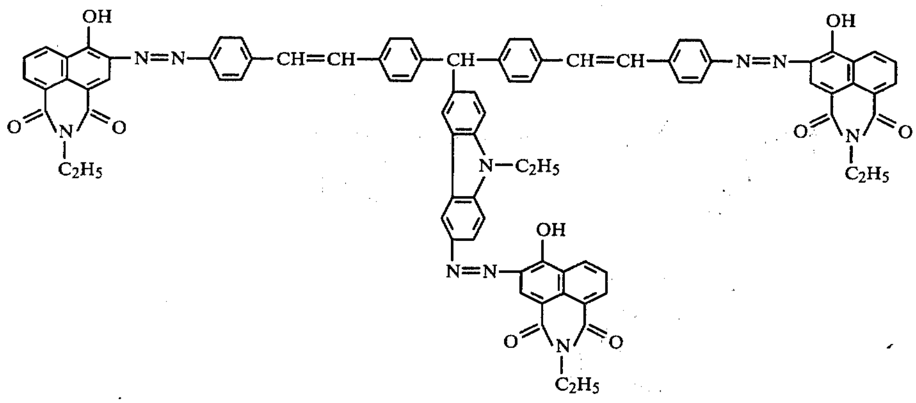
(389)
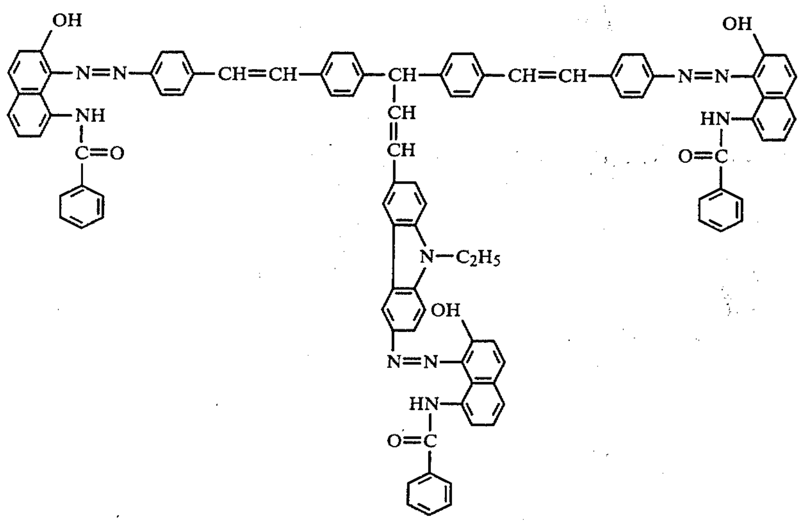
(390)
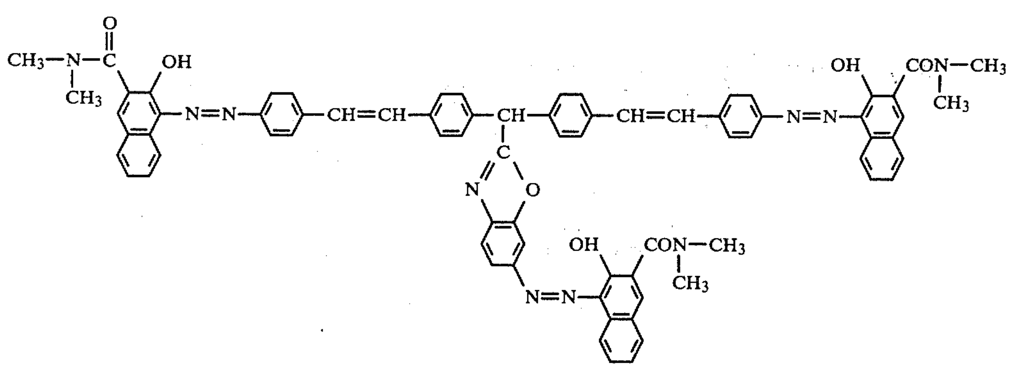
(391)

-continued
(392)
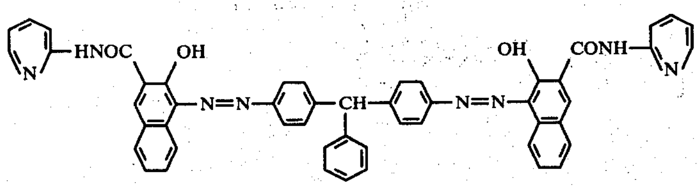
(393)
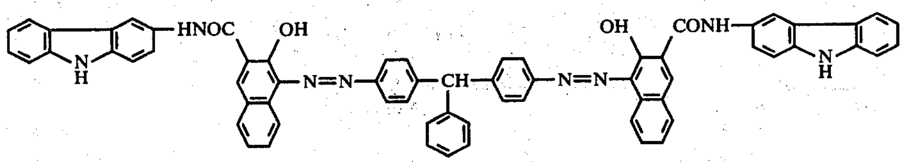
(394)
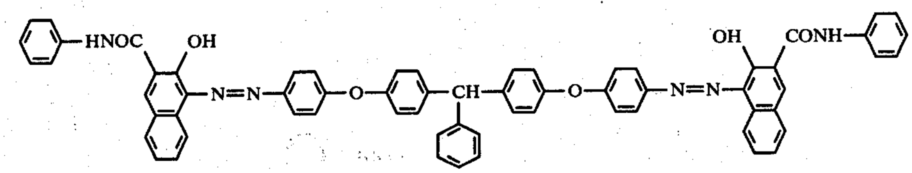
(395)
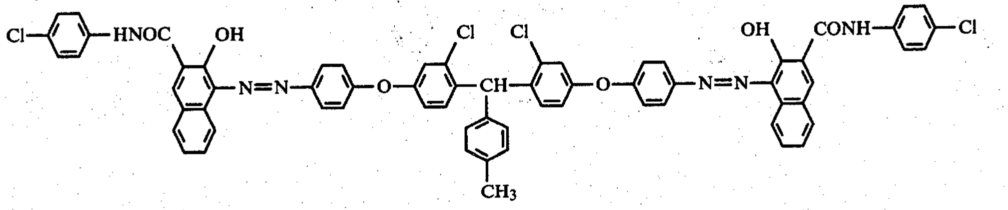
(396)
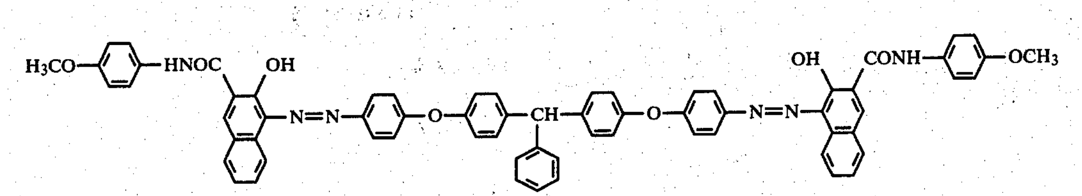
(397)
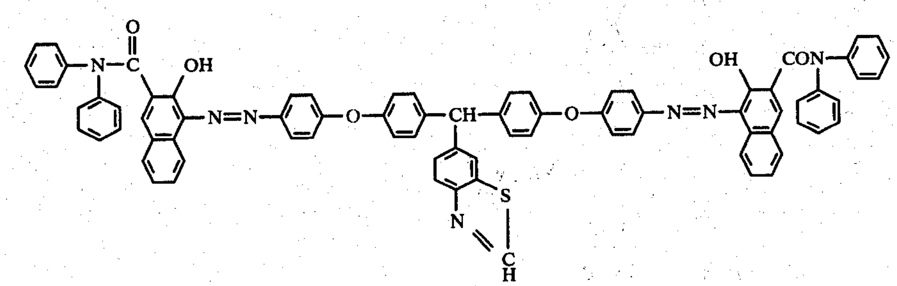
(398)
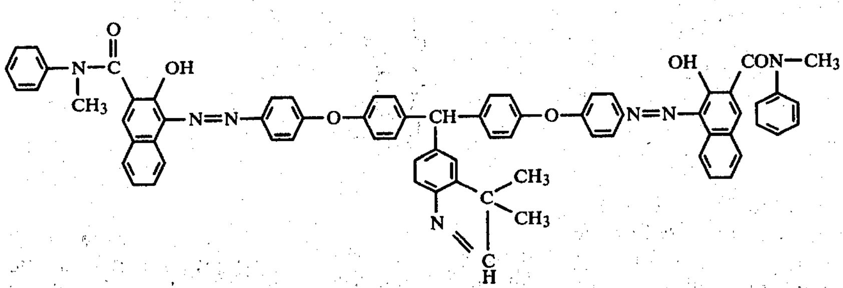

-continued (399)

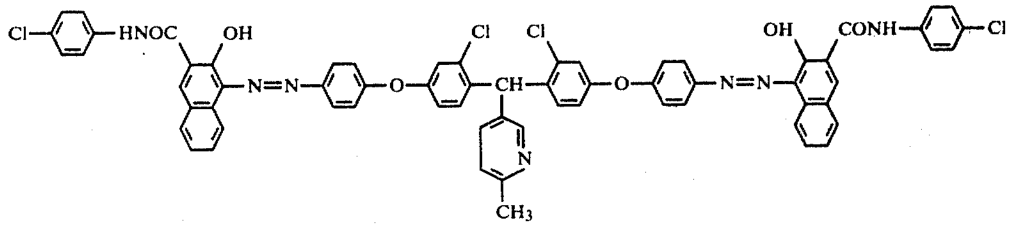

(400)

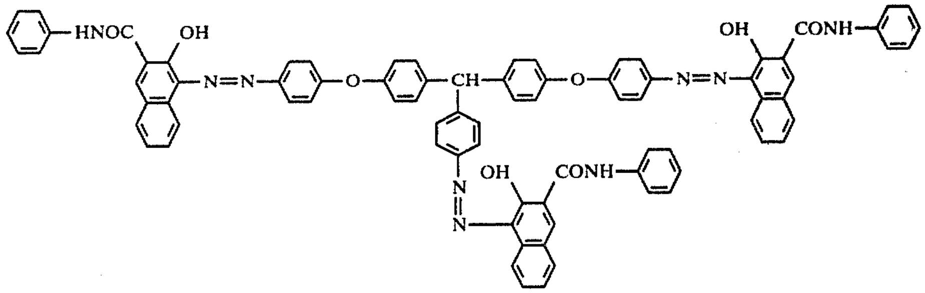

(401)

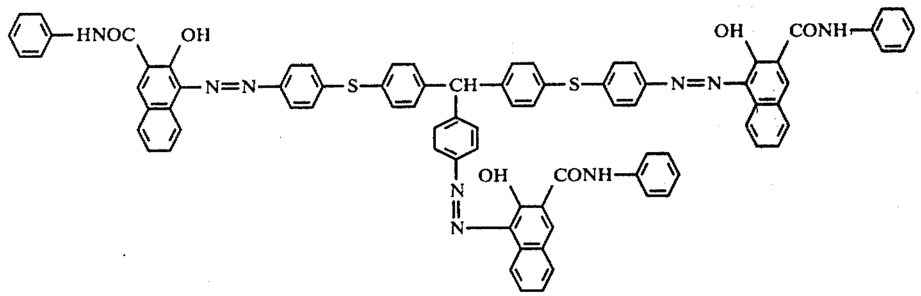

(402)

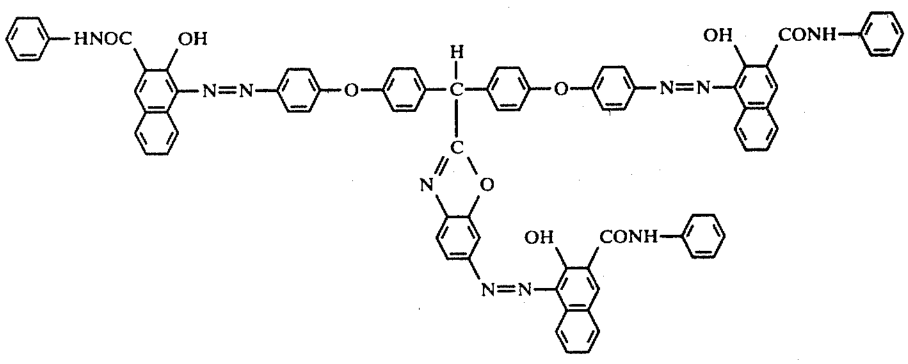

(403)

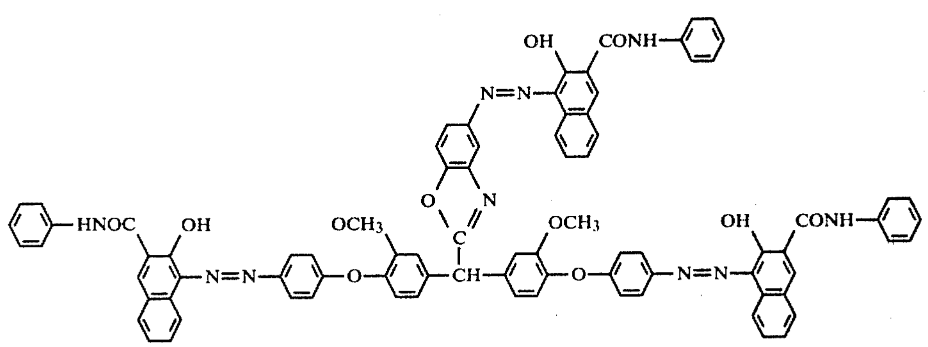

These disazo pigments can be readily prepared in the way that (1) a diamine compound is tetrazotized by the usual method and the resulting tetrazonium salt is coupled with a coupler in the presence of an alkali or (2) a tetrazonium salt formed similarly is isolated by using a fluoroborate or zinc chloride and coupled with a coupler in a solvent such as N,N-dimethylformamide or dimethylsulfoxide in the presence of an alkali.

The trisazo pigments can be also readily prepared in the same ways by using triamine compounds as a starting material.

Synthesis examples will be given below referring to typical azo pigments of those listed above.

SYNTHESIS EXAMPLE 1

Synthesis of disazo pigment No. 1 cited above.

Water (80 ml), conc. hydrochloric acid (16.6 ml, 0.19 mol) and a diamine

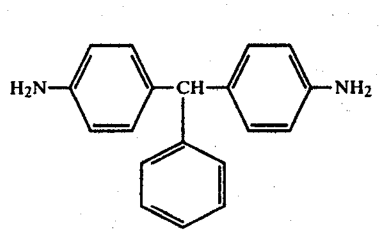

(7.9 g, 0.029 mol) were placed in a 500 ml beaker and cooled to 3° C. with an ice-cold water bath while stirring. A solution of sodium nitrite (4.2 g, 0.061 mol) in water (7 ml) was added dropwise into the above diamine solution taking 10 minutes while keeping the liquid temperature within the range 3°-10° C. The mixture was stirred for further 30 minutes at the same temperatures, and after addition of active carbon was filtered to prepare a tetrazonium solution.

On the other side, sodium hydroxide (21 g, 0.53 mol) and then naphthol AS (3-hydroxy-2-naphthoic anilide) (16.2 g, 0.061 mol) were dissolved in water (700 ml) contained in a 2-liter beaker to prepare a coupler solution.

The above tetrazonium solution was dropped into this coupler solution cooled to 6° C., taking 30 minutes while controlling the liquid temperature to 6°-10° C. with stirring. The reaction mixture, stirred for further two hours at room temperature, was allowed to stand overnight. After filtration and rinsing of the precipitate, a crude pigment (17,6 g) was obtained. It was subjected to 5-fold hot filtrations using N,N-dimethylformamide (400 ml each time) and on vacuum drying while heating, gave a reddish purple purified pigment (14.0 g); yield 69%.

| Analysis: | Calcd. for $C_{43}H_{38}N_6O_4$ (%) | Found (%) |
|---|---|---|
| C | 73.50 | 73.42 |
| H | 5.41 | 5.38 |
| N | 11.97 | 12.01 |

SYNTHESIS EXAMPLE 2

Synthesis of disazo pigment No. 48

A solution of sodium nitrite (3.54 g, 0.051 mol) in water (10.6 ml) was dropped into a solution of

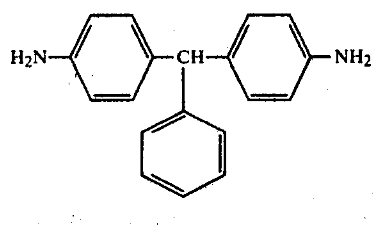

(6.85 g, 0.025 mol) in hydrochloric acid (conc. HCl 13.24 ml, 0.15 mol+water 65 ml) during 5 minutes while keeping the liquid temperature at 4.5°-7° C., and the mixture was stirred for further 30 minutes at the same temperatures.

The resulting tetrazonium solution was dropped into a solution containing 3-hydroxynaphthalene-2-carboxylic methylamide (10.57 g, 0.0525 mol) and sodium hydroxide (16.8 g, 0.42 mol) in water (420 ml), taking 10 minutes while keeping the liquid temperature at 4°-10° C. The reaction mixture was stirred for further two hours at the same temperature and allowed to stand overnight. After filtration, rinsing, drying, and Soxhlet extraction for two hours with methyl ethyl ketone, a reddish purple dry pigment (14.0 g) was obtained; yield 80%.

| Analysis: | Calcd. for $C_{43}H_{34}N_6O_4$ (%) | Found (%) |
|---|---|---|
| C | 73.92 | 73.95 |
| H | 4.87 | 4.92 |
| N | 12.03 | 11.98 |

SYNTHESIS EXAMPLE 3

Synthesis of disazo pigment No. 66

This pigment (25.6 g) reddish purple was obtained in the same way as Synthesis Example 1 except for using

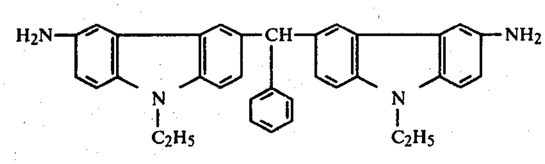

in place of the diamine used in that example; yield 82.8%.

| Analysis: | Calcd. for $C_{69}H_{52}N_8O_4$ (%) | Found (%) |
|---|---|---|
| C | 78.41 | 78.47 |
| H | 4.92 | 4.86 |
| N | 10.61 | 10.66 |

SYNTHESIS EXAMPLE 4

Synthesis of disazo pigment No. 98

Water (80 ml), conc. hydrochloric acid (16.6 ml, 0.19 mol), and

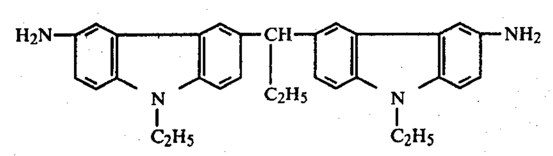

(13.3 g, 0.029 mol) were placed in a 500-ml beaker and cooled to 3° C. with an ice-cold water bath while stirring. A solution of sodium nitrite (4.2 g, 0.061 mol) in water (7 ml) was added dropwise into the above diamine solution taking 10 minutes while keeping the liquid temperature within the range 3°-10° C. The mixture was stirred for further 30 minutes at the same temperature, and after addition of active carbon, was filtered to prepare a tetrazonium solution.

3-Hydroxynaphthalene-2-carboxylic acid-N,N-diphenylhydrazide (21.6 g, 0.061 mol) was dissolved in a solution of sodium hydroxide (21 g, 0.53 mol) in water (700 ml) contained in a 2-liter beaker.

The above tetrazonium was dropped into this coupler solution cooled to 6° C., taking 30 minutes while controlling the liquid temperature to 6°–10° C. with stirring. The reaction mixture, stirred for further two hours at room temperature, was allowed to stand for overnight. Filtration and rinsing of the precipitate gave a crude pigment (27.4 g). It was subjected to 5-fold hot filtrations using N,N-dimethylformaldehyde (400 ml each time), and on vacuum drying while heating, gave a purified pigment (25.0 g); yield 72.4%.

| Analysis: | Calcd. for $C_{77}H_{63}N_{10}O_4$ (%) | Found (%) |
|---|---|---|
| C | 77.58 | 77.53 |
| H | 5.29 | 5.33 |
| N | 11.75 | 11.78 |

SYNTHESIS EXAMPLE 5

Synthesis of diazo pigment No. 142

This pigment (19.8 g) was obtained in the same way as in Synthesis Example 1 except for using

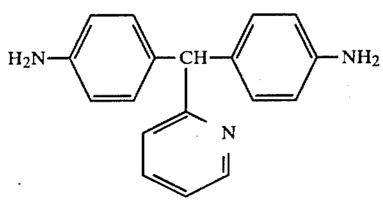

(8.0 g, 0.029 mol) in place of the diamine used in that example; yield 82.8%.

| Analysis: | Calcd. for $C_{52}H_{37}N_7O_4$ (%) | Found (%) |
|---|---|---|
| C | 75.82 | 75.88 |
| H | 4.50 | 4.47 |
| N | 11.91 | 11.96 |

SYNTHESIS EXAMPLE 6

Synthesis disazo pigment No. 173

This pigment (14.7 g) was obtained in the same way as in Synthesis Example 2 except for using

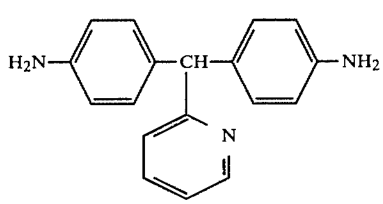

(6.9 g, 0.025 mol) in place of the diamine used in that example; yield 84%.

| Analysis: | Calcd. for $C_{42}H_{33}N_7O_4$ (%) | Found (%) |
|---|---|---|
| C | 72.10 | 72.04 |
| H | 4.72 | 4.76 |
| N | 14.02 | 14.05 |

SYNTHESIS EXAMPLE 7

Synthesis of trisazo pigment No. 240

Water (80 ml), conc. hydrochloric acid (16.6 ml, 0.19 mol), and

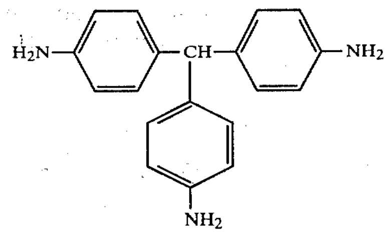

(8.4 g, 0.029 mol) were placed in a 500-ml beaker and cooled to 3° C. with an ice-cold water bath while stirring. A solution of sodium nitrite (4.2 g, 0.061 mol) in water (7 ml) was added dropwise into the above triamine solution taking 10 minutes while keeping the liquid temperature within the range 3°–10° C. The mixture was stirred for further 30 minutes at the same temperatures, and after addition of active carbon, was filtered to prepare a hexazonium solution.

Sodium hydroxide (33.6 g, 0.84 mol) and then naphthol-AS (25.2 g, 0.096 mol) were dissolved in water (850 ml) contained in a 2-liter beaker.

The above hexazonium solution was dropped into this coupler solution cooled to 6° C., taking 30 minutes while controlling the liquid temperature to 6°–10° C. with stirring. The reaction mixture, stirred for further two hours at room temperature, was allowed to stand overnight. After filtration and rinsing of the precipitate, a crude pigment (22.2 g) was obtained. It was subjected to 5-fold hot filtrations using N,N-dimethylformamide (400 ml each time), and on vacuum dyring while heating, gave a purified pigment (20.0 g); yield 62%.

| Analysis: | Calcd. for $C_{70}H_{49}N_9O_6$ (%) | Found (%) |
|---|---|---|
| C | 75.61 | 75.57 |
| H | 4.41 | 4.36 |
| N | 11.34 | 11.39 |

SYNTHESIS EXAMPLE 8

Synthesis of trisazo pigment No. 278

This trisazo pigment, reddish purple, was obtained in the same way as Synthesis Example 7 except for using

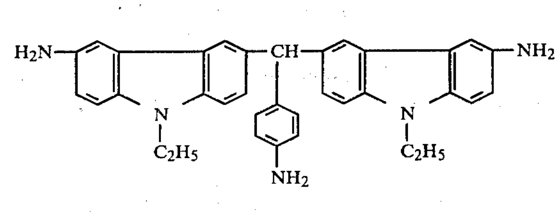

in place of the triamine compound used in that Example.

SYNTHESIS EXAMPLE 9

Synthesis of trisazo pigment No. 342

This pigment, reddish purple, was obtained in the same way as Synthesis Example 7 except for using the following triamine:

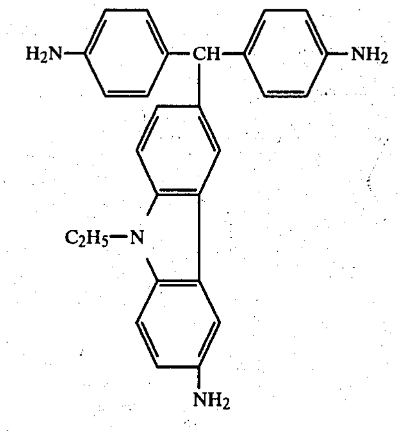

SYNTHESIS EXAMPLE 10

Synthesis of trisazo pigment No. 351

The same hexazonium solution as in Synthesis Example 7 was prepared and dropped into a solution of 3-hydroxynaphthalene-2-carboxylic methylamide in an aqueous sodium hydroxide taking 10 minutes while keeping the liquid temperature at 4°-10° C. The reaction mixture, stirred for further two hours at the same temperature and allowed to stand overnight, was filtered. The filtered cake was rinsed and dried, and an Soxhlet extraction with methyl ethyl ketone for two hours, gave the above pigment purified.

These azo pigments may be used either singly or in combination.

The electrophotographic photosensitive member of this invention can be made by coating a suitable substrate with a charge generation layer containing the azo pigments cited above and coating in turn this charge generation layer with a charge transport layer.

This type of photosensitive member, having such laminate photosensitive layers, may be also provided with an intermediate layer between the substrate and the charge generation layer containing the azo pigments. This intermediate layer acts to bar injection of free charges from the conductive substrate into the photosensitive layer upon charging the photosensitive layers of laminate structure, and simultaneously acts as a bond layer to hold the photosensitive layers en masse combined with the conductive substrate. This intermediate or bond layer can be formed from a metal oxide such as aluminum oxide or an organic polymer such as polyethylene, polypropylene, acrylic resins, methacrylic resins, vinyl chloride resin, phenolic resins, epoxy resins, polyester resins, alkyd resins, polycarbonates, polyurethanes, polyimide resins, vinylidene chloride resin, vinyl chloride-vinyl acetate copolymer, casein, gelatin, poly(vinyl alcohol), copolymer of acrylic acid and ethylene, nitrocellulose, and the like. Thickness of this layer is desirably 0.1-5μ, preferably 0.5-3μ.

The present photosensitive member may also have a laminate structure provided with a charge generation layer over a charge transport layer on which a suitable surface protective layer can also be formed.

The charge generation layer can be formed by vacuum deposition, sputtering, glow discharge, usual coating, and the like.

For the coating, charge-generating materials can be applied with no binder, in the form of dispersion in a resin binder, in the form of homogenous solution together with a binder, or the like. The dispersion of azo pigments can be carried out by known means such as ball mills or attritors, where suitable particle sizes of the dispersed pigments are up to 5μ, preferably up to 2μ, and most preferably up to 0.5μ.

The ago pigments can also be coated in the form of solution in an amine such as ethylenediamine and the like. Usual coating methods are applicable such as blade coating, Meyer bar coating, spray coating and dip coating.

Thickness of the charge generation layer is desirably up to 5μ, preferably 0.01-1μ. When a binder is incorporated into the charge generation layer, its content in the charge generation layer is desirably up to 80%, preferably up to 40%, because excessive contents of binder adversely affect the photosensitivity.

The binders usable include various resins such as poly(vinyl butyral), poly(vinyl acetate), polyesters, polycarbonates, phenoxy resins, acrylic resins, polyacrylamide, polyamides, polyvinylpyridine resin, cellulosic resin, urethane resins, casein, poly(vinyl alcohol), and the like.

The charge generation layer surface may also be mirror-finished, if necessary, for the purpose of uniforming the injection of carriers from the charge generation layer into the upper charge transport layer.

The charge transport layer is formed over the thus prepared charge generation layer. When charge-transporting materials for the charge transport layer have no film-forming property, the charge transport layer is formed by coating and drying a solution of the charge-transporting material along with a binder in a suitable solvent in the usual way. The charge transporting materials include electron-transporting materials and hole-transporting materials.

The electron-transporting materials include electron-attractive materials such as chloranil, bromanil, tetracyanoethylene, tetracyanoquinodimethane, 2,4,7-trinitro-9-fluorenone, 2,4,5,7-tetranitrofluorenone, 2,4,7-trinitro-9-dicyanomethylenefluorenone, 2,4,5,7-tetranitroxanthone, 2,4,8-trinitrothioxanthone, and the like, and polymers of these electron attractive materials.

The hole-transporting materials include pyrene, N-ethylcarbazole, N-isopropylcarbazole, 2,5-bis(p-diethyl aminophenyl)-1,3,4-oxadiazole, triphenylamine, poly(N-vinylcarbazole), halogenated poly(N-vinylcarbazole), polyvinylpyrene, polyvinylanthracene, polyvinylacridine, poly(9-vinylphenylanthracene), pyrene-formaldehyde resin, ethylcarbazole-formaldehyde resin, and the like.

The charge-transporting materials suitable in particular include, for instance, hydrazone compounds, pyrazoline compounds, oxadiazole compounds, and arylalkane compounds.

The following can be cited as examples of preferable hydrazone compound:

(1)

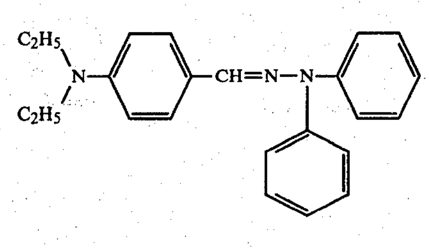

-continued (2)
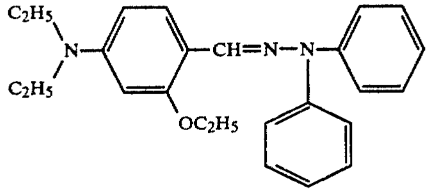

(3)
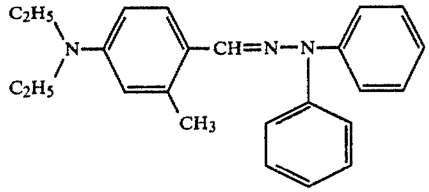

(4)
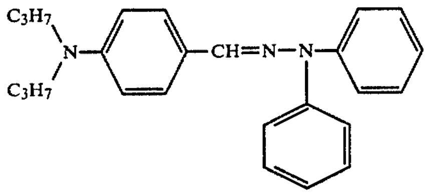

(5)
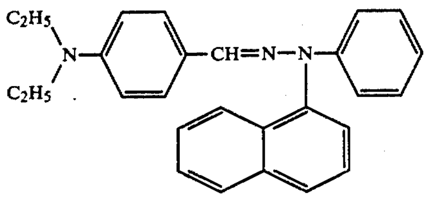

(6)
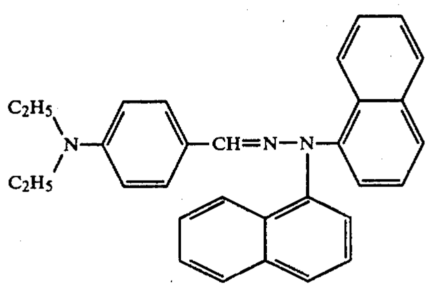

(7)
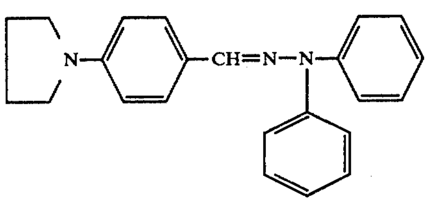

(8)
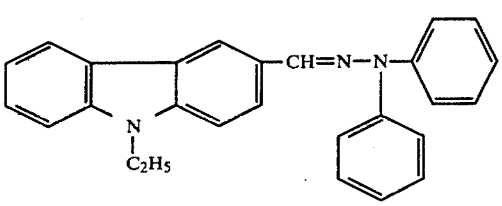

-continued (9)
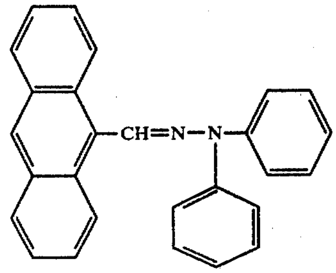

(10)
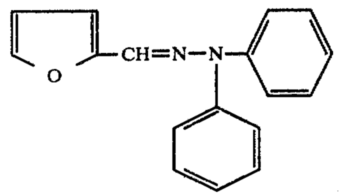

(11)
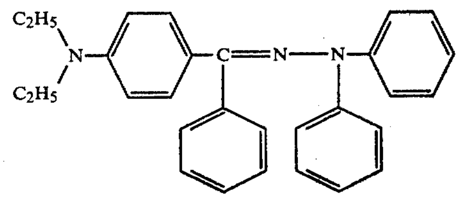

Examples of preferable pyrazoline compounds include 1-phenyl-3-(4-N,N-diethylaminostyryl)-5-(4-N,N-diethylaminophenyl) pyrazoline, 1-phenyl-3-(4-N,N-dipropylaminostryl)-5-(4-N,N-dipropylphenyl)pyrazoline, 1-[pyridyl-(2)]-3-(4-N,N-diethylaminostyryl)-5-(4-N,N-diethylaminophenyl)pyrazoline, 1-[quinolyl-(2)]-3-(4-N,N-diethylaminostyryl)-5-(4-N,N-diethylaminophenyl)pyrazoline, 1-[quinolyl-(4)]-3-(4-N,N-dibenzylaminostryl)-5-(4-N,N-dibenzylaminophenyl)pyrazoline, 1-[epidyl-(2)]-3-(4-N,N-diphenylaminostyryl)-5-(4-N,N-diphenylaminophenyl)pyrazoline, and 1-[lepidyl-(2)]-3-(4-N,N-diethylaminostyryl)-5-(4-N,N-diethylaminophenyl)pyrazoline.

Other suitable charge-transporting materials are 2,5-bis(4-N,N-diethylaminophenyl)-1,3,4-oxadiazole, bis(4-N,N-diethylamino-2-methylphenyl)-phenylmethane, 1,1-bis(4-N,N-diethylamino-2-methylphenyl)heptane, 1,1,2,2-tetrakis(4-N,N-diethylamino-2-methylphenyl)ethane, etc.

The charge-transporting compounds may be used either singly or in combination.

Preferably, the charge transport layer is formed by coating and drying a solution of a charge-transporting compound cited above with a binder in a suitable solvent. The binders usable herein include polyethylene, polypropylene, acrylic resins, methacrylic resins, vinyl chloride resin, vinyl acetate resin, phenolic resins, epoxy resins, polyester resins, polysulfone, alkyd resins, polycarbonates, polyurethanes, and copolymers containing two or more of repeating units in these polymers, of which particularly preferred are polyesters and polycarbonates. It is also possible to use as the binder photoconductive polymers such as poly(N-vinylcarbazole) which have a charge-transporting function per se.

Desirable compounding ratios of the charge-transporting compound to the binder are 10–500:100 by weight. Thickness of the charge transport layer is desirably 2–100μ, preferably 5–30μ.

Various additives can be incorporated into the charge transport layer of this invention, such as, for example, diphenyl, chlorinated diphenyl, o-terphenyl, p-terphenyl, dibutyl phthalate, dimethyl glycol phthalate, dioctyl phthalate, triphenyl phosphate, methylnaphthalene, benzophenone, chlorinated paraffin, dilauryl thiopropionate, 3,5-dinitrosalicylic acid, and various kinds of fluorocarbons.

Solvents for use in formation of the charge transport layer of this invention include a number of useful organic solvents, of which typical ones are, for example, aromatic hydrocarbons such as benzene, toluene, xylene, mesitylene, and chlorobenzene; ketones such as acetone and butanone, halogenated aliphatic hydrocarbons such as chloromethylene, chloroform, and chloroethylene; cyclic or linear ethers such as tetrahydrofuran and ethyl ether; and mixed solvent of these.

The electrophotographic photosensitive member of this invention may be prepared by forming a photosensitive layer made of a dispersion of the above-mentioned azo pigment in an insulating binder on a conductive layer or may be prepared by forming a photosensitive layer made of a dispersion of the above-mentioned azo pigment in a charge-transporting medium comprising both a charge-transporting material and an insulating binder (the charge-transporting medium may be a binder, such as poly-N-vinylcarbazole, acting also a charge-transmaterial) on a conductive layer. Insulative binders and charge-transporting materials applicable in this case are disclosed, for example, in Japanese Patent Publication No. 1667/1977 and Japanese Patent Laid-Open Nos. 30328/1972 and 18545/1972.

Substrates for the electrophotographic photosensitive member of this invention may be of any type so far as it is provided with conductivity. As examples thereof may be cited sheets of metals such as aluminum, vanadium, molybdenum, chromium, cadmium, titanium, nickel, copper, zinc, palladium, indium, tin, platinum, gold, stainless steel, brass, and the like and plastic sheets vacuum-metallized or overlaid with metal foil.

The electrophotographic photosensitive member of this invention can be used not only for electrophotographic copying machines but also widely in electrophotographic application fields such as those of laser printers, CRT-printers, electrophotographic printing plate making systems, and the like.

The present electrophotographic photosensitive member has markedly high sensitivity as compared with those employing conventional organic photoconductive materials and does not cause an increase in light portion potential or a decrease in dark portion potential even when charged and exposed repeatedly 10,000 times or more.

This invention will be illustrated below in more detail referring to Examples.

EXAMPLES 1–10

A solution of defatted casein in an aqueous ammonia (casein 11.2 g, 28% aqueous ammonia 1 g, water 222 ml) was coated on an aluminum plate by means of a Meyer bar and dried to form a bond layer of 1.0 $g/m^2$.

An azo pigment (5 g) shown in Table 1 was dispersed in a solution of 2 g of a butyral resin (degree of butyral conversion 63 mol%) in 95 ml of ethanol by mixing and grinding in a ball mill for 40 hours. The resulting dispersion was coated on said bond layer with a Meyer bar and dried to form a charge generation layer of 0.2 $g/m^2$.

A solution prepared by dissolving 5 g of 1-[pyridyl(2)]-3-(4-N,N-diethylaminostyryl)-5-(4-N,N-diethylaminophenyl)pyrazoline and 5 g of a polycarbonate of bisphenol A (mol.wt. about 30,000) in 70 ml of tetrahydrofuran was coated on said charge generation layer and dried to form a charge transport layer of 10 $g/m^2$.

Electrophotographic photosensitive members prepared in this way, after conditioning of moisture thereof at a temperature 20° C. and at a relative humidity of 65%, were corona-charged at ⊖5 KV in the static fashion using an electrostatic copying paper testing machine (Model SP-428, mfd. by Kawaguchi Denki K.K.), and after 10-second standing in the dark, were exposed to light at an intensity of 5 lux., thereby charge bearing characteristics thereof being determined.

The results are shown in Table 1, wherein Vo (−V) is initial potential generated, Vk (%) is percentage of potential retention after 10-second standing in the dark, and $E\frac{1}{2}$ (lux.sec) is exposure quantity for halving the initial potential.

TABLE 1

| Example | Azo Pigment | Vo (Volt) | Vk (%) | $E\frac{1}{2}$ (lux. sec) |
|---|---|---|---|---|
| 1 | No. (1) | −610 | 92 | 10.1 |
| 2 | No. (66) | −600 | 90 | 13.5 |
| 3 | No. (142) | −600 | 92 | 12.7 |
| 4 | No. (180) | −570 | 90 | 14.8 |
| 5 | No. (209) | −580 | 92 | 14.2 |
| 6 | No. (240) | −550 | 92 | 12.8 |
| 7 | No. (278) | −580 | 90 | 14.3 |
| 8 | No. (315) | −580 | 93 | 13.1 |
| 9 | No. (353) | −590 | 93 | 13.7 |
| 10 | No. (376) | −560 | 90 | 14.6 |

Each photosensitive member of these Examples was attached onto a cylindrical drum, which was then set in a copying machine. This copying machine has such a construction that a negative-charging device, light irradiating optical system, development device, and charging device for transfer copying are disposed around the drum, so as to carry out necessary operations successively as the drum revolves, and to form images on sheets of transfer paper.

The photosensitive members of these Examples gave clear and sharp images at a light portion exposure quantity of 30 lux.sec. With these photosensitive members even when 25,000 or more copies were produced, every image obtained was of good quality.

EXAMPLES 11–20

Electrophotographic photosensitive members were prepared in the same manner using the same respective azo pigments as Examples 1–10 except for using the above-cited hydrazone compound No. 1 (4-N,N-diethylaminobenzaldehyde-N,N-diphenylhydrazone) as a charge-transporting material in place of 1-[pyridyl-(2)]-3-(4-N,N-diethylaminostyryl)-5-(4-N,N-diethylaminophenyl)pyrazoline, which was used in Examples 1–10.

Measurements of charge bearing characteristics of these photosensitive members in the same fashion as Examples 1–10 gave the results shown in Table 2.

TABLE 2

| Example No. | Azo pigment | Vo (volt) | Vk (%) | $E\frac{1}{2}$ (lux. sec) |
|---|---|---|---|---|
| 11 | No. (1) | −620 | 91 | 7.6 |
| 12 | No. (66) | −600 | 91 | 10.5 |
| 13 | No. (142) | −620 | 90 | 8.4 |

TABLE 2-continued

| Example No. | Azo pigment | Vo (volt) | Vk (%) | E½ (lux. sec) |
|---|---|---|---|---|
| 14 | No. (180) | −580 | 90 | 10.1 |
| 15 | No. (209) | −580 | 90 | 11.5 |
| 16 | No. (240) | −560 | 90 | 10.7 |
| 17 | No. (278) | −570 | 90 | 11.2 |
| 18 | No. (315) | −580 | 93 | 10.0 |
| 19 | No. (353) | −600 | 93 | 8.8 |
| 20 | No. (376) | −570 | 91 | 13.2 |

These photosensitive members were each set in the copying machine employed in Examples 1-10, and similarly images we formed, which were clear, no fogging being observed therein. In addition, even when 25,000 or more copies were produced, every image obtained was of good quality.

Furthermore, results similar to the above were obtained by using the above-cited compounds No. 2 (2-methoxy-4-N,N-diethylaminobenzaldehyde-N,N-diphenylhydrazone), No. 5 (4-N,N-diethylaminobenzaldehyde-N-phenyl-N-α-naphthylhydrazone), and No. 8 (N,N-diphenylhydrazino-3-methylidene-9-ethylcarbazole) were severally used as a charge-transporting material in place of said hydrazone compound No. 1.

EXAMPLES 21-30

A solution prepared by dissolving 5 g of 2,5-bis(4-N,N-diethylaminophenyl)-1,3,4-oxadiazole and 5 g of the same polycarbonate resin as used in Examples 1-10, in 70 ml of tetrahydrofuran was coated on the same charge generation layers as prepared in Examples 1-10, by means of a Meyer bar to give a dry coating weight of 11 $g/m^2$.

The photosensitive members thus prepared were tested for charge bearing characteristics in the same fashion as in Examples 1-10. The results are shown in Table 3.

Image formation tests on these photosensitive members by use of the above-mentioned copying machine gave good results similar to those of Examples 1-20.

TABLE 3

| Example No. | Azo pigment | Vo (volt) | Vk (%) | E½ (lux. sec) |
|---|---|---|---|---|
| 21 | No. (1) | −580 | 93 | 14.2 |
| 22 | No. (66) | −560 | 90 | 15.6 |
| 23 | No. (142) | −560 | 91 | 12.8 |
| 24 | No. (180) | −550 | 91 | 14.6 |
| 25 | No. (209) | −550 | 91 | 13.5 |
| 26 | No. (240) | −480 | 91 | 14.7 |
| 27 | No. (278) | −540 | 91 | 15.8 |
| 28 | No. (315) | −560 | 93 | 15.6 |
| 29 | No. (353) | −550 | 93 | 18.6 |
| 30 | No. (376) | −530 | 91 | 16.2 |

EXAMPLES 31-176

A mixture of 5 g of an azo pigment shown in Table 4, 10 g of a polyester solution (solid content 20%; registered trade mark: Polyester Adhesive 49000, mfd, by Du Pont de Nemours & Co.), and 80 ml tetrahydrofuran, after dispersed by mixing and grinding in a ball mill for 60 hours, was coated by means of a Meyer bar on the surface of aluminum vacuum-deposited on a Mylar film and was dried to form a charge generation layer of 0.3 $g/m^2$.

A solution was prepared by dissolving 5 g of 4-N,N-diethylaminobenzaldehyde-N-phenyl-N-α-naphthylhydrazone (the above-cited hydrazone compound No. 4) and 5 g of the same polycarbonate resin as used in Examples 1-10, in 70 ml of tetrahydrofuran. The solution was coated on the above-mentioned charge generation layer by using an applicator and dried to form a charge transport layer of 10 $g/m^2$.

Measurements of charge bearing characteristics on the photosensitive members prepared in this way gave results as shown in Table 4.

TABLE 4

| Example | Azo Pigment | Vo (Volt) | Vk (%) | E½ (lux. sec) |
|---|---|---|---|---|
| 31 | No. (2) | −620 | 92 | 16.7 |
| 32 | No. (3) | −630 | 93 | 8.6 |
| 33 | No. (6) | −610 | 91 | 8.8 |
| 34 | No. (10) | −620 | 95 | 6.2 |
| 35 | No. (11) | −600 | 91 | 8.4 |
| 36 | No. (12) | −580 | 92 | 7.8 |
| 37 | No. (14) | −600 | 91 | 8.6 |
| 38 | No. (16) | −620 | 90 | 7.1 |
| 39 | No. (18) | −630 | 93 | 10.8 |
| 40 | No. (21) | −610 | 92 | 7.6 |
| 41 | No. (26) | −600 | 90 | 8.8 |
| 42 | No. (28) | −610 | 92 | 17.3 |
| 43 | No. (31) | −620 | 93 | 18.4 |
| 44 | No. (33) | −600 | 92 | 18.5 |
| 45 | No. (34) | −630 | 94 | 15.0 |
| 46 | No. (37) | −600 | 92 | 17.7 |
| 47 | No. (40) | −580 | 92 | 18.6 |
| 48 | No. (44) | −600 | 92 | 17.5 |
| 49 | No. (47) | −620 | 93 | 17.1 |
| 50 | No. (48) | −600 | 92 | 8.3 |
| 51 | No. (67) | −610 | 92 | 10.5 |
| 52 | No. (68) | −630 | 93 | 6.7 |
| 53 | No. (69) | −580 | 91 | 15.6 |
| 54 | No. (72) | −570 | 93 | 13.4 |
| 55 | No. (73) | −590 | 90 | 9.4 |
| 56 | No. (75) | −610 | 92 | 7.4 |
| 57 | No. (77) | −550 | 90 | 10.6 |
| 58 | No. (79) | −580 | 90 | 10.2 |
| 59 | No. (81) | −570 | 91 | 13.8 |
| 60 | No. (85) | −620 | 93 | 7.1 |
| 61 | No. (87) | −580 | 90 | 13.3 |
| 62 | No. (89) | −630 | 92 | 6.3 |
| 63 | No. (91) | −590 | 90 | 10.1 |
| 64 | No. (92) | −580 | 90 | 12.7 |
| 65 | No. (93) | −640 | 93 | 6.0 |
| 66 | No. (95) | −570 | 89 | 14.8 |
| 67 | No. (97) | −610 | 92 | 10.6 |
| 68 | No. (98) | −620 | 91 | 5.4 |
| 69 | No. (99) | −640 | 93 | 4.8 |
| 70 | No. (100) | −580 | 90 | 12.9 |
| 71 | No. (103) | −550 | 91 | 9.9 |
| 72 | No. (106) | −590 | 93 | 9.6 |
| 73 | No. (108) | −600 | 90 | 10.2 |
| 74 | No. (110) | −610 | 90 | 8.8 |
| 75 | No. (111) | −620 | 89 | 7.1 |
| 76 | No. (112) | −560 | 90 | 13.6 |
| 77 | No. (116) | −590 | 93 | 9.5 |
| 78 | No. (120) | −600 | 90 | 9.1 |
| 79 | No. (125) | −550 | 93 | 13.7 |
| 80 | No. (128) | −610 | 91 | 8.3 |
| 81 | No. (143) | −620 | 92 | 8.6 |
| 82 | No. (144) | −570 | 90 | 14.7 |
| 83 | No. (146) | −600 | 91 | 12.7 |
| 84 | No. (147) | −620 | 93 | 13.9 |
| 85 | No. (148) | −610 | 90 | 15.8 |
| 86 | No. (149) | −580 | 93 | 14.1 |
| 87 | No. (150) | −560 | 90 | 10.6 |
| 88 | No. (155) | −560 | 90 | 13.7 |
| 89 | No. (156) | −560 | 92 | 12.8 |
| 90 | No. (159) | −580 | 94 | 10.8 |
| 91 | No. (160) | −620 | 92 | 7.7 |
| 92 | No. (161) | −560 | 91 | 14.6 |
| 93 | No. (163) | −580 | 92 | 9.8 |
| 94 | No. (165) | −600 | 90 | 12.7 |
| 95 | No. (166) | −560 | 89 | 14.8 |
| 96 | No. (168) | −550 | 90 | 16.1 |
| 97 | No. (171) | −600 | 92 | 8.4 |
| 98 | No. (172) | −620 | 92 | 7.2 |
| 99 | No. (173) | −600 | 93 | 7.1 |
| 100 | No. (211) | −550 | 92 | 15.8 |
| 101 | No. (215) | −550 | 90 | 15.8 |
| 102 | No. (217) | −580 | 90 | 9.7 |
| 103 | No. (219) | −550 | 92 | 13.3 |

TABLE 4-continued

| Example | Azo Pigment | Vo (Volt) | Vk (%) | $E\frac{1}{2}$ (lux. sec) |
|---|---|---|---|---|
| 104 | No. (227) | −590 | 93 | 8.8 |
| 105 | No. (233) | −580 | 92 | 9.6 |
| 106 | No. (181) | −560 | 91 | 12.1 |
| 107 | No. (182) | −550 | 92 | 13.6 |
| 108 | No. (183) | −530 | 92 | 14.7 |
| 109 | No. (185) | −580 | 90 | 11.5 |
| 110 | No. (188) | −540 | 92 | 15.7 |
| 111 | No. (189) | −550 | 90 | 13.1 |
| 112 | No. (192) | −560 | 89 | 14.6 |
| 113 | No. (193) | −570 | 92 | 11.5 |
| 114 | No. (197) | −550 | 92 | 12.9 |
| 115 | No. (199) | −540 | 93 | 13.8 |
| 116 | No. (202) | −580 | 91 | 9.7 |
| 117 | No. (204) | −600 | 93 | 8.9 |
| 118 | No. (242) | −580 | 92 | 9.7 |
| 119 | No. (244) | −510 | 90 | 16.5 |
| 120 | No. (246) | −550 | 90 | 10.1 |
| 121 | No. (247) | −520 | 93 | 12.5 |
| 122 | No. (249) | −550 | 92 | 14.3 |
| 123 | No. (253) | −530 | 91 | 9.8 |
| 124 | No. (255) | −550 | 93 | 9.6 |
| 125 | No. (259) | −500 | 90 | 11.8 |
| 126 | No. (263) | −510 | 93 | 12.5 |
| 127 | No. (277) | −560 | 91 | 10.1 |
| 128 | No. (278) | −580 | 91 | 10.5 |
| 129 | No. (280) | −580 | 92 | 8.2 |
| 130 | No. (281) | −540 | 90 | 14.7 |
| 131 | No. (284) | −560 | 89 | 14.3 |
| 132 | No. (285) | −550 | 89 | 15.6 |
| 133 | No. (286) | −540 | 92 | 12.6 |
| 134 | No. (287) | −580 | 90 | 9.7 |
| 135 | No. (289) | −550 | 92 | 8.3 |
| 136 | No. (291) | −590 | 90 | 7.1 |
| 137 | No. (293) | −550 | 93 | 12.8 |
| 138 | No. (297) | −590 | 90 | 6.6 |
| 139 | No. (300) | −540 | 89 | 14.0 |
| 140 | No. (301) | −590 | 92 | 7.8 |
| 141 | No. (303) | −540 | 90 | 16.7 |
| 142 | No. (305) | −580 | 91 | 12.0 |
| 143 | No. (309) | −590 | 92 | 9.6 |
| 144 | No. (316) | −560 | 92 | 13.5 |
| 145 | No. (317) | −550 | 93 | 15.8 |
| 146 | No. (320) | −560 | 90 | 10.1 |
| 147 | No. (322) | −550 | 91 | 8.3 |
| 148 | No. (326) | −540 | 93 | 15.0 |
| 149 | No. (328) | −590 | 91 | 7.6 |
| 150 | No. (329) | −590 | 90 | 6.4 |
| 151 | No. (330) | −550 | 92 | 12.5 |
| 152 | No. (333) | −560 | 90 | 16.7 |
| 153 | No. (335) | −540 | 92 | 15.8 |
| 154 | No. (340) | −600 | 93 | 6.1 |
| 155 | No. (342) | −600 | 92 | 7.2 |
| 156 | No. (343) | −590 | 89 | 9.7 |
| 157 | No. (344) | −530 | 91 | 16.1 |
| 158 | No. (345) | −580 | 90 | 14.7 |
| 159 | No. (347) | −600 | 91 | 10.8 |
| 160 | No. (345) | −590 | 90 | 11.8 |
| 161 | No. (357) | −560 | 91 | 12.7 |
| 162 | No. (359) | −550 | 90 | 11.0 |
| 163 | No. (360) | −590 | 92 | 8.6 |
| 164 | No. (361) | −550 | 90 | 14.5 |
| 165 | No. (363) | −540 | 90 | 13.3 |
| 166 | No. (365) | −530 | 92 | 14.2 |
| 167 | No. (375) | −580 | 91 | 13.6 |
| 168 | No. (378) | −580 | 91 | 11.6 |
| 169 | No. (380) | −590 | 93 | 8.7 |
| 170 | No. (383) | −540 | 91 | 15.3 |
| 171 | No. (383) | −550 | 92 | 12.8 |
| 172 | No. (387) | −560 | 90 | 13.4 |
| 173 | No. (388) | −530 | 88 | 15.6 |
| 174 | No. (392) | −610 | 93 | 8.8 |
| 175 | No. (393) | −600 | 90 | 9.2 |
| 176 | No. (351) | −600 | 90 | 14.6 |

Image formation tests on these photosensitive members 31–176 by use of the above-mentioned copying machine gave also good results similar to those of Examples 1–20.

EXAMPLES 177–186

A mixture of 20 g of a poly(N-vinylcarbazole) (mol.wt. about 300,000), 3.2 g of 2,4,7-trinitrofluorene, 10 g of the same polyester solution as in Examples 31–176, 20 g of an azo pigment shown in Table 5, and 180 ml of tetrahydrofuran was grounded in a ball mill for 40 hours to form a dispersion, which was coated by means of an applicator on the surface of aluminum vacuum-deposited on a Mylar film, to give a dry coating weight of 12 g/m$^2$.

The photosensitive members prepared in this way were tested for charge bearing characteristics in the same fashion as Examples 1–10 except that the charging polarity was positive. The results are shown in Table 5.

TABLE 5

| Example No. | Azo pigment | Vo (volt) | Vk (%) | $E\frac{1}{2}$ (lux. sec) |
|---|---|---|---|---|
| 177 | No. (2) | 470 | 83 | 14.0 |
| 178 | No. (67) | 480 | 90 | 12.2 |
| 179 | No. (143) | 480 | 86 | 17.6 |
| 180 | No. (181) | 460 | 84 | 18.1 |
| 181 | No. (210) | 470 | 88 | 17.1 |
| 182 | No. (241) | 480 | 83 | 15.2 |
| 183 | No. (279) | 440 | 86 | 18.8 |
| 184 | No. (316) | 480 | 88 | 16.1 |
| 185 | No. (354) | 470 | 83 | 16.6 |
| 186 | No. (377) | 470 | 85 | 14.2 |

What we claim is:

1. An electrophotographic photosensitive member comprising a conductive support and overlying said support a layer comprising a binder and at least one azo pigment represented by the following formula (I)

$$\text{Formula (I): } Cp-N=N-A_1-\underset{\underset{A_3(-N=N-Cp)n}{|}}{CH}-A_2-N=N-Cp$$

in the formula,

Cp is a coupler residue;

$A_1$ and $A_2$ are each a divalent organic residue;

n is 0 or 1; and when n is 0, $A_3$ is substituted or unsubstituted alkyl, substituted or unsubstituted aryl, or $-(CH=CH)_l-R'$, wherein R' is a substituted or unsubstituted heterocyclic ring residue and l is 0, 1 or 2, and when n is 1, $A_3$ is a divalent organic residue.

2. An electrophotographic photosensitive member of claim 1, wherein $A_1$ and $A_2$ of the azo pigment represented by the formula (I) are a substituted or unsubstituted arylene group, or a conjugated double bond-containing divalent organic residue having at least one benzene ring which is condensed or not condensed with a heterocyclic ring.

3. An electrophotographic photosensitive member of claim 1, wherein $A_3$ of the azo pigment represented by the formula (I), when n is 1, is a substituted or unsubstituted arylene group or a conjugated double bond-containing divalent organic residue having at least one benzene ring which is condensed or not condensed with a heterocyclic ring.

4. An electrophotographic photosensitive member of claim 1, wherein said coupler residue Cp is represented by the following formula (1), (2), (3), or (4):

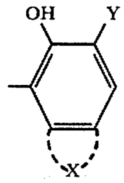

Formula (1)

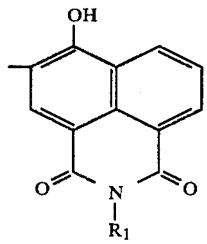

Formula (2)

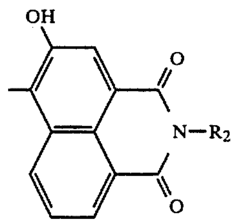

Formula (3)

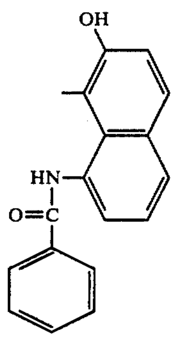

Formula (4)

in the formulae, X is an atomic group necessary to complete a substituted or unsubstituted aromatic hydrocarbon ring or a substituted or unsubstituted heterocyclic ring;

Y is hydrogen,

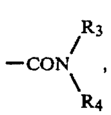

or —$COOR_4$, wherein $R_3$ is hydrogen, substituted or unsubstituted alkyl, or substituted or unsubstituted aryl and $R_4$ is substituted or unsubstituted alkyl, substituted or unsubstituted aryl, substituted or unsubstituted heterocyclic ring residue, or substituted or unsubstituted amino; and $R_1$ and $R_2$ each is substituted or unsubstituted alkyl or substituted or unsubstituted aryl.

5. An electrophotographic photosensitive member of claim 4, wherein said coupler residue Cp is represented by the formula:

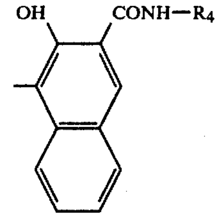

where $R_4$ is substituted or unsubstituted alkyl, substituted or unsubstituted aryl, substituted or unsubstituted heterocyclic ring residue, or substituted or unsubstituted amino.

6. An electrophotographic photosensitive member of claim 5, wherein said $R_4$ is a residue selected from the group consisting of methyl, ethyl, n-propyl, n-butyl, phenyl, $\alpha$-naphthyl, $\beta$-naphthyl, 4-chlorophenyl, 3-nitrophenyl, 2,5-dimethoxy-4-chlorophenyl, 4-methoxyphenyl, 2-pyridyl, 3-carbazolyl, and diphenylamino.

7. An electrophotographic photosensitive member of claim 4, wherein said $R_1$ and $R_2$ each are a residue selected from the group consisting of methyl, ethyl, propyl, butyl, 2-methoxyethyl, 2-ethoxyethyl, 3-methoxypropyl, and 3-ethoxypropyl.

8. An electrophotographic photosensitive member of claim 2, wherein said azo pigment is a disazo pigment represented by the formula:

$$Cp-N=N-Ph_1-\underset{\displaystyle R}{\underset{|}{CH}}-Ph_2-N=N-Cp$$

wherein, Cp is a coupler residue; $Ph_1$ and $Ph_2$ each are a substituted or unsubstituted arylene group; and R is a substituted or unsubstituted alkyl group or a substituted or unsubstituted aryl group.

9. An electrophotographic photosensitive member of claim 8, wherein $Ph_1$ and $Ph_2$ each are a substituted or unsubstituted phenylene group.

10. An electrophotographic photosensitive member of claim 9, wherein said phenylene group is p-phenylene.

11. An electrophotographic photosensitive member of claim 2, wherein said azo pigment is disazo pigment represented by the formula $$Cp-N=N-X_1-(CH=CH)_p-\underset{\displaystyle R}{\underset{|}{CH}}-(CH=CH)_q-X_2-N=N-Cp$$

wherein Cp is a coupler residue; $X_1$ and $X_2$ each are a substituted or unsubstituted divalent organic residue of aromatic heterocyclic ring condensed with benzene or naphthalene ring; R is a substituted or unsubstituted alkyl group or a substituted or unsubstituted aryl group; and p and q each are 0, 1, or 2.

12. An electrophotographic photosensitive member of claim 11, wherein said $X_1$ and $X_2$ each are a divalent residue of a heterocyclic compound selected from the group consisting of benzimidazole, naphthoimidazole, benzoxazole, isobenzoxazole, naphthoxazole, benzothiazole, naphthothiazole, benzoselenazole, naphthoselenazole, indole, quinoline, isoquinoline, benzofuran, dibenzofuran, coumalin, carbazole, phenothiazine, phenoxazine, and their substituted derivatives.

13. An electrophotographic photosensitive member of claim 12, wherein said $X_1$ and $X_2$ each are a divalent residue of a heterocyclic compound selected from the group consisting of carbazole, benzoxazole, dibenzofuran, benzimidazole, benzothiazole, indole, and their substituted derivatives.

14. An electrophotographic photosensitive member of claim 13, $X_1$ and $X_2$ each are a divalent residue of substituted or unsubstituted carbazole.

15. An electrophotographic photosensitive member of claim 11, wherein both said p and q represent zero.

16. An electrophotographic photosensitive member of claim 2, wherein said azo pigment is a disazo pigment represented by the formula $$\mathrm{Cp{-}N{=}N{-}Ph_1{-}\underset{\substack{|\\(CH{=}CH)_l{-}R'}}{CH}{-}Ph_2{-}N{=}N{-}Cp}$$

wherein, Cp is a coupler residue; $Ph_1$ and $Ph_2$ each are a substituted or unsubstituted arylene group; R' is a substituted or unsubstituted heterocyclic ring residue; and l is 0, 1, or 2.

17. An electrophotographic photosensitive member of claim 16, wherein said $Ph_1$ and $Ph_2$ each are a substituted or unsubstituted phenylene group.

18. An electrophotographic photosensitive member of claim 17, wherein said phenylene is p-phenylene.

19. An electrophotographic photosensitive member of claim 16, wherein said R' is a monovalent residue of a heterocyclic compound selected from the group consisting of imidazoline, imidazole, benzimidazole, naphthoimidazole, oxazoline, oxazole, benzoxazole, naphthoxazole, thiazoline, thiazole, benzothiazole, naphthothiazole, selenazole, benzoselenazole, naphthoselenazole, indoline, indole, pyridine, quinoline, furan, dibenzofuran, oxadiazole, thiadiazole, triazole, carbazole, and their substituted derivatives.

20. An electrophotographic photosensitive member of claim 16, wherein said R' is a substituted or unsubstituted nitrogen-containing heterocyclic ring residue.

21. An electrophotographic photosensitive member of claim 20, wherein said R' is a monovalent residue of a nitrogen-containing heterocyclic compound selected from the group consisting of pyridine, quinoline, carbazole, benzoxazole, benzothiazole, benzimidazole, indole, and their substituted derivatives.

22. An electrophotographic photosensitive member of claim 21, wherein said R' is substituted or unsubstituted carbazolyl.

23. An electrophotographic photosensitive member of claim 16, wherein said l is zero.

24. An electrophotographic photosensitive member of claim 2, wherein said azo pigment is a disazo pigment represented by the formula $$\mathrm{Cp{-}N{=}N{-}Ph_3{-}Q_1{-}Ph_4{-}\underset{\substack{|\\(CH{=}CH)_l{-}R'}}{CH}{-}Ph_5{-}Q_2{-}Ph_6{-}N{=}N{-}Cp}$$

wherein Cp is a coupler residue; $Ph_3$, $Ph_4$, $Ph_5$, and $Ph_6$ each are a substituted or unsubstituted arylene group; $Q_1$ and $Q_2$ each are —CH=CH— or $$\mathrm{{-}CH{=}\underset{\substack{|\\CN}}{C}{-}};$$

R' is a substituted or unsubstituted heterocyclic ring residue; and l is 0, 1, or 2.

25. An electrophotographic photosensitive member of claim 24, wherein said $Ph_3$, $Ph_4$, $Ph_5$ and $Ph_6$ each are substituted or unsubstituted phenylene.

26. An electrophotographic photosensitive member of claim 25, wherein said phenylene is p-phenylene.

27. An electrophotographic photosensitive member of claim 24, wherein said R' is a monovalent residue of a heterocyclic compound selected from the group consisting of imidazole, benzimidazole, naphthoimidazole, oxazoline, oxazole, benzoxazole, naphthoxazole, thiazoline, thiazole, benzothiazole, naphthothiazole, selenazole, benzoselenazole, naphthoselenazole, indoline, indole, pyridine, quinoline, furan, dibenzofuran, oxadiazole, thiadiazole, triazole, carbazole, and their substituted derivatives.

28. An electrophotographic photosensitive member of claim 24, wherein said R' is a monovalent residue of substituted or unsubstituted nitrogen-containing heterocyclic ring.

29. An electrophotographic photosensitive member of claim 28, wherein said R' is a monovalent residue of a heterocyclic compound selected from the group consisting of pyridine, quinoline, carbazole, benzoxazole, benzothiazole, benzimidazole, indole, and their substituted derivatives.

30. An electrophotographic photosensitive member of claim 29, wherein said R' is a substituted or unsubstituted carbazolyl.

31. An electrophotographic photosensitive member of claim 24, wherein said l is zero.

32. An electrophotographic photosensitive member of claim 24, wherein said $Q_1$ and $Q_2$ each are —CH=CH—.

33. An electrophotographic photosensitive member of claim 2, wherein said azo pigment is a disazo pigment represented by the formula $$\mathrm{Cp{-}N{=}N{-}Ph_3{-}Q_1{-}Ph_4{-}\underset{\substack{|\\R}}{CH}{-}Ph_5{-}Q_2{-}Ph_6{-}N{=}N{-}Cp}$$

wherein Cp is a coupler residue; $Ph_3$, $Ph_4$, $Ph_5$ and $Ph_6$ each are a substituted or unsubstituted arylene group; $Q_1$ and $Q_2$ each are —CH=CH— or $$\mathrm{{-}CH{=}\underset{\substack{|\\CN}}{C}{-}};$$

and R is a substituted or unsubstituted alkyl group or a substituted or unsubstituted aryl group.

34. An electrophotographic photosensitive member of claim 33, wherein said $Ph_3$, $Ph_4$, $Ph_5$ and $Ph_6$ each are a substituted or unsubstituted phenylene group.

35. An electrophotographic photosensitive member of claim 34, wherein said phenylene group is p-phenylene.

36. An electrophotographic photosensitive member of claim 33, wherein said $Q_1$ and $Q_2$ each are —CH=CH—.

37. An electrophotographic photosensitive member of claim 3, wherein said azo pigment is a trisazo pigment represented by the formula $$Cp-N=N-Ph_1-\underset{\underset{Ph_7-N=N-Cp}{|}}{CH}-Ph_2-N=N-Cp$$

wherein Cp is a coupler residue; and $Ph_1$, $Ph_2$ and $Ph_7$ each are a substituted or unsubstituted arylene group.

38. An electrophotographic photosensitive member of claim 37, wherein said $Ph_1$, $Ph_2$ and $Ph_7$ each are a substituted or unsubstituted phenylene group.

39. An electrophotographic photosensitive member of claim 38, wherein said phenylene group is p-phenylene.

40. An electrophotographic photosensitive member of claim 3, wherein said azo pigment is a trisazo pigment represented by the formula $$Cp-N=N-X_1-(CH=CH)_p-\underset{\underset{Ph_7-N=N-Cp}{|}}{CH}-(CH=CH)_q-X_2-N=N-Cp$$

wherein, Cp is a coupler residue; $X_1$ and $X_2$ each are a substituted or unsubstituted divalent residue of aromatic heterocyclic ring condensed with a benzene or naphthalene ring; $Ph_7$ is a substituted or unsubstituted arylene group; and p and q each are 0, 1, or 2.

41. An electrophotographic photosensitive member of claim 40, wherein said $X_1$ and $X_2$ each are a divalent residue of a heterocyclic compound selected from the group consisting of benzimidazole, naphthimidazole, benzoxazole, isobenzoxazole, naphthoxazole, benzothiazole, naphthothiazole, benzoselenazole, naphthoselenazole, indole, quinoline, isoquinoline, benzofuran, dibenzofuran, coumalin, carbazole, phenothiazine, phenoxazine, and their substituted derivative.

42. An electrophotographic photosensitive member of claim 41, wherein said $X_1$ and $X_2$ each are a divalent residue of a heterocyclic compound selected from the group consisting of carbazole, benzoxazole, dibenzofuran, benzimidazole, benzothiazole, indole, and their substituted derivatives.

43. An electrophotographic photosensitive member of claim 42, wherein said $X_1$ and $X_2$ each are a divalent residue of substituted or unsubstituted carbazole.

44. An electrophotographic photosensitive member of claim 40, wherein said $Ph_7$ is a substituted or unsubstituted phenylene group.

45. An electrophotographic photosensitive member of claim 44, wherein said phenylene group is p-phenylene.

46. An electrophotographic photosensitive member of claim 3, wherein said azo pigment is a trisazo pigment represented by the formula

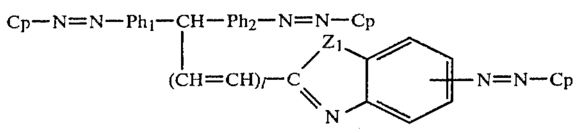

wherein Cp is a coupler residue; $Ph_1$ and $Ph_2$ each are a substituted or unsubstituted arylene group; $Z_1$ is —S—, —O—, —Se—, >N—$R_6$, $$\underset{R_8}{\overset{R_7}{>C<}},$$

or —CH=CH—, each of $R_6$, $R_7$ and $R_8$ being a hydrogen atom, substituted or unsubstituted alkyl, or substituted or unsubstituted aryl; and l is 0, 1, or 2.

47. An electrophotographic photosensitive member of claim 46, wherein said $Ph_1$ and $Ph_2$ each are a substituted or unsubstituted phenylene group.

48. An electrophotographic photosensitive member of claim 47, wherein said phenylene group is p-phenylene.

49. An electrophotographic photosensitive member of claim 46, wherein said l is zero.

50. An electrophotographic photosensitive member of claim 3, wherein said azo pigment is a trisazo pigment represented by the formula

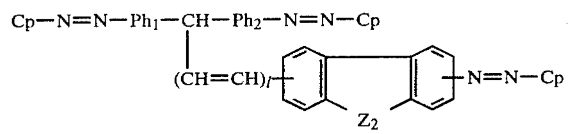

wherein Cp is a coupler residue; $Ph_1$ and $Ph_2$ each are a substituted or unsubstituted arylene group; $Z_2$ is —O—, >N—$R_9$, >C=O or $$>S(=O)_2,$$

$R_9$ being a hydrogen atom or a substituted or unsubstituted alkyl group; and l is 0, 1, or 2.

51. An electrophotographic photosensitive member of claim 50, wherein said $Ph_1$ and $Ph_2$ each are a substituted or unsubstituted phenylene group.

52. An electrophotographic photosensitive member of claim 51, wherein said phenylene group is p-phenylene.

53. An electrophotographic photosensitive member of claim 50, wherein said $Z_2$ is >N—$R_9$, $R_9$ being a hydrogen atom or a substituted or unsubstituted alkyl group.

54. An electrophotographic photosensitive member of claim 50, wherein said l is zero.

55. An electrophotographic photosensitive member of claim 3, wherein said azo pigment is a trisazo pigment represented by the formula $$Cp-N=N-Ph_3-Q_1-Ph_4-\underset{\underset{Ph_7-N=N-Cp}{|}}{CH}-Ph_5-Q_2-Ph_6-N=N-Cp$$

wherein, Cp is a coupler residue, $Ph_3$, $Ph_4$, $Ph_5$, $Ph_6$ and $Ph_7$ each are a substituted or unsubstituted arylene group, and $Q_1$ and $Q_2$ each are —CH=CH— or $$-CH=\underset{\underset{CN}{|}}{C}-.$$

56. An electrophotographic photosensitive member of claim 55, wherein said $Ph_3$, $Ph_4$, $Ph_5$, $Ph_6$ and $Ph_7$ each are a substituted or unsubstituted phenylene group.

57. An electrophotographic photosensitive member of claim 56, wherein said phenylene group is p-phenylene.

58. An electrophotographic photosensitive member of claim 3, wherein said azo pigment is a trisazo pigment represented by the formula

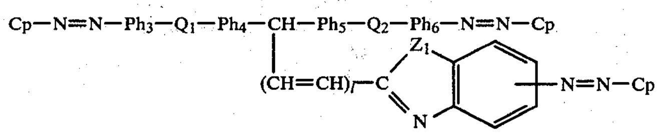

wherein, Cp is a coupler residue; $Ph_3$, $Ph_4$, $Ph_5$ and $Ph_6$ each are a substituted or unsubstituted arylene group; $Q_1$ and $Q_2$ each are —CH=CH— or $$-CH=\underset{\displaystyle CN}{\underset{|}{C}}-;$$

Z is —S—, —O—, —Se—, >N—$R_6$, $$\underset{R_8}{\overset{R_7}{>C<}},$$

or —CH=CH—, $R_6$, $R_7$ and $R_8$ being a hydrogen atom, substituted or unsubstituted alkyl, or substituted or unsubstituted aryl; and l is 0, 1 or 2.

59. An electrophotographic photosensitive member of claim 58, wherein said $Ph_3$, $Ph_4$, $Ph_5$ and $Ph_6$ each are a substituted or unsubstituted phenylene group.

60. An electrophotographic photosensitive member of claim 59, wherein said phenylene group is p-phenylene.

61. An electrophotographic photosensitive member of claim 58, wherein said l is zero.

62. An electrophotographic photosensitive member of claim 3, wherein said azo pigment is a trisazo pigment represented by the formula

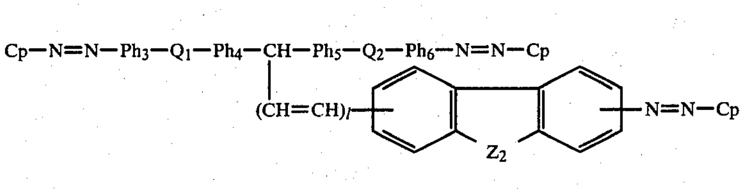

wherein, Cp is a coupler residue; $Ph_3$, $Ph_4$, $Ph_5$ and $Ph_6$ each are a substituted or unsubstituted arylene group; $Q_1$ and $Q_2$ each are —CH=CH— or $$-CH=\underset{\displaystyle CN}{\underset{|}{C}}-;$$

$Z_2$ is —O—, >N—$R_9$, >C=O, or $$>S\underset{O}{\overset{O}{}}{}_{\!\!\!\!\!\!\!\!\diagdown\!\!\diagup},$$

$R_9$ being a hydrogen atom or a substituted or unsubstituted alkyl; and l is 0, 1, or 2.

63. An electrophotographic photosensitive member of claim 62, wherein said $R_3$, $R_4$, $R_5$ and $R_6$ each are a substituted or unsubstituted phenylene group.

64. An electrophotographic photosensitive member of claim 63, wherein said phenylene group is p-phenylene.

65. An electrophotographic photosensitive member of claim 62, wherein said $Z_2$ is >N—$R_9$, $R_9$ being a hydrogen atom or a substituted or unsubstituted alkyl.

66. An electrophotographic photosensitive member of claim 62, wherein said l is zero.

67. An electrophotographic photosensitive member comprising (i) a charge generation layer comprising an azo pigment represented by the following formula (I):

$$Cp-N=N-A_1-\underset{\displaystyle A_3(-N=N-Cp)_n}{\underset{|}{CH}}-A_2-N=N-Cp \qquad \text{Formula (I)}$$

in the formula,

Cp is a coupler residue;

$A_1$ and $A_2$ are each a divalent organic residue;

n is 0 or 1; and when n is 0, $A_3$ is substituted or unsubstituted alkyl, substituted or unsubstituted aryl, or —(CH=CH)$_l$—R', wherein R' is a substituted or unsubstituted heterocyclic ring residue and l is 0, 1 or 2, and when n is 1, $A_3$ is a divalent organic residue and (ii) a charge transport layer.

68. An electrophotographic photosensitive member of claim 67, wherein said charge transport layer is laid on the charge generation layer.

69. An electrophotographic photosensitive member of claim 68, said charge transport layer contains a hole-transporting material.

70. An electrophotographic photosensitive member of claim 69, wherein said hole-transporting material is a compound selected from the group consisting of pyrazoline compounds, oxadiazole compounds, arylalkane compounds, and hydrazone compounds.

71. An electrophotographic photosensitive member of claim 70, wherein said hole-transporting material is a hydrazone compound.

72. An electrophotographic photosensitive member of claim 68, wherein said charge transport layer contains an electron-transporting material.

73. An electrophotographic photosensitive member of claim 72, wherein said electron-transporting material is a compound selected from the group consisting of chloranil, bromanil, tetracyanoethylene, tetracyanoquinodimethane, 2,4,7-trinitro-9-fluorenone, 2,4,5,7-tetrahydrofluorenone, 2,4,7-trinitro-9-dicyanomethylenefluorenone, 2,4,5,7-tetranitroxanthone, and 2,4,8-trinitrothioxanthone.

74. An electrophotographic photosensitive member comprising a photosensitive layer comprising (i) at least one azo pigment represented by the following formula (I):

$$\text{Formula (I): } Cp-N=N-A_1-\underset{\underset{A_3(-N=N-Cp)n}{|}}{CH}-A_2-N=N-Cp$$

in the formula,

Cp is a coupler residue;

$A_1$ and $A_2$ are each a divalent organic residue;

n is 0 or 1; and wherein R′ is a substituted or unsubstituted heterocyclic ring residue and l is 0, 1 or 2, and when n is 1, $A_3$ is a divalent organic residue.

75. An electrophotographic photosensitive member of claim 74, wherein said hole-transporting material is poly(N-vinylcarbazole).

76. An electrophotographic photosensitive member of claim 75, wherein said hole-transporting material is a charge transfer complex of poly(N-vinylcarbazole) and a fluorenone compound.

* * * * *

UNITED STATES PATENT AND TRADEMARK OFFICE
CERTIFICATE OF CORRECTION

PATENT NO. : 4,427,753

DATED : January 24, 1984

INVENTOR(S) : FUJIMURA, ET AL.

It is certified that error appears in the above-identified patent and that said Letters Patent is hereby corrected as shown below:

Col. 3, line 49, "-cooR$_4$- should be --COOR$_4$--.

Col. 14, Compound #(18),

" 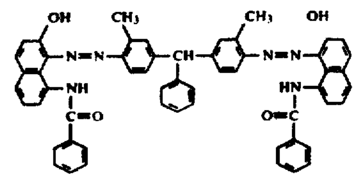 " should be -- 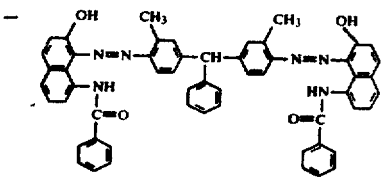 --.

Col. 15, Compound #(22),

" 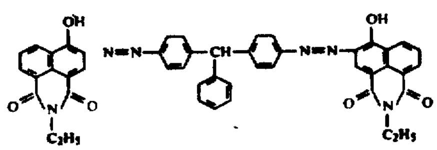 " should be -- 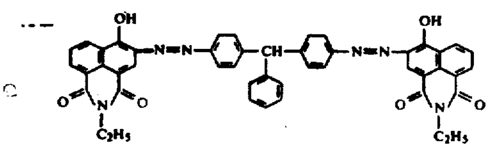 --.

Col. 20, Compound #46,

" 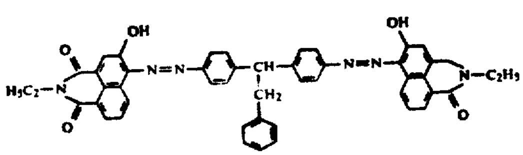 " should be -- 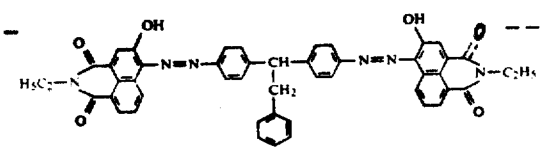 --

UNITED STATES PATENT AND TRADEMARK OFFICE

CERTIFICATE OF CORRECTION

PATENT NO. : 4,427,753 Page 2 of 4

DATED : January 24, 1984

INVENTOR(S) : FUJIMURA, ET AL.

It is certified that error appears in the above-identified patent and that said Letters Patent is hereby corrected as shown below:

Col. 20, Compound #(48),

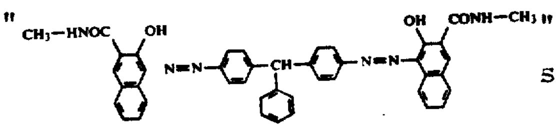

should be

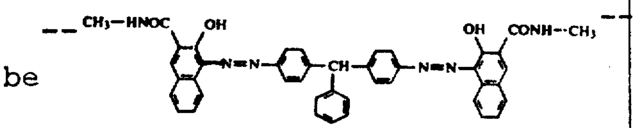

Col. 23, Compound #(64),

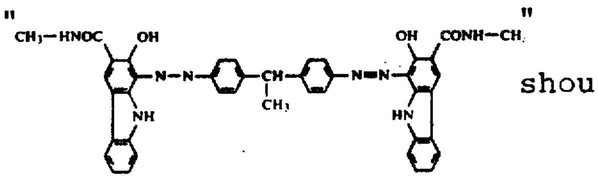

should be

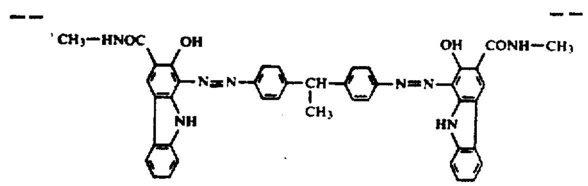

Col. 41, Compound #(123),

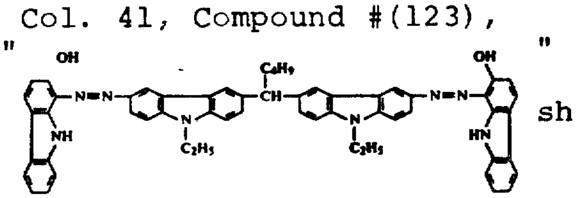

should be

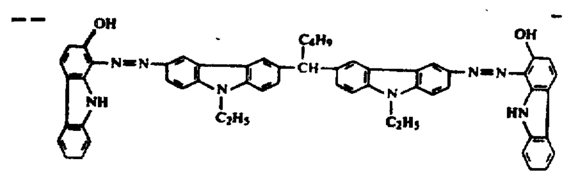

Col. 44, Compound #(131),

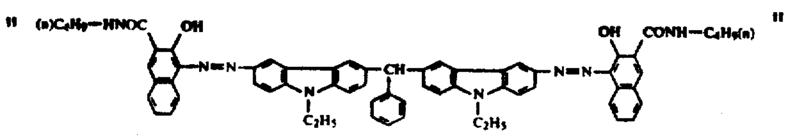

should be

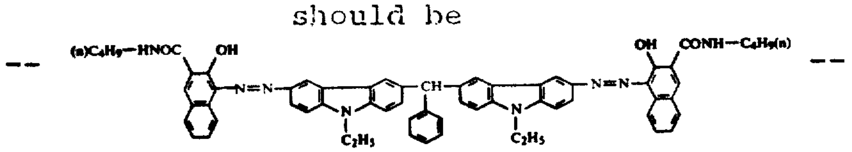

UNITED STATES PATENT AND TRADEMARK OFFICE
CERTIFICATE OF CORRECTION

PATENT NO. : 4,427,753
DATED : January 24, 1984
INVENTOR(S) : FUJIMURA, ET AL.

It is certified that error appears in the above-identified patent and that said Letters Patent is hereby corrected as shown below:

Col. 49, Compound #(150),

" 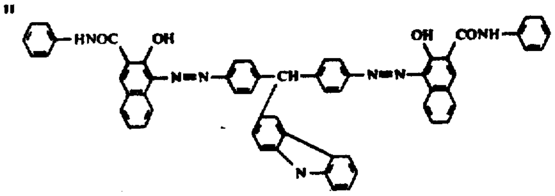 " should be -- 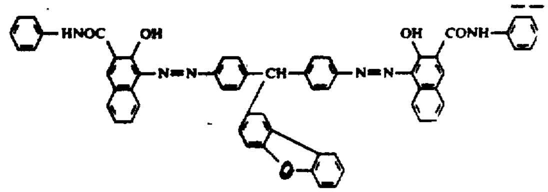 --

Col. 54, Compound #(165),

" 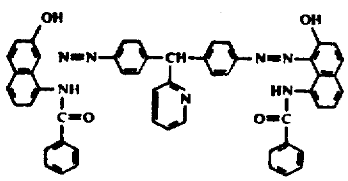 " should be -- 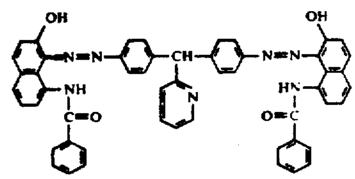 --.

Col. 55, Compound #(169),

" 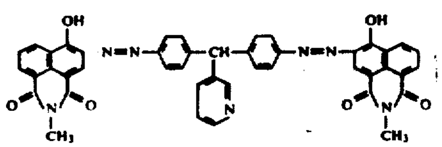 " should be -- 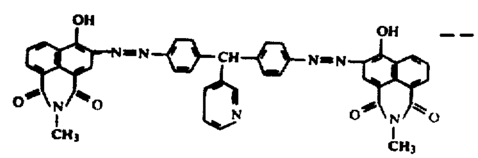 --.

Col. 55, Compound #(171),

" 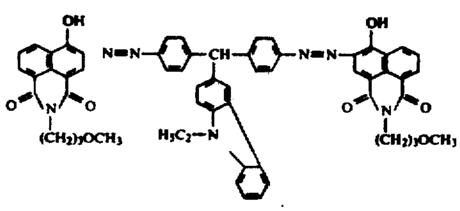 " should be -- 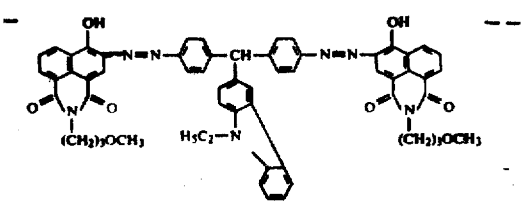 --.

UNITED STATES PATENT AND TRADEMARK OFFICE
CERTIFICATE OF CORRECTION

PATENT NO. : 4,427,753 Page 4 of 4

DATED : January 24, 1984

INVENTOR(S) : FUJIMURA, ET AL.

It is certified that error appears in the above-identified patent and that said Letters Patent is hereby corrected as shown below:

Col. 166, line 5, "ago" should be --azo--.

Claim 41, line 9, "derivative" should be --derivatives--.
Claim 74, Col. 184, line 9, after "n is 0 or 1; and" insert --when n is 0, $A_3$ is substituted or unsubstituted alkyl, substituted or unsubstituted aryl, or $-(CH=CH)_\ell-R'$,--.

Signed and Sealed this

*Tenth* Day of *July 1984*

[SEAL]

*Attest:*

GERALD J. MOSSINGHOFF

*Attesting Officer* *Commissioner of Patents and Trademarks*